(12) United States Patent
Jung et al.

(10) Patent No.: US 10,983,652 B2
(45) Date of Patent: Apr. 20, 2021

(54) DISPLAY HAVING OPAQUE MEMBER DISPOSED IN AREA SURROUNDED BY PIXELS AND ELECTRONIC APPARATUS HAVING THE SAME

(71) Applicant: Samsung Electronics Co., Ltd., Gyeonggi-do (KR)

(72) Inventors: Songhee Jung, Gyeonggi-do (KR); Yongkoo Her, Gyeonggi-do (KR); Sungyoung Shin, Gyeonggi-do (KR); Byungduk Yang, Gyeonggi-do (KR); Harksang Kim, Gyeonggi-do (KR); Hyunchang Shin, Gyeonggi-do (KR); Joongyu Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/382,464

(22) Filed: Apr. 12, 2019

(65) Prior Publication Data
US 2019/0317629 A1    Oct. 17, 2019

(30) Foreign Application Priority Data

Apr. 13, 2018  (KR) .................. 10-2018-0043553
Nov. 2, 2018   (KR) .................. 10-2018-0133600

(51) Int. Cl.
*G06F 3/047*      (2006.01)
*G06F 3/041*      (2006.01)
*G06F 3/0488*     (2013.01)

(52) U.S. Cl.
CPC ............ *G06F 3/047* (2013.01); *G06F 3/0412* (2013.01); *G06F 3/0488* (2013.01)

(58) Field of Classification Search
CPC .... G06F 1/1684; G06F 3/0412; G06F 3/0488; G06F 1/1643; G06F 3/047; H04M 1/0266
See application file for complete search history.

(56) References Cited

U.S. PATENT DOCUMENTS

| 9,640,681 B2 | 5/2017 | Min |
| 10,171,636 B2 | 1/2019 | Yeo et al. |
| 2007/0146578 A1* | 6/2007 | Yabuta .................. G02F 1/1347 349/96 |

(Continued)

FOREIGN PATENT DOCUMENTS

| EP | 3428967 A1 | 1/2019 |
| JP | 2013-15740 A | 1/2013 |

(Continued)

OTHER PUBLICATIONS

International Search Report dated Jul. 26, 2019.
European Search Report dated Sep. 2, 2019.
Indian Search Report dated Feb. 12, 2021.

*Primary Examiner* — Abbas I Abdulselam
(74) *Attorney, Agent, or Firm* — Cha & Reiter, LLC.

(57) ABSTRACT

An electronic device according to certain embodiments may include: a sensor, a display panel including a sensor area overlaying or underlying the sensor and a pixel area including at least one pixel and a drive wiring line configured to drive the at least one pixel while surrounding the sensor area, a window disposed over the display panel, and one or more opaque members disposed between the sensor and the window and along an edge of the sensor area.

20 Claims, 61 Drawing Sheets

(56) References Cited

U.S. PATENT DOCUMENTS

| | | | |
|---|---|---|---|
| 2011/0148781 A1* | 6/2011 | Chen | G06F 3/0412 |
| | | | 345/173 |
| 2012/0050193 A1* | 3/2012 | Noguchi | G02F 1/13338 |
| | | | 345/173 |
| 2012/0105400 A1 | 5/2012 | Mathew et al. | |
| 2014/0253477 A1* | 9/2014 | Shim | G06F 3/0487 |
| | | | 345/173 |
| 2015/0241732 A1 | 8/2015 | Kim et al. | |
| 2015/0378197 A1* | 12/2015 | Liu | H04M 1/0266 |
| | | | 349/96 |
| 2016/0011633 A1 | 1/2016 | Watanabe et al. | |
| 2016/0147346 A1 | 5/2016 | Lee et al. | |
| 2016/0240119 A1* | 8/2016 | Pance | G09G 3/20 |
| 2017/0090517 A1* | 3/2017 | Park | H05K 3/12 |
| 2017/0251290 A1 | 8/2017 | Yang et al. | |
| 2017/0287992 A1 | 10/2017 | Kwak et al. | |
| 2018/0337219 A1 | 11/2018 | Rhee et al. | |

FOREIGN PATENT DOCUMENTS

| | | |
|---|---|---|
| JP | 2013-247672 A | 12/2013 |
| JP | 2014-153483 A | 8/2014 |
| KR | 10-2014-0118372 A | 10/2014 |
| KR | 10-2017-0111827 A | 10/2017 |
| KR | 10-2017-0112790 A | 10/2017 |
| KR | 10-2017-0113066 A | 10/2017 |
| KR | 10-2018-0026288 A | 3/2018 |
| KR | 10-2018-0126883 A | 11/2018 |

\* cited by examiner

DISPLAY HAVING OPAQUE MEMBER DISPOSED IN AREA SURROUNDED BY PIXELS AND ELECTRONIC APPARATUS HAVING THE SAME

CROSS-REFERENCE TO RELATED APPLICATION(S)

This application is based on and claims priority under 35 U.S.C. 119 to Korean Patent Application Nos. 10-2018-0043553 & 10-2018-0133600, filed on Apr. 13, 2018 & Nov. 2, 2018, in the Korean Intellectual Property Office, the disclosures of which are herein incorporated by reference in their entireties.

BACKGROUND

1) Field

Certain embodiments relate to a display including an opaque member disposed in an area surrounded by a plurality of pixels and an electronic device having the same.

2) Description of Related Art

The above information is presented as background information only to assist with an understanding of the disclosure. No determination has been made, and no assertion is made, as to whether any of the above might be applicable as prior art with regard to the disclosure.

An electronic device includes at least one display. The display is an output device, and displays various contents. The display is implemented with a touch screen, and detects various touch operations. As technology advances, there is a demand for a screen having the maximum size that can be secured on the front face of an electronic device. Therefore, efforts have been made to increase the proportion of the area in which a screen is displayed in a display arranged in an electronic device.

SUMMARY

However, such an electronic device is limited in expanding an area where a screen is displayed in a display. This is because various sensors are employed on the front face of the electronic device. That is, some areas in the display are being provided for sensors.

An electronic device according to certain embodiments may include: a sensor; a display panel including a sensor area overlaying or underlying the sensor and a pixel area including at least one pixel and a drive wiring line configured to drive the at least one pixel while surrounding the sensor area; a window disposed over the display panel; and one or more opaque members disposed between the sensor and the window and along an edge of the sensor area.

A display according to certain embodiments may include: a window; a display panel disposed under the window; and an optically clear adhesive layer disposed between the display panel and the window.

According to certain embodiments, the display panel may include: a pixel layer including a plurality of pixels, and further including a transparent area which is surrounded by the plurality of pixels configured to transmit light to a sensor; and a substrate having a drive wiring line disposed thereon and connected to at least one of the pixels, at least a part thereof being disposed along a peripheral area of the transparent area, and wherein the display includes a first opaque member disposed between the window and the display panel.

An electronic device according to certain embodiments may include at least one sensor and a display.

According to certain embodiments, the display may include a sensor area under which a sensor is aligned, and a pixel area including a plurality of pixels and a drive wiring line formed therein.

According to certain embodiments, the pixel area may include a peripheral area that surrounds the sensor area and does not include pixels disposed therein, at least a part of the drive wiring line extending in the peripheral area.

According to certain embodiments, it is possible to obtain a screen of the maximum size that can be secured on the front face of an electronic device. That is, it is possible to maximally expand the area in which a screen is displayed on the display while adopting various sensors on the front face of the electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments disclosed herein will be described with reference to the accompanying drawings.

Figure 1:
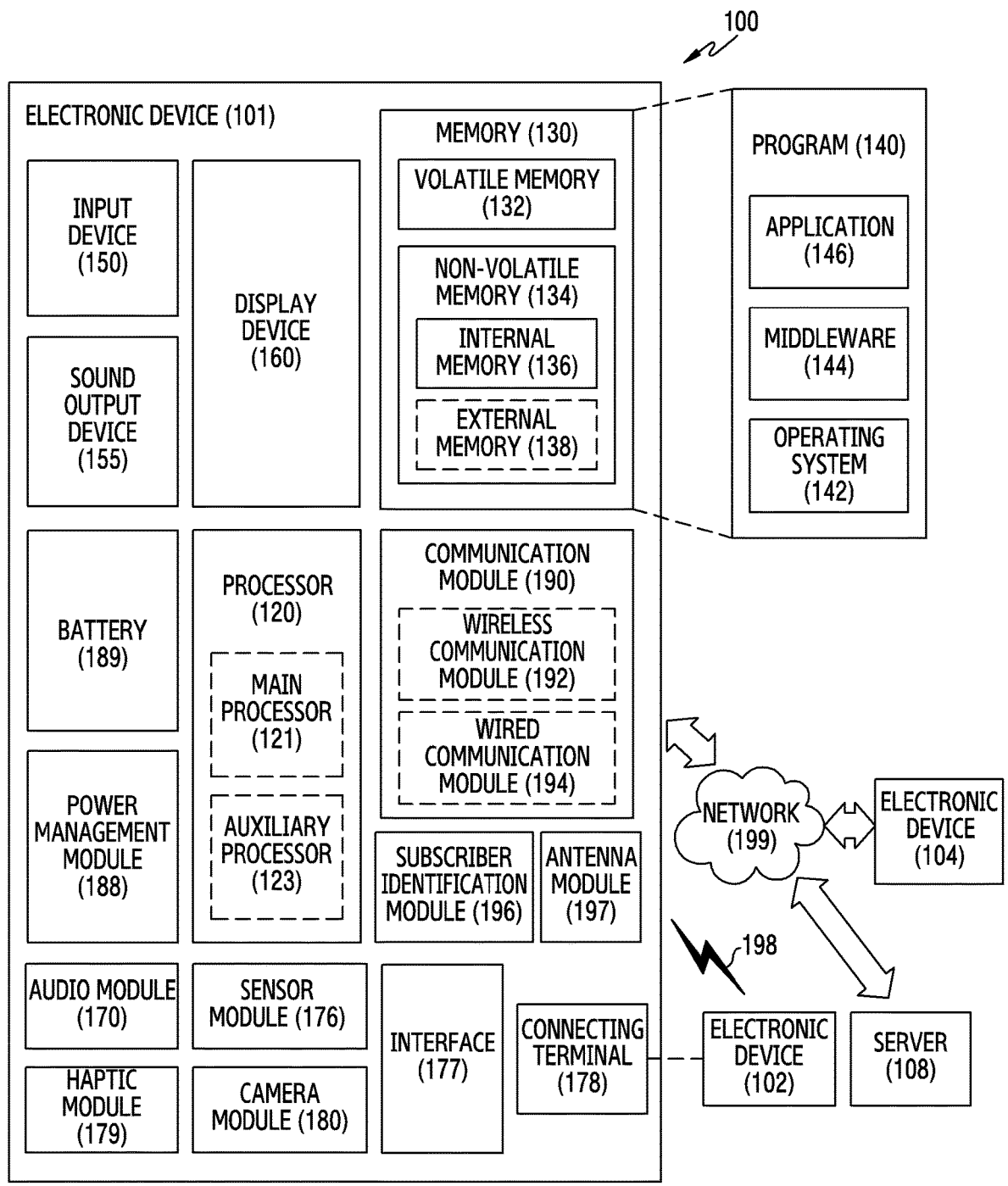
FIG. 1 is a block diagram of an electronic device 101, including a display including an opaque member disposed in an area surrounded by a plurality of pixels, according to certain embodiments, in a network environment 100.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include one or more processors 120 (unless the context clearly indicates otherwise, the term "processor" regardless of use in the singular shall be understood to mean one or more processors), memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The display device 160 will be described in greater detail below.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
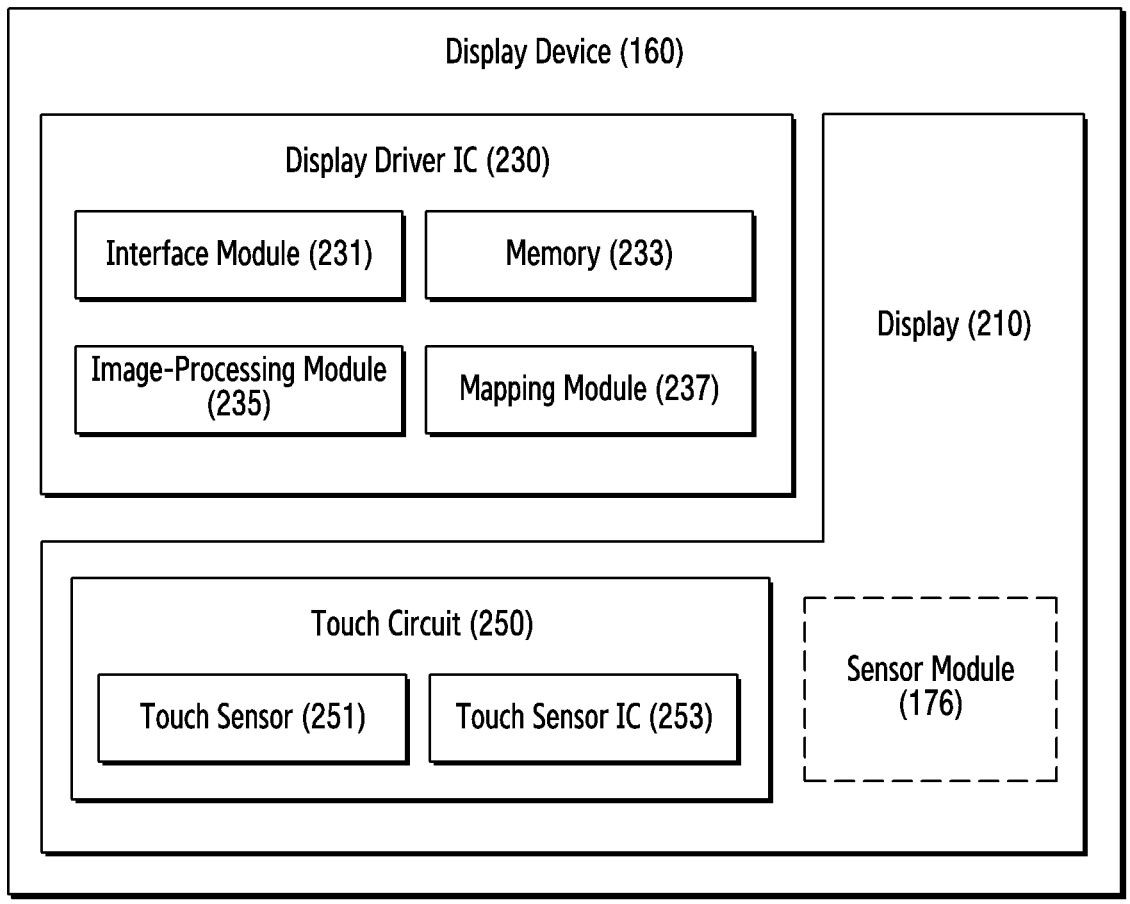
FIG. 2 is a block diagram 200 of a display device 160, including a display including an opaque member disposed in an area surrounded by a plurality of pixels, according to certain embodiments.

FIG. 2 is a display device 160, including a display including an opaque member disposed in an area surrounded by a plurality of pixels, according to certain embodiments.

The display device 160 includes a Display Device Integrated Circuit (DDI) 230, a Touch Circuit 250, and a Display 210 and a sensor module 176. The DDIC 230 provides signals representing content to be displayed on the display 210. The display 210 comprises picture elements (pixels) that are capable of displaying a particular color and intensity. The pixels of the display 210 can together output images and graphics. The touch circuit 250 overlays the display 210 and detects a user touch, and the location of the user touch. For example, the DDIC 230 can cause the display 210 to display a graphical user interface including a button. A touch circuit 250 can detect a user touching the display 210 in a particular position. The location of the touch can be provided to the processor which can be then determine, for example, that the user has pressed the button.

Additionally, the sensor module 176 can be embedded in the display 210, the DDI 230, or the touch circuit 250.

The DDI 230 may include an interface module 231, a memory 233 (e.g., a buffer memory), an image-processing module 235, or a mapping module 237. The DDI 230 may receive, for example, image data, or image information including a video control signal corresponding to a command for controlling the image data, from other components of the electronic device 101 through the interface module 231. For example, according to an embodiment, the image information may be received from a processor 120 (e.g., a main processor 121 such as an application processor), or an auxiliary processor 123 (e.g., a graphic processing device) operated independently from the function of the main processor 121. The DDI 230 may communicate with the touch circuit 250, the sensor module 176, or the like through the interface module 231. In addition, the DDI 230 may store at least a part of the received image information in the memory 233, for example, on a frame-by-frame basis. The image-processing module 235 may perform a pre-processing or post-processing (e.g., resolution, brightness, or size adjustment) on at least a part of the image data based at least on the characteristics of the image data or the characteristics of the display 210. The mapping module 237 may generate a voltage value or a current value corresponding to the image data pre-processed or post-processed through the image-processing module 135. According to an embodiment, the generation of the voltage value or the current value may be performed based at least on, for example, the attributes of the pixels of the display 210 (e.g., the array of pixels (an RGB stripe or Pentile structure) or the size of each of sub-pixels. At least some of the pixels of the display 210 are driven based, at least in part, on, for example, the voltage value or the current value, so that visual information (e.g., text, an image, or an icon) corresponding to the image data can be displayed through the display 210.

According to an embodiment, the display device 260 may further include a touch circuit 250. The touch circuit 250 may include a touch sensor 251 and a touch sensor IC 253 configured to control the touch sensor 251. The touch sensor IC 253 may control the touch sensor 251 to detect, for example, a touch input or a hovering input with respect to a specific position on the display 210. For example, the touch sensor IC 253 may detect a touch input or a hovering input by measuring a change in a signal (e.g., voltage, light amount, resistance, or charge amount) with respect to a specific position on the display 210. The touch sensor IC 253 may provide the processor 120 with information about the sensed touch input or hovering input (e.g., position, area, pressure, or time). According to an embodiment, at least a part of the touch circuit 250 (e.g., the touch sensor IC 253) may be included as a part of the display driver IC 230 or the display 210 or a part of another component (e.g., an auxiliary processor 123) disposed outside the display device 160.

According to an embodiment, the display device 160 may further include at least one sensor (e.g., a fingerprint sensor, an iris sensor, a pressure sensor, or an illuminance sensor) of a sensor module 176, or a control circuit therefor. In this case, the at least one sensor or control circuit may be embedded in a portion of the display device 160 (e.g., the display 210 or the DDI 230) or a portion of the touch circuit 250. For example, when the sensor module 176 embedded in the display device 160 includes a biosensor (e.g., a fingerprint sensor), the biosensor may acquire biometric information (e.g., a fingerprint image) associated with a touch input through a portion of the display 210. As another example, when the sensor module 176 embedded in the display device 160 includes a pressure sensor, the pressure sensor acquires pressure information associated with a touch input through all or a part of the area of the display 210. According to an embodiment, the touch sensor 251 or the sensor module 176 may be disposed between pixels of the pixel layer of the display 210, or may be disposed above or below the pixel layer.

Figure 3A:
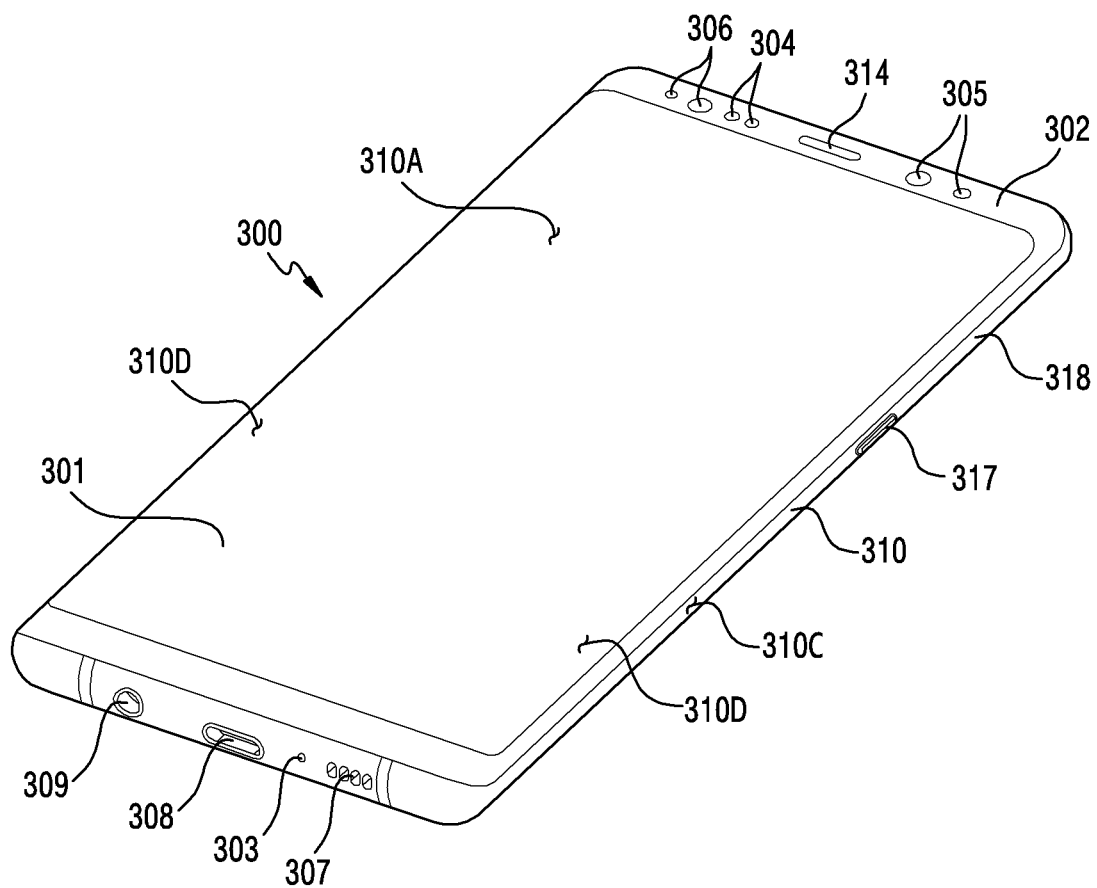
FIG. 3A is a front perspective view of an electronic device according to an embodiment.
Figure 3B:
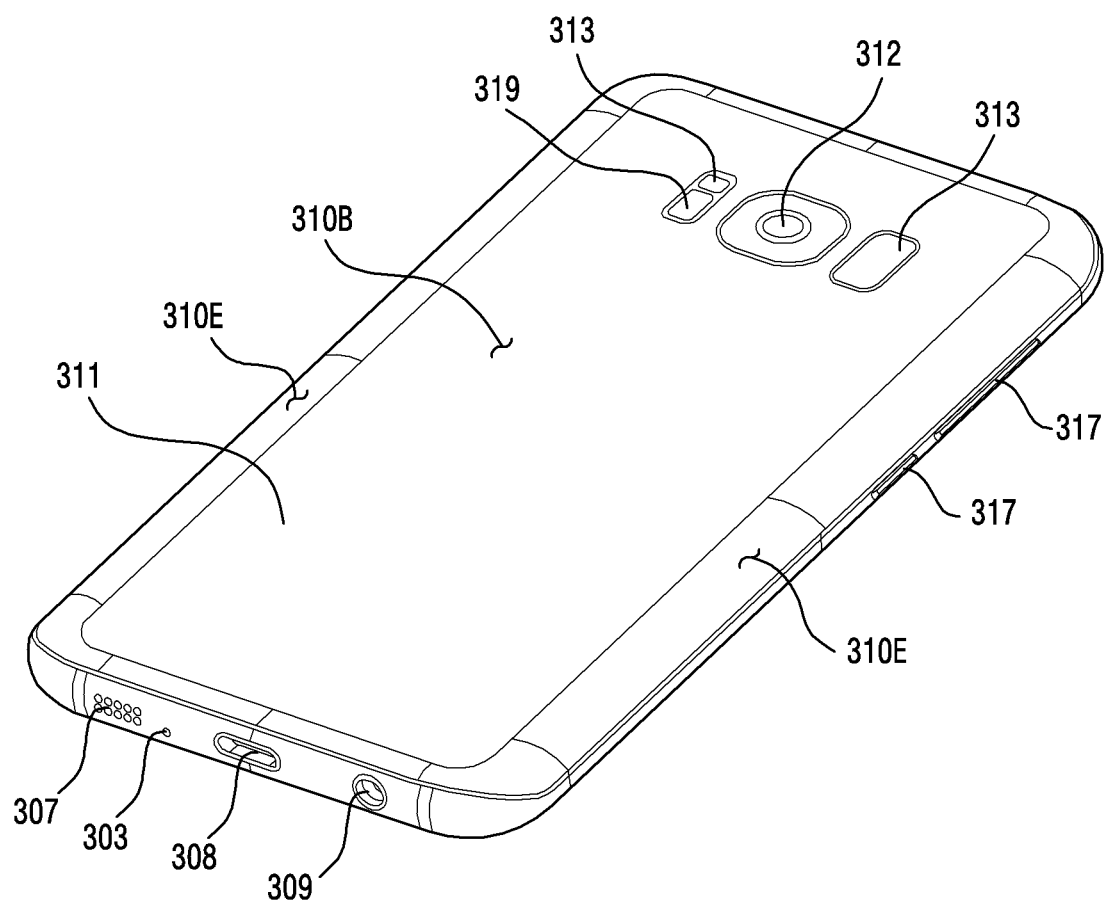
FIG. 3B is a rear perspective view of the electronic device of FIG. 3A.

In certain embodiments, the display device 160 can be exposed through a portion of a front plate of and electronic device. FIGS. 3A and 3B show a display device forming a portion of the housing of an electronic device.

FIG. 3A is a front perspective view of an electronic device 300 (e.g., the electronic device 101 in FIG. 1) according to an embodiment. FIG. 3B is a rear perspective view of the electronic device 300 of FIG. 3A.

Referring to FIGS. 3A and 3B, an electronic device 300 according to an embodiment may include: a housing 310 including a first face (or a front face) 310A, a second face (or a rear face) 310B, and a side face 310C surrounding a space between the first face 310A and the second face 310B. In another embodiment (not illustrated), the term "housing" may refer to a structure forming a part of the first face 310A, the second face 310B, and the side face 310C in FIG. 3A. According to an embodiment, at least a part of the first face 310A may be formed by a substantially transparent front plate 302 (e.g., a glass plate or a polymer plate including various coating layers). The second face 310B may be formed by a substantially opaque rear plate 311. The rear plate 311 may be formed of, for example, coated or colored glass, ceramic, polymer, or metal (e.g., aluminum, stainless steel (STS), or magnesium), or a combination of two or more of these materials. The side face 310C may be formed by a side bezel structure (or a "side member") 318 coupled to the front plate 302 and the rear plate 311 and including a metal and/or a polymer. In some embodiments, the rear plate 311 and the side bezel structure 318 may be integrally formed, and may include the same material (e.g., a metal material such as aluminum).

In the illustrated embodiment, the front plate 302 may include, at the long opposite side edges thereof, two sensor areas 310D, which are bent from the first face 310A toward the rear plate 311 and extend seamlessly. In the illustrated embodiment (see FIG. 3B), the rear plate 311 may include, at the long opposite side edges thereof, two pixel areas 310E, which are bent from the second face 310B toward the front plate 302 and extend seamlessly. In some embodiments, the front plate 302 (or the rear plate 311) may include only one of the sensor areas 310D (or the pixel areas 310E). In another embodiment, some of the sensor areas 310D and the pixel areas 310E may not be included. In the above embodiments, when viewed from a side of the electronic device 300, the side bezel structure 318 may have a first thickness (or width) on the side face in which the sensor areas 310D or the pixel areas 310E are not included, and may have a second thickness (or width), which is thinner than the first thickness, on the side in which the sensor areas 310D or the pixel areas 310E are included.

According to an embodiment, the electronic device 100 may include one or more of a display 301, audio modules 303, 307, and 314, sensor modules 304, 316, and 319, camera modules 305, 312, and 313, key input devices 317, light-emitting elements 306, and connector holes 308 and 309. In some embodiments, in the electronic device 300, at least one of the components (e.g., the key input devices 317 or the light-emitting elements 306) may be omitted, or other components may be additionally included.

The display 301 may be exposed through a substantial portion of, for example, the front plate 302. In some embodiments, at least a part of the display 301 may be exposed through the front plate 302 forming the first face 310A and the sensor areas 310D of the side faces 310C. In some embodiments, the edges of the display 301 may be formed to be substantially the same as the adjacent contours of the front plate 302. In another embodiment (not illustrated), the distance between the outer contour of the display 301 and the outer contour of the front plate 302 may be substantially constant in order to enlarge the exposed area of the display 301.

In another embodiment (not illustrated), a recess or an opening is disposed in a portion of a screen display area of the display 301, and at least one of an audio module 314, a sensor module 304, a camera module 305, and a light-emitting element 306 may be aligned with the recess or the opening. In another embodiment (not illustrated), the rear face of the screen display area of the display 301 may include at least one of an audio module 314, a sensor module 304, a camera module 305, a fingerprint sensor 316, and a light-emitting element 306. In another embodiment (not illustrated), the display 301 may be coupled to or disposed adjacent to a touch-sensing circuit, a pressure sensor capable of measuring the intensity of touch (pressure), and/or a digitizer that detects a magnetic field-type stylus pen. In some embodiments, at least some of the sensor modules 304 and 319 and/or at least some of the key input devices 317 may be disposed in the sensor areas 310D and/or the pixel areas 310E.

The audio modules 303, 307, and 314 may include a microphone hole 303 and speaker holes 307 and 314. The microphone hole 303 may include a microphone disposed therein so as to acquire external sound, and in some embodiments, a plurality of microphones may be disposed therein so as to detect the direction of sound. The speaker holes 307 and 314 may include an external speaker hole 307 and a receiver hole for phone call 314. In some embodiments, the speaker holes 307 and 314 and the microphone hole 303 may be implemented as a single hole, or a speaker may be included therein without forming the speaker holes 307 and 314 (e.g., a piezo speaker).

The sensor modules 304, 316, and 319 may generate electrical signals or data values corresponding to an internal operating state or an external environmental condition of the electronic device 300. The sensor modules 304, 316, and 319 may include, for example, a first sensor module 304 (e.g., a proximity sensor) and/or a second sensor module (not illustrated) (e.g., a fingerprint sensor) disposed on the first face 310A of the housing 310, and/or a third sensor module 319 (e.g., an HRM sensor) and/or a fourth sensor module 316 (e.g., a fingerprint sensor) disposed on the second face 310B of the housing 310. The fingerprint sensor may be disposed not only on the first face 310A of the housing 310 (e.g., the display 301), but also on the second face 310B. The electronic device 300 may further include at least one of sensor modules (not illustrated) such as a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, and an illuminance sensor 304.

The camera modules 305, 312, and 313 may include a first camera device 305 disposed on the first face 310A of the electronic device 300 and a second camera device 312 disposed on the second face 310B thereof, and/or a flash 313. The camera devices 305 and 312 may include one or more lenses, an image sensor, and/or an image signal processor. The flash 313 may include, for example, a light-emitting diode or a xenon lamp. In some embodiments, two or more lenses (e.g., an infrared camera lens, a wide-angle lens, and a telephoto lens) and image sensors may be disposed on one face of the electronic device 300.

The key input devices 317 may be disposed on the side surfaces 310C of the housing 310. In another embodiment, the electronic device 300 may not include some or all of the above-mentioned key input devices 317, and a non-included key input device 317 may be implemented in another form such as a soft key on the display 301. In some embodiments, the key input devices may include a sensor module 316 disposed on the second face 310B of the housing 310.

The light-emitting element 306 may be disposed, for example, on the first face 310A of the housing 310. The light-emitting element 306 may provide, for example, status information of the electronic device 300 in an optical form. In another embodiment, the light-emitting element 306 may provide a light source that is interlocked with, for example, the operation of the camera module 305. The light-emitting element 306 may include, for example, an LED, an IR LED, and a xenon lamp.

The connector holes 308 and 309 may include a first connector hole 308 capable of accommodating a connector (e.g., a USB connector) for transmitting and receiving power and/or data to and from an external electronic device, and/or a second connector hole 309 capable of receiving a connector (e.g., an earphone jack) for transmitting and receiving an audio signal to and from an electronic device.

To maximize the displayable area of the electronic device, in certain embodiments, the display may include pixels that surround the sensors. The display can include a pixel area and sensor areas. The sensor areas can be disposed directly above the sensors.

Figure 4:
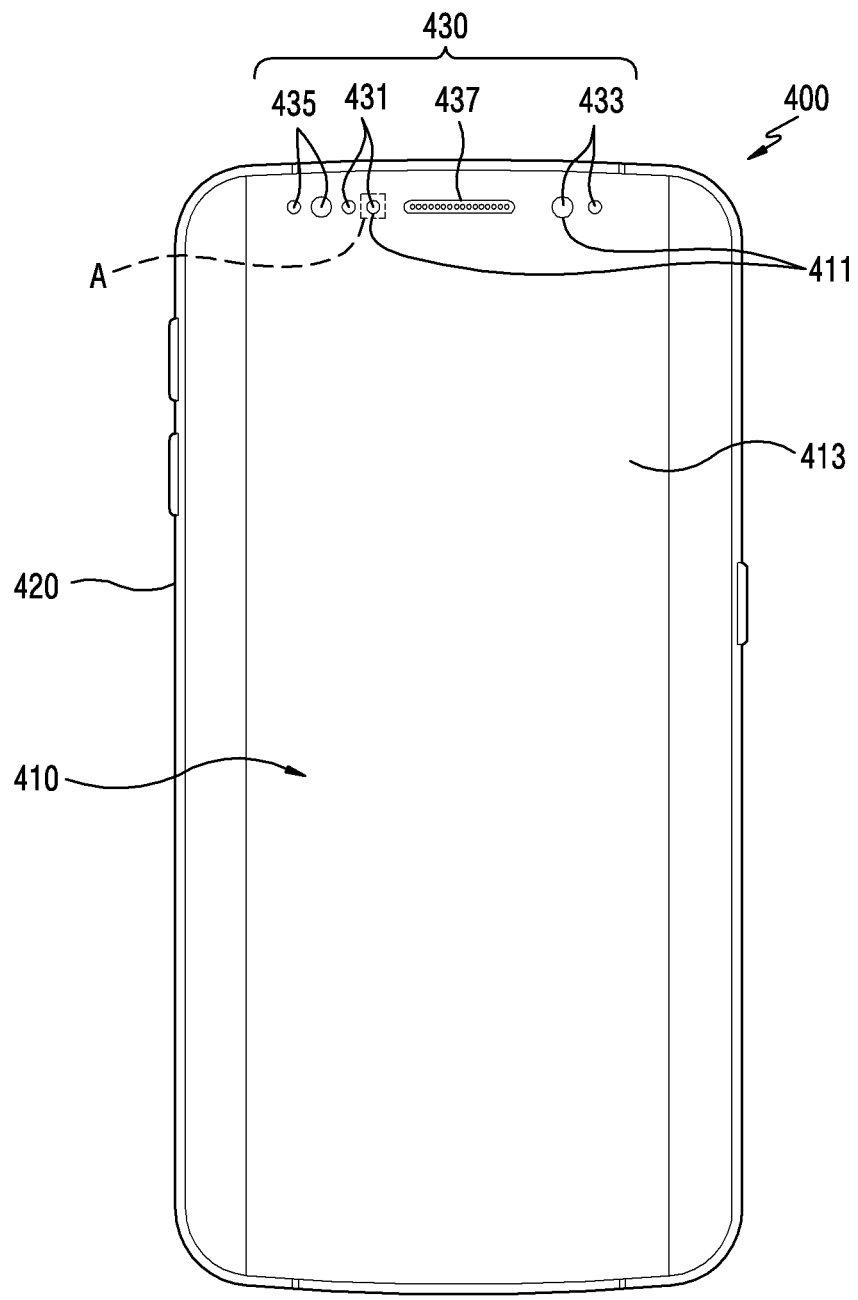
FIG. 4 is a front view of an electronic device according to certain embodiments.
Figure 5A:
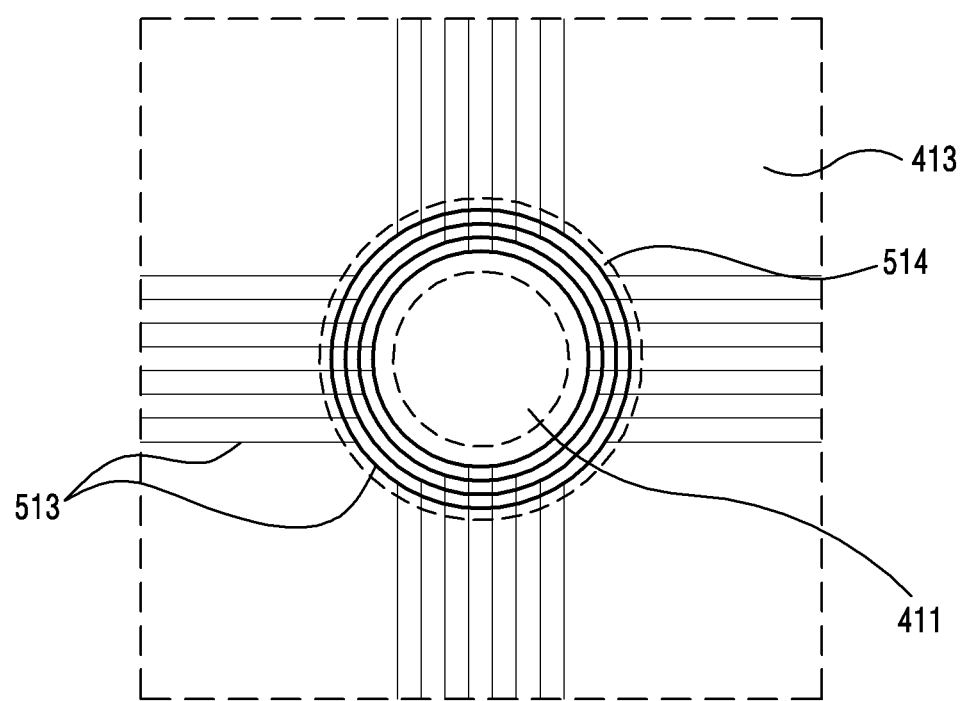
FIG. 5A is an exemplary view of drive wiring lines in the display of FIG. 4.
Figure 5B:
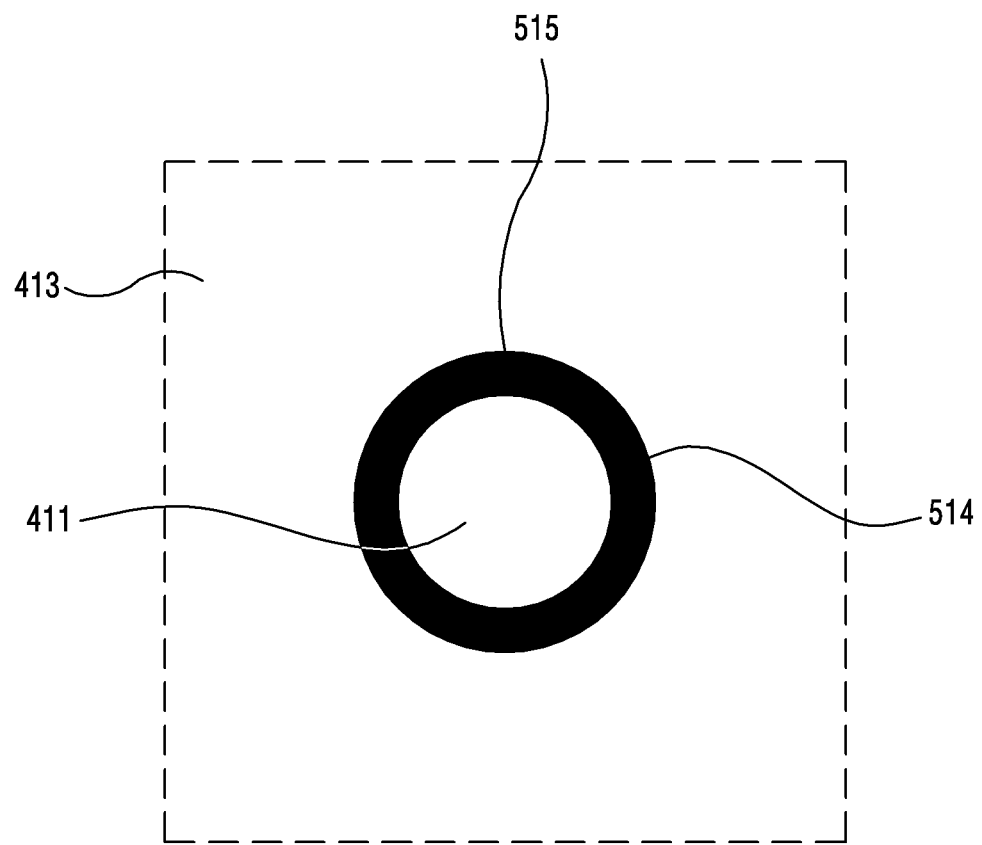
FIG. 5B is an exemplary view of an opaque member of area A in the display of FIG. 4.

FIG. 4 is a front view of an electronic device 400 according to certain embodiments. FIG. 5A is an exemplary view of drive wiring lines 513 in the display 410 of FIG. 4. FIG. 5B is an exemplary view of an opaque member 515 of area A in the display 410 of FIG. 4.

Referring to FIG. 4, the electronic device 400 according to certain embodiments may include at least one of a display 410, a front plate 420, or at least one sensor 430. At least one of the components of the electronic device 400 may be the same as or similar to at least one of the components of the electronic device 300 of FIG. 3A or 3B, and a redundant description thereof is omitted below.

The display 410 may be exposed through a substantial portion of the front plate 420. That is, at least a part of the display 410 may be exposed through the front plate 420. In some embodiments, the edges of the display 410 may be formed to be substantially the same as the shape of the contours adjacent thereto in the front plate 420. Through this, the entire front surface of the electronic device 400 may be the screen display area of the display 410. For example, the display 410 may be a Light-Emitting Diode (LED) display, an Organic Light-Emitting Diode (OLED) display, a Liquid Crystal Display (LCD), a MicroElectroMechanical systems (MEMS) display, or an electronic paper display.

The display 410 may expose the sensor 430. The sensor 430 may be disposed opposite the front plate 420 with respect to the display 410. That is, the sensor 430 may be disposed on the rear side of the screen display area of the display 410. The sensor 430 may include at least one of a sensor module 431, a camera module 433, a light-emitting element 435, and an audio module 437. In some embodiments, at least a part of the sensor 430 may be disposed through at least a part of the display 410. To this end, the display 410 may include a recess or opening disposed to allow the sensor 430 to be inserted therein.

The display 410 may include one or more sensor areas 411 and pixel areas 413. The one or more sensor areas 411 are a part of the screen display area, and may correspond to (including overlaying or underlying) sensor(s) 430. The sensor areas 411 may be a transparent area, and may allow light received from the outside of the electronic device 400 to pass therethrough to the sensor 430. A "transparent area" shall be understood to also include a hole or other void. In some embodiments, the sensor areas 411 may be formed as recesses or openings. The pixel area 413 may be a remaining area of the screen display area, and may display various contents (e.g., text, image, video, icons, or symbols). The pixel area 413 may surround the one or more screen areas 411. The pixel area 413 may include at least one of one or more pixels (not illustrated) configured to display colors and drive wiring lines 513 configured to drive the pixels. The drive wiring lines 513 are connected to the pixels, and may extend in the form of a straight line while maintaining a predetermined space therebetween in the pixel area 413. The drive wiring lines 513 may be vertically stacked in the pixel area 413. In the display 410, a designated area may be defined. At least a part of the designated area may be provided as the sensor area 411. As an example, the designated area may be provided as the sensor area 411. As another example, the designated area may be provided to include the sensor area 411 and a peripheral area 514 of the sensor area 411 in the pixel area 413.

The drive wiring lines 513 in the pixel area 413 may extend while surrounding at least a part of the sensor area 411 pixel area, as illustrated in FIG. 5A. The drive wiring lines 513 may extend by bypassing the sensor area 411 in the pixel area 413 so as not to extend in the sensor area 411. Through this, in certain embodiments, it is possible to ensure at least one of transmittance and transparency of the sensor area 411 in the display 410. Since the drive wiring lines 513 are densely wired in the peripheral area 514 of the sensor area 411, the drive wiring lines 513 may be transmitted so as to be visible outside the electronic device 400 in the peripheral area 514 of the sensor area 411.

The display 410 may include an opaque member 515. The opaque member 515 may be disposed in the peripheral area 514 of the sensor area 411 in the pixel area 413, as illustrated in FIG. 5B. The opaque member 515 may block at least a part of the peripheral area 514 of the sensor area 411 in the pixel area 413. Through this, the opaque member 415 may lower the transmittance of the peripheral area 514 of the sensor area 411 in the pixel area 413. For example, the opaque member 515 may be formed in a circular or polygonal annular shape.

Figure 6:
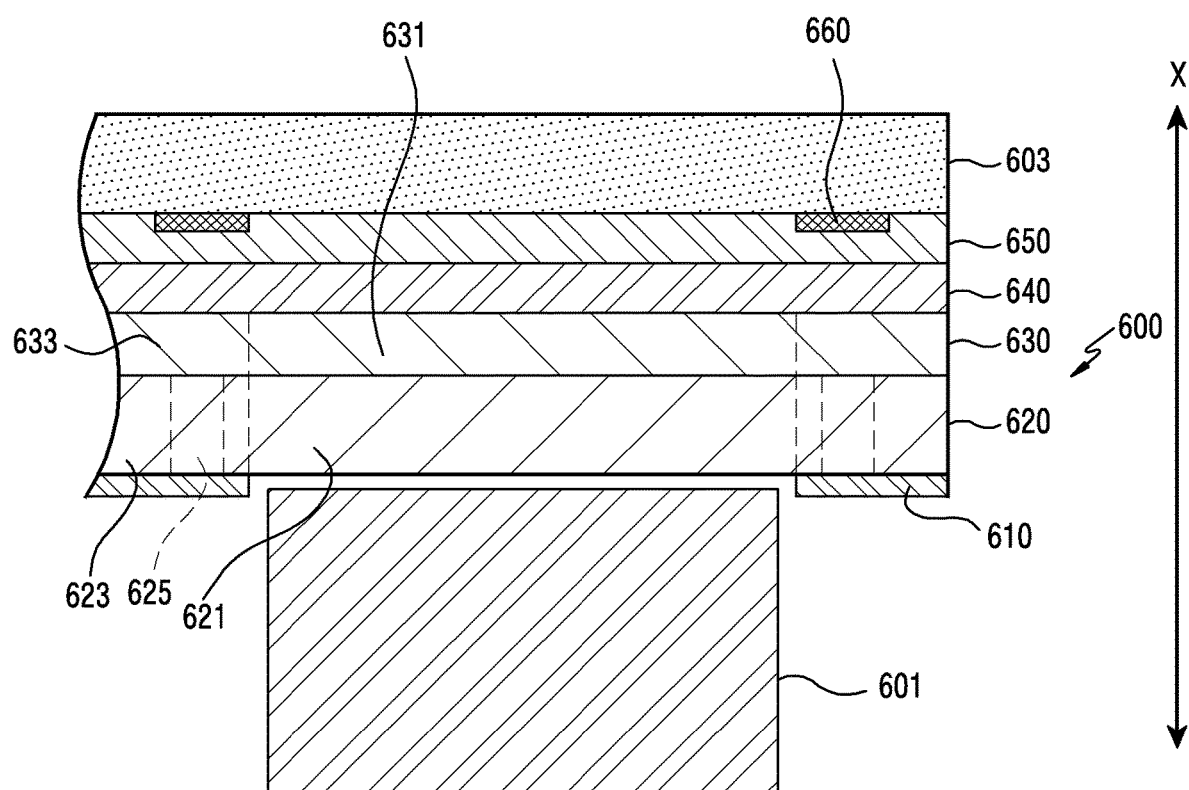
FIG. 6 is a cross-sectional view of a display according to a first embodiment.
Figure 7:
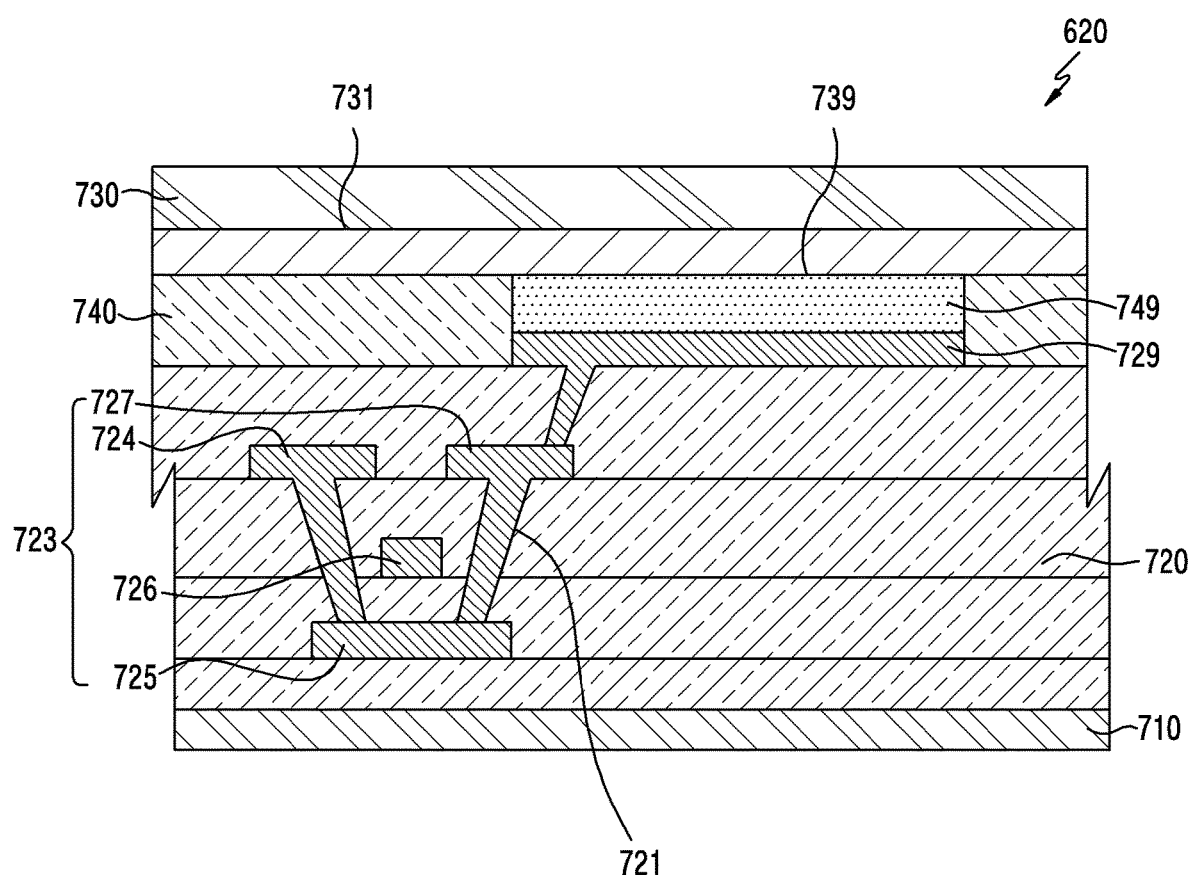
FIG. 7 is a cross-sectional view of the display panel in FIG. 6.
Figure 8:
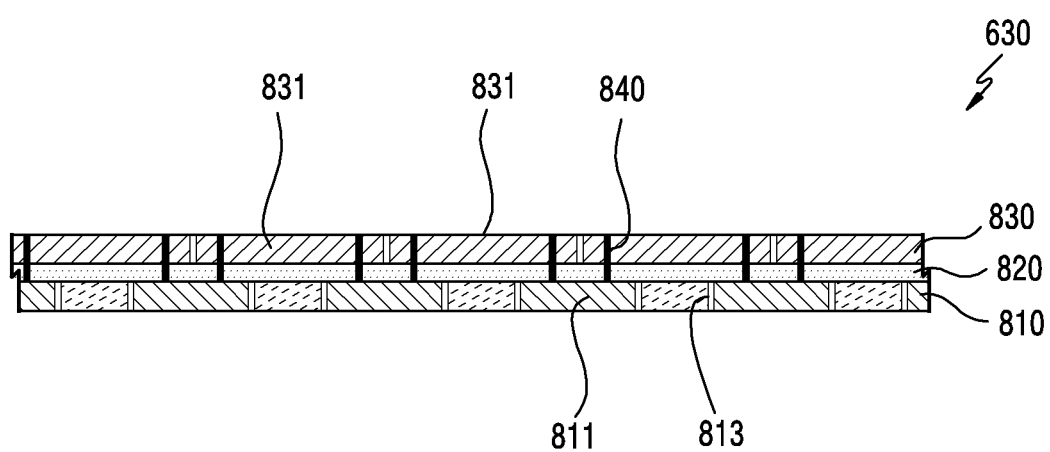
FIG. 8 is a cross-sectional view of the touch panel in FIG. 6.

FIG. 6 is a cross-sectional view of a display 600 (e.g., the display 410 in FIG. 4) according to the first embodiment. FIG. 7 is a cross-sectional view of the display panel 620 in FIG. 6. FIG. 8 is a cross-sectional view of the touch panel 630 in FIG. 6.

Referring to FIG. 6, the display 600 according to the first embodiment may be disposed between at least one sensor 601 (e.g., the sensor 430 in FIG. 4) and a window 603 (e.g., the front plate 102 in FIG. 3A or the front plate 420 in FIG. 4). The display 600 may include a support member 610, a display panel 620, a touch panel 630, a polarization member 640, an adhesive member 650, and an opaque member 660. The portion of the display panel 620 directly above the sensor 601 is the sensor area 621. At least one of the support member 610, the display panel 620, the touch panel 630, the polarization member 640, or the adhesive member 650 may be sequentially stacked along an axis X.

The support member 610 may support at least one of the display panel 620, the touch panel 630, the polarization member 640, the adhesive member 650, the opaque member 660, or the window 603. The support member 610 may protect the display panel 620 at a side opposite the window 602 with the display panel 620 interposed therebetween. For example, the support member 610 may include at least one of a black layer, a support layer, and a heat dissipation layer. The black layer may block light received through the display panel 620, for example, at least one of light emitted from the display panel 620 and light incident from the outside. As an example, the black layer may be formed to have an uneven surface. The support layer may relieve the pressure from the outside. As an example, the support layer may be formed of an elastic member. The heat dissipation layer may dissipate the heat generated from the display panel 620 to the outside. As an example, the heat dissipation layer may be formed of at least one of copper (Cu) and graphite.

The support member 610 may include at least one opening that opens facing the sensor 601. The opening may be arranged on the support member 610 to correspond to the sensor 601 along one axis X. The opening may allow light received through the display panel 621 to pass therethrough to the sensor 601. As an example, the opening may accommodate at least a part of the sensor 601.

The display panel 620 may be configured to display contents. The display panel 620 may include a sensor area 621 (e.g., the sensor area 411 in FIG. 4) and a pixel area 623 (e.g., the pixel area 413 in FIG. 4). The sensor area 621 and the pixel area 623 may be distinguished from each other on a plane perpendicular to the axis X. The sensor area 621 may be disposed on the display panel 620 to correspond to the sensor 601 along the axis X. For this purpose, the sensor area 621 may be disposed to correspond to the opening in the support member 610 along the axis X. For example, the size of the sensor area 621 may correspond to the size of the opening in the support member 610. Here, at least one of the size of the sensor area 621 and the size of the opening may be defined on a plane perpendicular to the axis X. The sensor area 621 may allow light received from the outside of the electronic device (e.g., the electronic device 400 in FIG. 4) to pass therethrough to the sensor 601. The pixel area 623 may include a peripheral area 625 of the sensor area 621.

As an example, the display panel 620 may include at least one of a protective member 710, a first substrate 720, a second substrate 730, or a pixel layer 740, as illustrated in FIG. 7. As another example, the display panel 620 may not include the protective member 710.

The protective member 710 may be disposed between the support member 610 and the first substrate 720. The protective member 710 may be in contact with the support member 610. In this way, the protective member 710 is able to protect the first substrate 720. For example, the protective member 710 may be formed of at least one of a polyethylene terephthalate (PET) material and a polyimide (PI) material.

The first substrate 720 may be stacked on the protective member 710 or the support member 610 along the axis X. The first substrate 720 may be in contact with any one of the protective member 710 and the support member 610. For example, the first substrate 720 may be formed of at least one of plastic, glass, and polyimide (PI). The first substrate 720 may include a first drive wiring line 721. The first drive wiring line 721 may extend inside the first substrate 720 or may extend along the outer surface of the first substrate 720. For example, the first drive wiring line 721 may be formed of a metal material containing at least one of Al, Si, Li, Ca, and Mg.

The first drive wiring line 721 may include at least one switch 723 and at least one anode 729. The switch 723 may be a Thin Film Transistor (TFT). The switch 723 may include at least one of a source electrode 724, a semiconductor element 725, a gate electrode 726, or a drain electrode 727. The source electrode 724 may supply electrons. The semiconductor device 725 may provide a path between the source electrode 724 and the drain electrode 727. The gate electrode 726 may switch the semiconductor device 725 so as to activate or deactivate the semiconductor device 725. When activated by the gate electrode 726, the semiconductor element 725 is able to move electrons from the source electrode 724 to the drain electrode 727. The drain electrode 727 is able to emit electrons supplied from the source electrode 724. The anode 729 may be connected to the drain electrode 727. The anode 729 may to be exposed to the surface of the first substrate 720 facing the second substrate 730 at the side opposite the support member 610 with respect to the first substrate 720. The anode 729 is able to emit electrons supplied from the drain electrode 727.

The second substrate 730 may be stacked on the first substrate 720 along the axis X. The second substrate 730 may be in contact with the first substrate 720. For example, the second substrate 730 may be formed of at least one of plastic, glass, and polyimide (PI). The second substrate 730 may include a second drive wiring line 731. The second drive wiring line 731 may extend inside the second substrate 730 or may extend along the outer surface of the second substrate 730. For example, the second drive wiring line 731 may be formed of at least one of indium tin oxide (ITO) and antimony tin oxide (ATO).

The second drive wiring line 731 may include at least one cathode 739. The cathode 739 may be exposed to the surface of the second substrate 730 facing the first substrate 720. The cathode 739 may be disposed on the second substrate 730 to correspond to the anode 729 of the first substrate 720 along the axis X. The cathode 739 may face the anode 739 to provide holes.

The pixel layer 740 may be disposed between the first substrate 720 and the second substrate 730. For example, the pixel layer 740 may be formed of at least one of plastic, glass, and polyimide (PI). The pixel layer 740 may include at least one pixel 749. The pixel 749 may be disposed between the anode 729 of the first substrate 720 and the cathode 739 of the second substrate 730. When electrons are supplied through the anode 729 of the first substrate 720, the electrons of the anode 729 and the holes of the cathode 739 in the pixel 749 can be coupled. Thereby, excitation energy is generated at the pixel 749, and the pixel 749 is able to generate light based on the excitation energy. The pixel 749 is able to generate light of a predetermined color. To this end, the pixel 749 may be formed of an organic luminous material.

The first drive wiring line 721 and the second drive wiring line 731 may extend in the pixel area 623 of the display panel 620. The first drive wiring line 721 and the second drive wiring line 731 may extend in the pixel area 623 while surrounding the sensor area 621. The first drive wiring line 721 and the second drive wiring line 731 may extend by bypassing the sensor area 621 in the pixel area 623 so as not to extend in the sensor area 621. The first drive wiring line 721 and the second drive wiring line 731 may surround the sensor area 621 in the peripheral area 625 of the pixel area 623. Through this, the first drive wiring line 721 and the second drive wiring line 731 can be densely wired in the peripheral area 625. As an example, the pixels 749 may be arranged in the pixel area 623 in the display panel 620. The pixels 749 may not be disposed in the sensor area 621, but may be disposed in the pixel area 623. As another example, the plurality of pixels 749 may be uniformly arranged in the sensor area 621 and the pixel area 623 in the display panel 620. As another example, in the display panel 620, the plurality of pixels 749 may be arranged in the sensor area 621 at a first density and in the pixel area 623 at a second density greater than the first density.

The touch panel 630 may be configured to detect a touch action. For this purpose, the touch panel 630 may include a touch electrode (not illustrated) configured to detect a touch action. For example, the touch action may include at least one of touch, gesture, proximity, or hovering of the user's body or an electronic pen with respect to the window 603. As an example, the touch panel 630 may be disposed between the display panel 620 and the polarization member 640. The touch panel 630 may transmit light received from the polarization member 640, and may transmit light received from the display panel 620. As another example, the touch panel 630 may be disposed between the window 603 and the polarization member 640. As another example, the touch panel 630 may be included in and integrated with the display panel 620.

The display 630 may include area overlaying the sensor area 631 and an area 633 overlaying the pixel area. The area overlaying the sensor area 631 and the area overlaying the pixel area 633 may be distinguished from each other on a plane perpendicular or orthogonal to the X-axis. The area overlaying the sensor area 631 may be disposed on the touch panel 630 to correspond (or overlay) the sensor 601 along the axis X. The area overlaying the sensor area 631 may be disposed to correspond to the sensor area 621 of the display panel 620. For example, the size of the area overlaying the sensor area 631 may correspond to at least one of the size of the opening in the support member 610 and the size of the sensor area 621 of the display panel 620. Here, at least one of the size of the area overlaying the sensor area 631, the size of the opening, and the size of the sensor area 621 may be defined on a plane perpendicular to the axis X. The area overlaying the sensor area 631 may allow light received from the outside of the electronic device (e.g., the electronic device 400 in FIG. 4) to pass therethrough to the sensor 601. As an example, touch electrodes may be formed not in the area overlaying the sensor area 631 but in the area overlaying the pixel area 633 in the touch panel 630. As another example, touch electrodes may be uniformly formed in the area overlaying the sensor area 631 and the area overlaying the pixel area 633 in the touch panel 630. As another example, the touch electrodes may be formed in at least a part of the area overlaying the sensor area 631 (e.g., the edge portion of the area overlaying the sensor area 631) and the area overlaying the pixel area 633.

For example, the touch panel 630 may include at least one of a conductive member 810, an insulating layer 820, an electrode layer 830, and a connection via 840, as illustrated in FIG. 8. At least one of the conductive layer 810, the insulating layer 820, and the electrode layer 830 may be sequentially stacked along the axis X.

The conductive layer 810 may include at least one of a conductive wiring line 811 and a conductive area 813. The conductive wiring line 811 and the conductive area 813 may be electrically separated from each other. The conductive wiring line 811 may be electrically connected to the electrode layer 830. The conductive area 813 is able to shield the display panel 620 from noise. For example, the conductive layer 810 may include both the conductive wiring line 811 and the conductive area 813. As another example, the conductive layer 810 may include the conductive wiring line 811, and may not include the conductive area 813. As another example, the touch panel 630 may further include an additional layer (not illustrated), and the additional layer may include the conductive area 813.

The insulating layer 820 may be disposed between the conductive layer 810 and the electrode layer 830 to electrically separate the conductive layer 810 and the electrode layer 820 from each other.

The electrode layer 830 may include a plurality of sensing electrodes 831. The sensing electrodes 831 may be arranged in a plurality of rows and columns. For example, the sensing electrodes 831 may include at least one transmission electrode and at least one reception electrode. As an example, the transmission electrode and the reception electrode may be arranged side by side on a plane perpendicular to the axis X. As another example, the transmission electrode and the reception electrode may be arranged at different heights along the axis X. To this end, the electrode layer 830 may include a first electrode layer (not illustrated) and a second electrode layer (not illustrated) that are separated along the axis X, the transmission electrode may be arranged in the first electrode layer, and the reception electrode may be arranged in the second electrode layer.

The connection via 840 may connect the sensing electrodes 831 to the conductive wiring line 811. For example, the connection via 840 may connect the transmission electrode and the reception electrode to the conductive wiring line 811. To this end, the connection via 840 may penetrate at least one of the conductive layer 810, the insulating layer 820, and the electrode layer 830.

The polarization member 640 may transmit the light received from the window 603. The polarization member 640 may transmit the light generated from the display panel 620.

The adhesive member 650 may adhere the polarization member 640 to the window 603. The adhesive member 650 may be transparent. For example, the adhesive member 650 may be formed of at least one of an Optically Clear Adhesive (OCA) or a Pressure-Sensitive Adhesive (PSA).

The opaque member 660 may reduce the transmittance corresponding to the peripheral area of the sensor 601. The opaque member 660 may lower the transmittance of the peripheral area 625 of the sensor area 621 in the pixel area 623 of the display panel 620. To this end, the opaque member 660 may be disposed between the window 603 and the adhesive member 650. The opaque member 660 may be disposed to correspond to the pixel area 623 while exposing at least a part of the sensor area 621 of the display panel 620 along the axis X. The opaque member 660 may be disposed to correspond to the peripheral area 625 of the display panel 620 along the axis X. As an example, the opaque member 660 may be disposed to correspond to the pixel area 623 so as not to overlap the sensor area 621 along the axis X. As another example, the opaque member 660 may be disposed to correspond to the pixel area 623 such that at least a part of the opaque member 660 overlaps the sensor area 621 along the axis X. The opaque member 660 may have attribute specified such that the drive wiring line of the peripheral area 625 is not visible. For example, the attribute may include at least one of transmittance, reflectance, and hue. As an example, the opaque member 660 may be formed of an opaque resin, ink, or the like.

For example, the size of the opaque member 660 may correspond to the size of the peripheral area 625. As an example, the width of the opaque member 660 may be equal to or greater than the width of the peripheral area 625. As another example, the width of the opaque member 660 may be less than the width of the perimeter area 625. For example, the opaque member 660 may be formed in a circular or polygonal annular shape.

Figure 9:
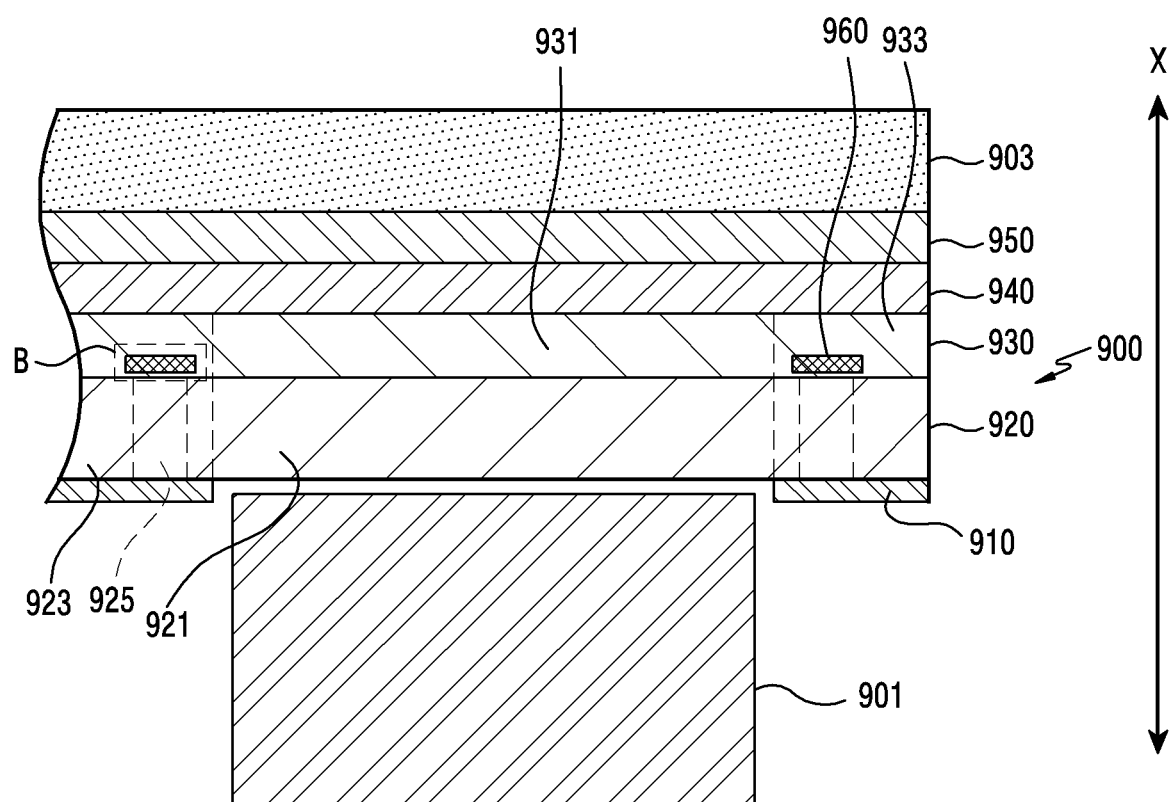
FIG. 9 is a cross-sectional view of a display according to a second embodiment.
Figure 10A:
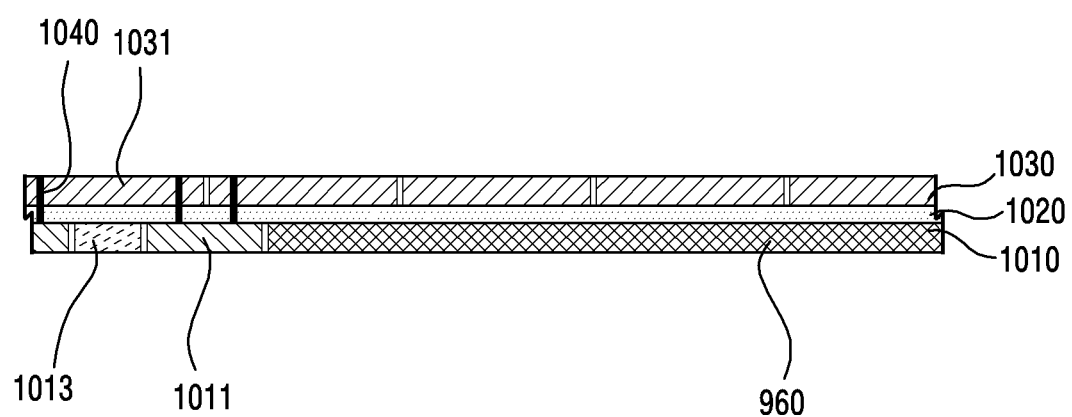
FIG. 10A is a sectional view of area B in FIG. 9.
Figure 10B:
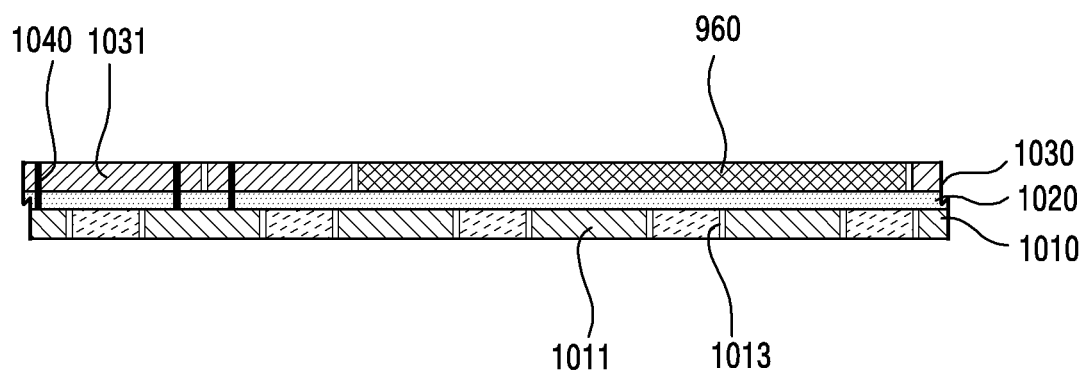
FIG. 10B is a sectional view of area B in FIG. 9.

FIG. 9 is a cross-sectional view of a display 900 (e.g., the display 410 in FIG. 4) according to the second embodiment. FIG. 10A is sectional views of area B in FIG. 9. FIG. 10B is sectional views of area B in FIG. 9. In this embodiment, the opaque layer 960 is disposed touch panel 930 in the area overlaying the pixel area 923 while surrounding the area overlaying the sensor area 931.

Referring to FIG. 9, the display 900 according to the second embodiment may be disposed between at least one sensor 901 (e.g., the sensor 430 in FIG. 4) and a window 903 (e.g., the front plate 302 in FIG. 3A or the front plate 420 in FIG. 4). The display 900 may include a support member 910, a display panel 920, a touch panel 930, a polarization member 940, an adhesive member 950, and an opaque member 960. At least one of the support member 910, the display panel 920, the touch panel 930, the polarization member 940, or the adhesive member 950 may be sequentially stacked along an axis X. At least one of the support member 910, the display panel 920, the touch panel 930, the polarization member 940, and the adhesive member 950 in the display 900 may be the same as or similar to at least one of the support member 610, the display panel 620, the touch panel 630, the polarization member 640, and the adhesive member 650 in the display 600 in FIG. 6, and a redundant description thereof is omitted below.

According to the display 900 according to the second embodiment, the opaque member 960 may reduce the transmittance corresponding to the peripheral area of the sensor 901. The opaque member 960 may be lower the transmittance of the peripheral area 925 (the peripheral area 625 in FIG. 6) of the sensor area 921 (e.g., the sensor area 411 in FIG. 4 or the sensor area 621 in FIG. 6) in the pixel area 923 (e.g., the pixel area 413 in FIG. 4 or the pixel area 623 in FIG. 6) of the display panel 920. To this end, the opaque member 960 may be disposed on the touch panel 930. The opaque member 960 may be disposed in the area 933 overlaying the pixel area 923 while exposing at least a part of the area 931 overlaying the sensor area 921 along the axis X in the touch panel 930. The opaque member 960 may have attributes specified such that the drive wiring line in the peripheral area 925 is not visible. For example, the attribute may include at least one of transmittance, reflectance, and hue. As an example, the opaque member 960 may be formed of an opaque resin, ink, or the like. As another example, the opaque member 960 may be formed of a metal used to form the touch electrode of the touch panel 930. The opaque member 960 may be formed while finely applying a metal (e.g., silver or copper) in order to form the touch electrodes of the touch panel 930.

As an example, the opaque member 960 may be disposed on a conductive layer 1010 (e.g., the conductive layer 810 in FIG. 8) of the touch panel 930 as illustrated in FIG. 10A. The opaque member 960 may be disposed on the conductive layer 1010 to correspond to the peripheral area 925 of the display panel 920. The opaque member 960 may be disposed on the conductive layer 1010 of the touch panel 930 to be electrically separated from a conductive wiring line 1011 (e.g., the conductive wiring line 811 in FIG. 8) and a conductive area 1013 (e.g., the conductive area 813 in FIG. 8). To this end, the conductive wiring line 1011 and the conductive area 1013 of the conductive layer 1010 may not be formed to correspond to the peripheral area 925 of the display panel 920. The opaque member 960 may be electrically separated from the electrode layer 1030 by an insulating layer 1020 (e.g., the insulating layer 820 in FIG. 8). In the touch panel 930, a connection via 1040 (e.g., the connection via 840 in FIG. 8) may not connect the opaque member 960 and the electrode layer 1030, but may connect sensing electrodes 1031 (e.g., the sensing electrodes 831) of the electrode layer 1030 to the conductive wiring line 1011.

As another example, the opaque member 960 may be disposed on the electrode layer 1030 of the touch panel 930 as illustrated in FIG. 10B. The opaque member 960 may be disposed on the electrode layer 1030 to correspond to the peripheral area 925 of the display panel 920. The opaque member 960 may be disposed on the electrode layer 1030 of the touch panel 930 to be electrically separated from the sensing electrodes 1031. To this end, at least one of the sensing electrodes 1031 of the electrode layer 1030 may not be formed to correspond to the peripheral area 925 of the display panel 920. The opaque member 960 may be electrically separated from the conductive layer 1010 by the insulating layer 1020. In the touch panel 930, a connection via 1040 may not connect the opaque member 960 and the conductive wiring line 1011, but may connect sensing electrodes 1031 of the electrode layer 1030 to the conductive wiring line 1011.

Figure 10C:
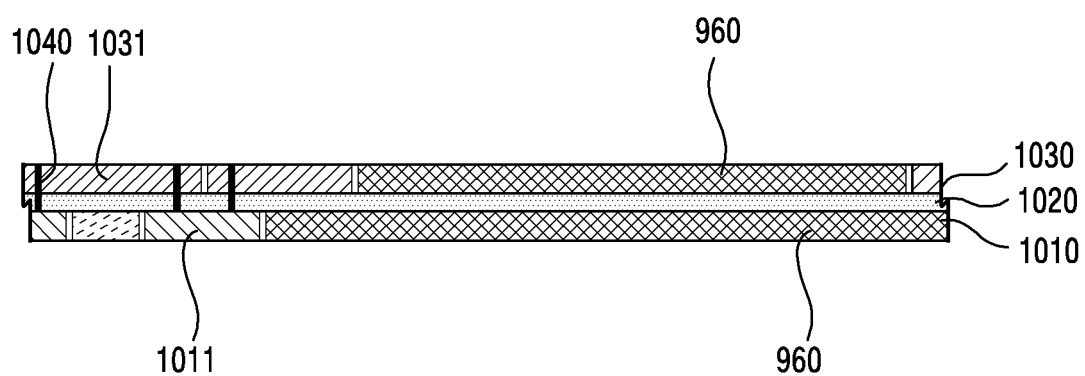
FIG. 10C is a sectional view of are B in FIG. 9.

As another example, the opaque member 960 may be disposed on the conductive layer 1010 and the electrode layer 1030 of the touch panel 930 as illustrated in FIG. 10C. The opaque member 960 may be disposed on the conductive layer 1010 to correspond to the peripheral area 925 of the display panel 920. The opaque member 960 may be disposed on the conductive layer 1010 of the touch panel 930 to be electrically separated from the conductive wiring line 1011, the conductive area 1013, and the sensing electrodes 1031. To this end, the conductive wiring line 1011 and the conductive area 1013 of the conductive layer 1010 may not be formed to correspond to the peripheral area 925 of the display panel 920. In addition, at least one of the sensing electrodes 1031 of the electrode layer 1030 may not be formed to correspond to the peripheral area 925 of the display panel 920. In the touch panel 930, a connection via 1040 may not connect the opaque member 960 to the electrode layer 1030 and the conductive wiring line 1011, but may connect sensing electrodes 1031 of the electrode layer 1030 to the conductive wiring line 1011.

As another example, the conductive layer 1010 may include the conductive wiring line 1011, and may not include the conductive area 1013. As another example, the touch panel 930 may further include an additional layer (not illustrated), and the additional layer may include the conductive area 1013.

The opaque member 960 may be disposed on the display panel to correspond (or to (or overlay) the pixel area 923 while exposing at least a part of the sensor area 921 of the display panel 920 along the axis X. The opaque member 960 may be disposed to correspond to the peripheral area 925 of the display panel 920 along the axis X. As an example, the opaque member 960 may be disposed to correspond to the pixel area 923 so as not to overlap the sensor area 921 along the axis X. As another example, the opaque member 960 may be disposed to correspond to the pixel area 923 such that at least a part of the opaque member 960 overlaps the sensor area 921 along the axis X. For example, the size of the opaque member 960 may correspond to the size of the peripheral area 925. As an example, the width of the opaque member 960 may be equal to or greater than the width of the peripheral area 925. As another example, the width of the opaque member 960 may be less than the width of the perimeter area 925.

Figure 11:
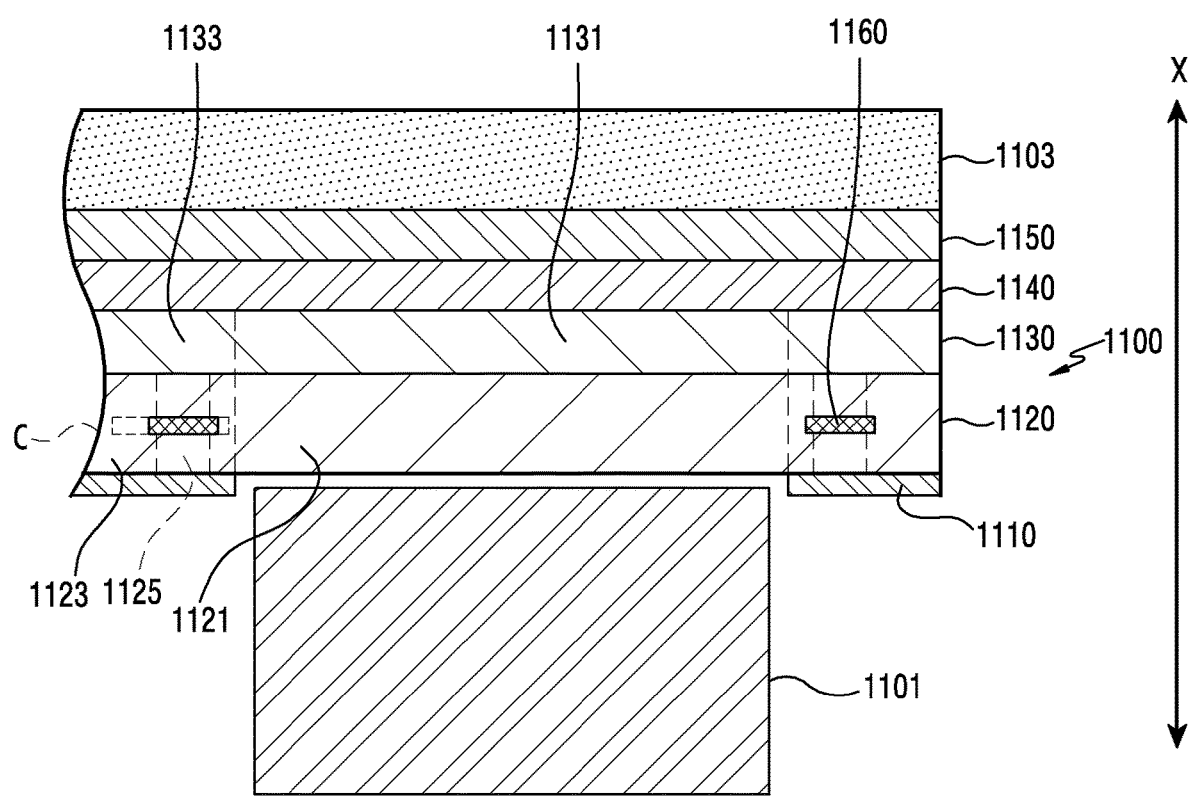
FIG. 11 is a cross-sectional view of a display according to a third embodiment.
Figure 12A:
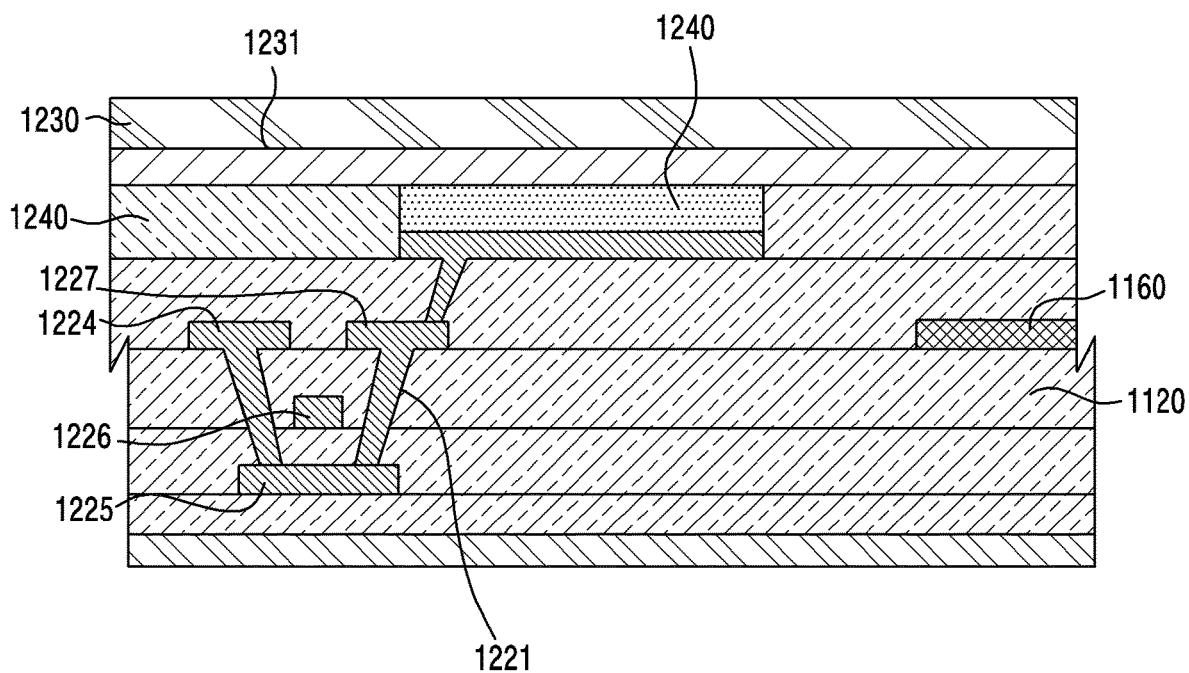
FIG. 12A is a sectional view of area C in FIG. 11.
Figure 12B:
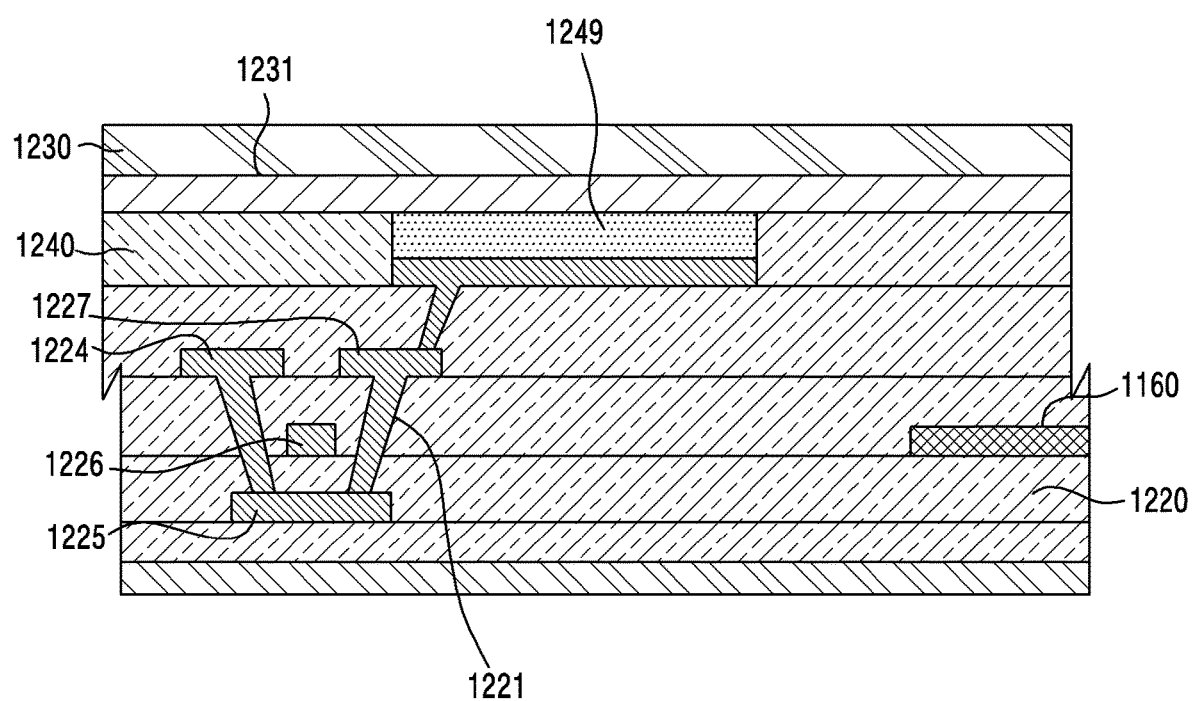
FIG. 12B is a sectional view of area C in FIG. 11.
Figure 12C:
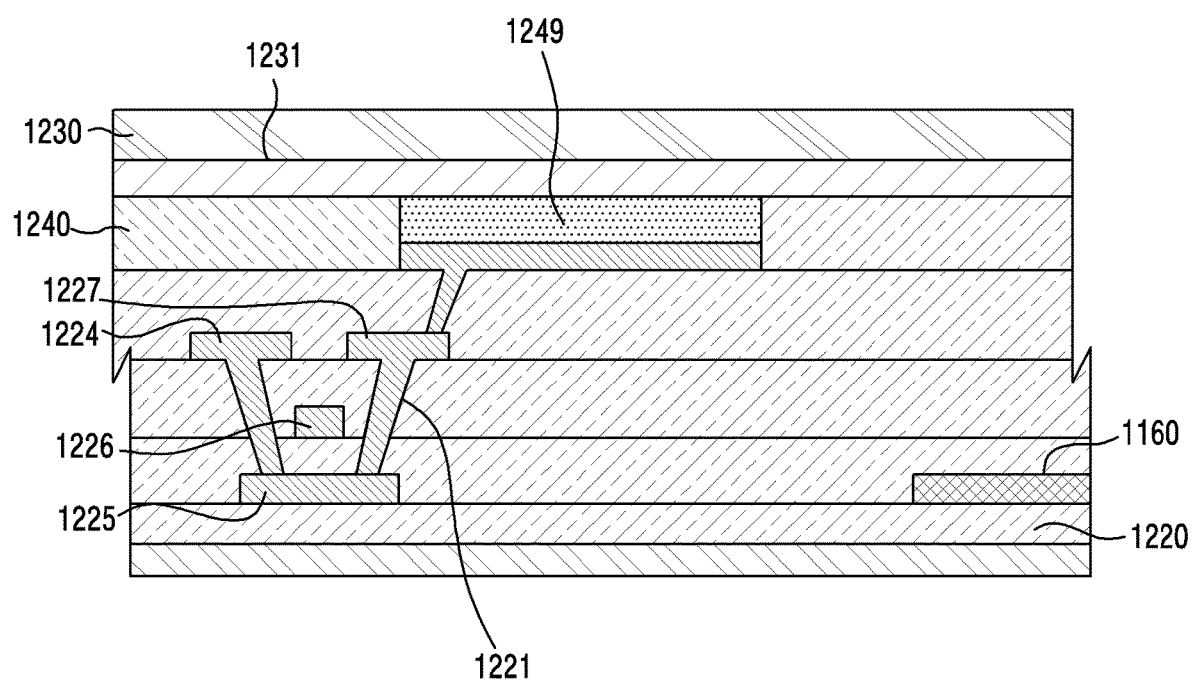
FIG. 12C is a sectional view of area C in FIG. 11.

FIG. 11 is a cross-sectional view of a display 1100 (e.g., the display 410 in FIG. 4) according to the third embodiment. FIG. 12A is a sectional view of area C in FIG. 11. FIG. 12B is a sectional view of area C in FIG. 11. FIG. 12C is a sectional view of area C in FIG. 11. In this embodiment, the opaque layer 1160 can be disposed within the display panel 1120 in the pixel area 1123. The opaque layer 1160 can be disposed in the same layer of the display panel 1120 as the source 1224 and drain electrodes 1227, FIG. 12A, the same layer as the gate electrode 1226, FIG. 12B, or the same layer as a semiconductor elements 1225, FIG. 12C.

Referring to FIG. 11, the display 1100 according to the third embodiment may be disposed between at least one sensor 1101 (e.g., the sensor 430 in FIG. 4) and a window 1103 (e.g., the front plate 302 in FIG. 3A or the front plate 420 in FIG. 4). The display 1100 may include a support member 1110, a display panel 1120, a touch panel 1130, a polarization member 1140, an adhesive member 1150, and an opaque member 1160. At least one of the support member 1110, the display panel 1120, the touch panel 1130, the polarization member 1140, or the adhesive member 1150 may be sequentially stacked along an axis X. At least one of the support member 1110, the display panel 1120, the touch panel 1130, the polarization member 1140, and the adhesive member 1150 in the display 1100 may be the same as or similar to at least one of the support member 610, the display panel 620, the touch panel 630, the polarization member 640, and the adhesive member 650 in the display 600 in FIG. 6, and a redundant description thereof is omitted below.

According to the display 1100 according to the third embodiment, the opaque member 1160 may reduce the transmittance corresponding to the peripheral area of the sensor 1101. The opaque member 1160 may be lower the transmittance of the peripheral area 1125 (the peripheral area 625 in FIG. 6) of the sensor area 1121 (e.g., the sensor area 411 in FIG. 4 or the sensor area 621 in FIG. 6) in the pixel area 1123 (e.g., the pixel area 413 in FIG. 4 or the pixel area 623 in FIG. 6) of the display panel 1120. To this end, the opaque member 1160 may be disposed on the display panel 1120. The opaque member 1160 may be disposed in the pixel area 1123 while exposing at least a part of the area 1131 overlaying the sensor area 1121 along the axis X in the display panel 1120. The opaque member 960 may be disposed to correspond to the peripheral area 1125 of the display panel 1120 along the axis X. As an example, the opaque member 1160 may be disposed to correspond to the pixel area 1123 so as not to overlap the sensor area 1121 along the axis X. As another example, the opaque member 1160 may be disposed to correspond to the pixel area 1123 such that at least a part of the opaque member 1160 overlaps the sensor area 1121 along the axis X.

As an example, the opaque member 1160 may be formed of an opaque resin, ink, or the like. As another example, the opaque member 1160 may be formed of a metal used to form at least one of the drive wiring lines of the display panel 1120, that is, the first drive wiring line and the second drive wiring line. The opaque member 1160 may be formed while arranging a metal to form the drive wiring lines of the display panel 1120. As another example, the opaque member 1160 may be formed of a material used to form a pixel layer 1240 (e.g., the pixel layer 740 in FIG. 7). The opaque member 1160 may be formed by etching the material for the pixel layer 1240 of the display panel 1120 and forming the remaining area except for pixels 1249 (e.g., the pixels 1249 in FIG. 7) of the pixel layer 1240 to be thick.

As an embodiment, as illustrated in FIG. 12A, the opaque member 1160 may be disposed in the same layer as at least one of a source electrode 1224 (e.g., the source electrode 724 in FIG. 7) and a drain electrode 1227 (e.g., the drain electrode 727 in FIG. 7) of the first substrate (e.g., the first electrode 720 in FIG. 7) in the display panel 1120. As another example, as illustrated in FIG. 12B, the opaque member 1160 may be disposed in the same layer as a gate electrode 1226 (e.g., the gate electrode 726 in FIG. 7) of the first substrate 1220 in the display panel 1120. As another example, as illustrated in FIG. 12C, the opaque member 1160 may be disposed in the same layer as a semiconductor element 1225 (e.g., the semiconductor element 725 in FIG. 7) of the first substrate 1220 in the display panel 1120. As another example, the opaque member 1160 may be disposed in a pixel layer 1240 in the display panel 1120. The opaque member 1160 may be disposed in the remaining area of the pixel layer 1240, except for the pixel 1249. The opaque member 1160 may be disposed to correspond to the peripheral area 1125 in the display panel 1120. The opaque member 1160 may be disposed to be electrically separated from a first drive wiring line 1221 (the first drive wiring line 721 in FIG. 7) and a second drive wiring line 1231 (e.g., the second drive wiring line 731) in the display panel 1120. The opaque member 1160 may be disposed along the axis X or on a plane perpendicular to the axis to be electrically separated from the first drive wiring line 1221 and the second drive wiring line 1231.

For example, the size of the opaque member 1160 may correspond to the size of the peripheral area 1125. As an example, the width of the opaque member 1160 may be equal to or greater than the width of the peripheral area 1125. As another example, the width of the opaque member 1160 may be less than the width of the perimeter area 1125.

Figure 13:
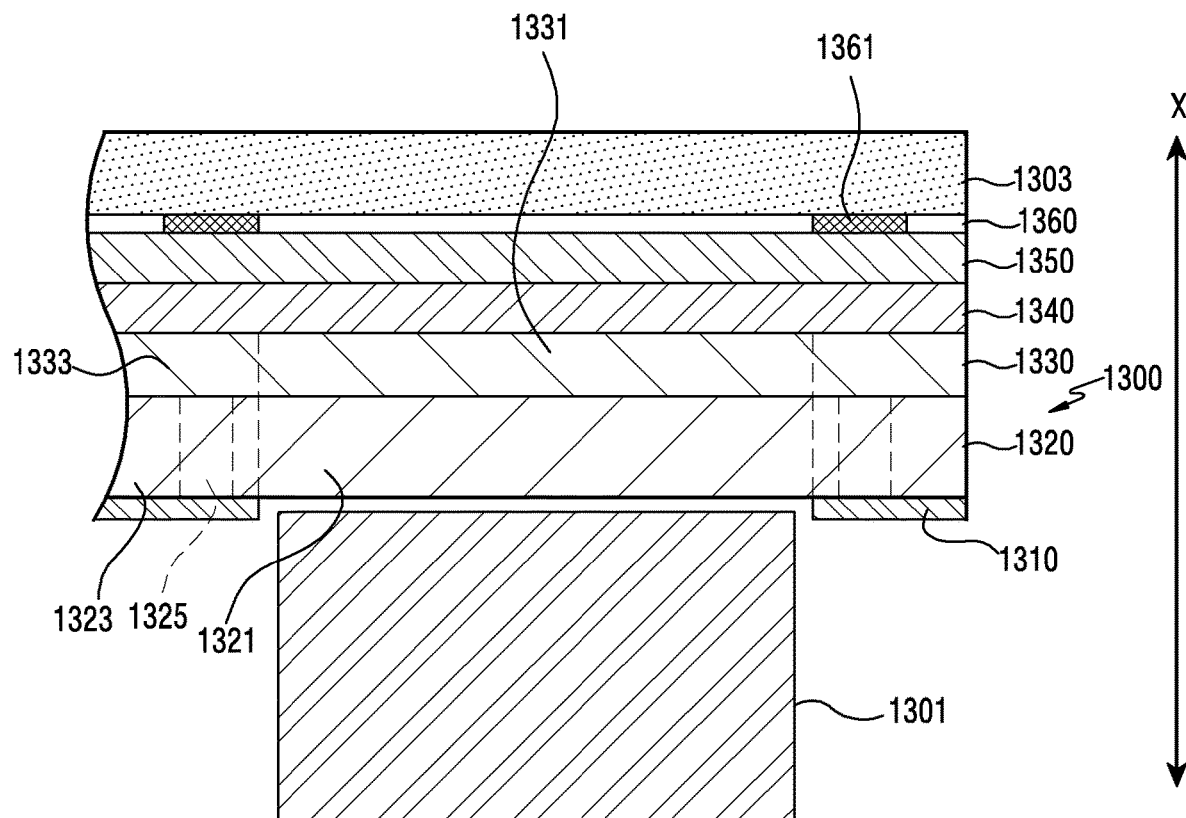
FIG. 13 is a cross-sectional view of a display according to a fourth embodiment.

FIG. 13 is a cross-sectional view of a display 1300 (e.g., the display 410 in FIG. 4) according to the fourth embodiment. In this embodiment, the opaque member 1361 can be surrounded by a transparent panel 1361.

Referring to FIG. 13, the display 1300 according to the fourth embodiment may be disposed between at least one sensor 1301 (e.g., the sensor 430 in FIG. 4) and a window 1303 (e.g., the front plate 302 in FIG. 3A or the front plate 420 in FIG. 4). The display 1300 may include a support member 1310, a display panel 1320, a touch panel 1330, a polarization member 1340, an adhesive member 1350, and an opaque member 1360. At least one of the support member 1310, the display panel 1320, the touch panel 1330, the polarization member 1340, or the adhesive member 1350 may be sequentially stacked along an axis X. At least one of the support member 1310, the display panel 1320, the touch panel 1330, the polarization member 1340, and the adhesive member 1350 in the display 1300 may be the same as or similar to at least one of the support member 610, the display panel 620, the touch panel 630, the polarization member 640, and the adhesive member 650 in the display 600 in FIG. 6, and a redundant description thereof is omitted below.

According to the display 1300 according to the fourth embodiment, the transparent panel 1360 may be a transparent panel. As an example, the transparent panel 1360 may be disposed between any two of the display panel 1320, the touch panel 1330, the polarization member 1340, the adhesive member 1350, or the window 1303. The transparent panel 1360 may be stacked on the adhesive member 1350 and disposed between the window 1303 and the adhesive member 1350. Alternatively, the transparent panel 1360 may be stacked on the display panel 1320 and disposed between the display panel 1320 and the touch panel 1330. Alternatively, the transparent panel 1360 may be stacked on the touch panel 1330 and disposed between the touch panel 1330 and the polarization member 1340. The transparent panel 1360 may include an opaque member 1361. As another example, the transparent panel 1360 may be disposed in any one of the display panel 1320 and the touch panel 1330 as an additional layer.

The transparent panel 1360 may include an opaque member 1361. The opaque member 1361 may reduce the transmittance corresponding to the peripheral area of the sensor 1301. The opaque member 1361 may lower the transmittance of the peripheral area 1325 of the sensor area 1321 in the pixel area 1323 of the display panel 1320. To this end, the opaque member 1361 may be disposed to correspond to the pixel area 1323 while exposing at least a part of the sensor area 1321 of the display panel 1320 along the axis X. The opaque member 1361 may be disposed to correspond to the peripheral area 1325 of the display panel 1320 along the axis X. As an example, the opaque member 1361 may be disposed to correspond to the pixel area 1323 so as not to overlap the sensor area 1321 along the axis X. As another example, the opaque member 1361 may be disposed to correspond to the pixel area 1323 such that at least a part of the opaque member 1361 overlaps the sensor area 1321 along the axis X.

For example, the size of the opaque member 1361 may correspond to the size of the peripheral area 1325. As an example, the width of the opaque member 1361 may be equal to or greater than the width of the peripheral area 1325. As another example, the width of the opaque member 1361 may be less than the width of the perimeter area 1325. For example, the opaque member 1361 may be formed in a circular or polygonal annular shape.

Figure 14:
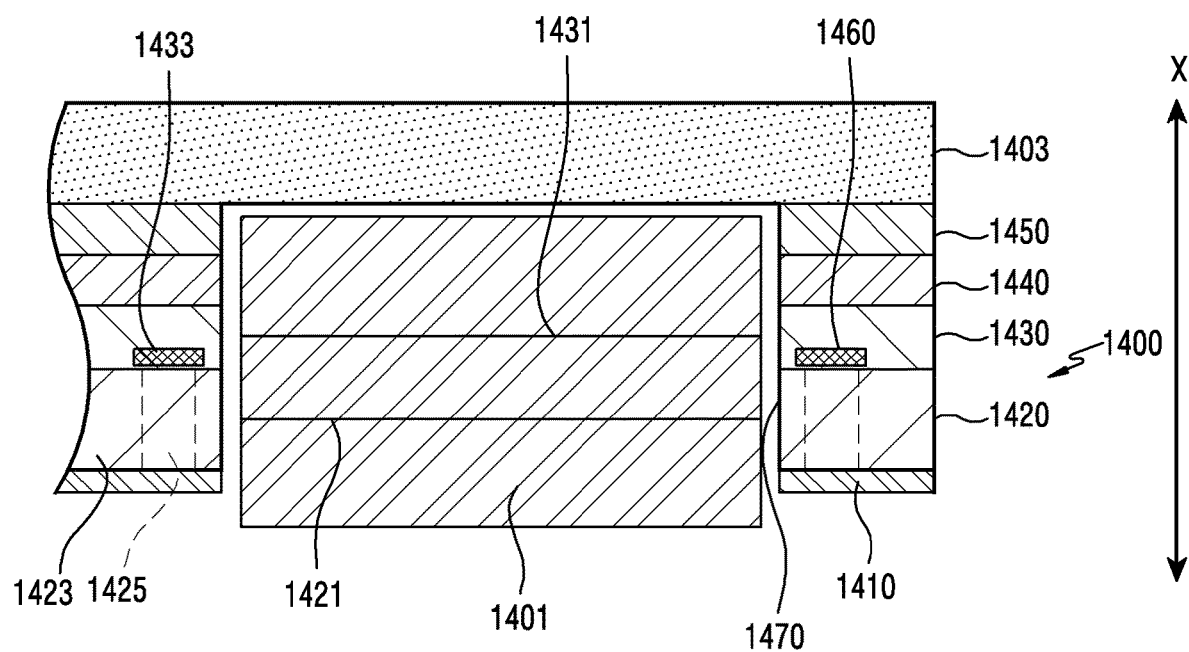
FIG. 14 is a cross-sectional view of a display according to a fifth embodiment.

FIG. 14 is a cross-sectional view of a display 1400 (e.g., the display 410 in FIG. 4) according to the fifth embodiment. In this embodiment, the display panel 1420 and the touch panel 1430 include a recess to accommodate the sensor 1401. The sensor area 1421 of the display panel 1420 and the area overlaying the sensor area 1431 of the touch panel 1430 can be disposed within the recess.

Referring to FIG. 14, the display 1400 according to the fifth embodiment may be disposed between at least one sensor 1401 (e.g., the sensor 430 in FIG. 4) and a window 1403 (e.g., the front plate 302 in FIG. 3A or the front plate 420 in FIG. 4). The display 1400 may include a support member 1410, a display panel 1420, a touch panel 1430, a polarization member 1440, an adhesive member 1450, and an opaque member 1460. At least one of the support member 1410, the display panel 1420, the touch panel 1430, the polarization member 1440, or the adhesive member 1450 may be sequentially stacked along an axis X. At least one of the support member 1410, the display panel 1420, the touch panel 1430, the polarization member 1440, and the adhesive member 1450 in the display 1400 may be the same as or similar to at least one of the support member 610, the display panel 620, the touch panel 630, the polarization member 640, and the adhesive member 650 in the display 600 in FIG. 6, and a redundant description thereof is omitted below. In addition, in the display 1400, the opaque member 1460 may be the same or similar to any one of the opaque members 660, 960, 1160, and 1361 of FIGS. 6, 9, 11, and 13, and a redundant description thereof is omitted below.

The display 1400 according to the fifth embodiment may be penetrated by the sensor 1401. The display 1400 may accommodate at least a part of sensor 1401. At least a part of the sensor 1401 may penetrate at least one of the display panel 1420, the touch panel 1430, the polarization member 1440, or the adhesive member 1450 along the axis X. To this end, the display 1400 may include an accommodation portion 1470. The accommodation portion 1470 may be opened to face the sensor 1401. The accommodation portion 1470 may be disposed to correspond to the sensor 1401 along the axis X. The accommodation portion 1470 may be formed as an opening or a recess. At least one of the sensor area 1421 of the display panel 1420 and the area overlaying the sensor area 1431 of the touch panel 1430 may be formed as a recess or an opening. In an example, the sensor 1401 may be spaced apart from the inner wall of the accommodation portion 1470. Through this, a space may be formed between the sensor 1401 and the inner wall of the accommodation portion 1470. As another example, the sensor 1401 may be in close contact with the inner wall of the accommodation portion 1470. As another example, a filling member (not illustrated) may be interposed between the sensor 1401 and the inner wall of the accommodation portion 1470. For example, the filling member may be formed of a curable material such as epoxy or resin.

Figure 15:
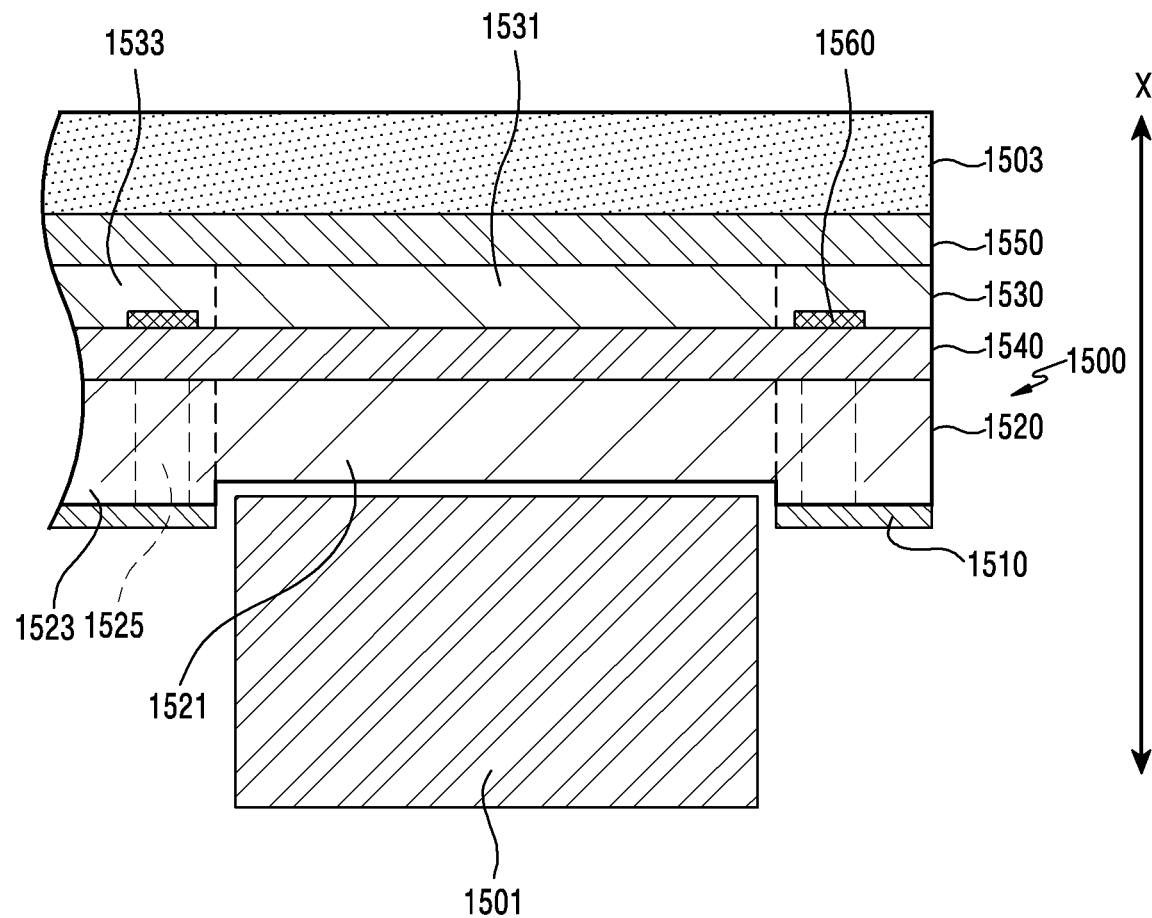
FIG. 15 is a cross-sectional view of a display according to a sixth embodiment.

FIG. 15 is a cross-sectional view of a display 1500 (e.g., the display 410 in FIG. 4) according to the sixth embodiment. In the foregoing embodiments, the sensor area 1521 of the display panel 1520 can be recessed from the pixel area 1523.

Referring to FIG. 15, the display 1500 according to the sixth embodiment may be disposed between at least one sensor 1501 (e.g., the sensor 430 in FIG. 4) and a window 1503 (e.g., the front plate 302 in FIG. 3A or the front plate 420 in FIG. 4). The display 1500 may include a support member 1510, a display panel 1520, a touch panel 1530, a polarization member 1540, an adhesive member 1550, and an opaque member 1560. In the display 1500, at least one of the support member 1510, the display panel 1520, the polarization member 1540, the touch panel 1530, or the adhesive member 1550 may be sequentially stacked along the axis X. At least one of the support member 1510, the display panel 1520, the touch panel 1530, the polarization member 1540, and the adhesive member 1550 in the display 1500 may be the same as or similar to at least one of the support member 610, the display panel 620, the touch panel 630, the polarization member 640, or the adhesive member 650 in the display 600 in FIG. 6, and a redundant description thereof is omitted below. In addition, in the display 1500, the opaque member 1560 may be the same or similar to any one of the opaque members 660, 960, 1160, and 1361 of FIGS. 6, 9, 11, and 13, and a redundant description thereof is omitted below.

According to the display 1500 according to the sixth embodiment, the display panel 1520 may include at least one of a first substrate, a second substrate, or a pixel layer. The first substrate and the second substrate may be sequentially stacked on the support member 1510 along one axis X. The first substrate may include a first drive wiring line, and the second substrate may include a second drive wiring line. The pixel layer may be disposed between the first substrate and the second substrate. The pixel layer may be formed of a liquid crystal material. When a voltage is applied, the molecular arrangement of the liquid crystal material in the pixel layer is changeable. Thereby, the liquid crystal material in the pixel layer is able to diffract the light projected from the light source (not illustrated). The second substrate is able to implement a color on the light projected from the pixel layer.

Figure 16:
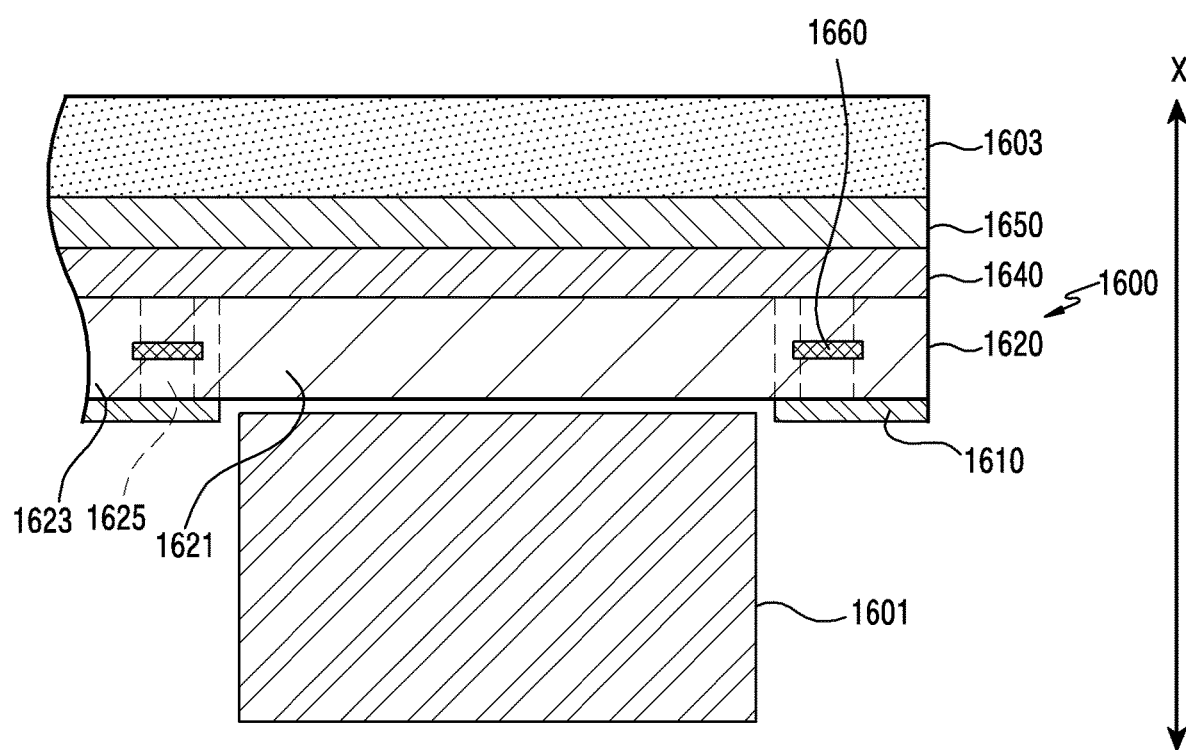
FIG. 16 is a cross-sectional view of a display according to a seventh embodiment.

FIG. 16 is a cross-sectional view of a display 1600 (e.g., the display 410 in FIG. 4) according to the seventh embodiment. The opaque member 1660 can be formed in the display panel 1620. The display panel 1620 can act as the touch panel.

Referring to FIG. 16, the display 1600 according to the seventh embodiment may be disposed between at least one sensor 1601 (e.g., the sensor 430 in FIG. 4) and a window 1603 (e.g., the front plate 302 in FIG. 3A or the front plate 420 in FIG. 4). The display 1600 may include a support member 1610, a display panel 1620, a polarization member 1640, an adhesive member 1650, and an opaque member 1660. In the display 1600, at least one of the support member 1610, the display panel 1620, the polarization member 1640, or the adhesive member 1650 may be sequentially stacked along the axis X. At least one of the support member 1610, the display panel 1620, the polarization member 1640, or the adhesive member 1650 in the display 1600 may be the same as or similar to at least one of the support member 610, the display panel 620, the polarization member 640, or the adhesive member 650 in the display 600 in FIG. 6, and a redundant description thereof is omitted below. In addition, in the display 1600, the opaque member 1660 may be the same or similar to any one of the opaque members 660, 960, 1160, and 1361 of FIGS. 6, 9, 11, and 13, and a redundant description thereof is omitted below.

According to the display 1600 according to the seventh embodiment, the display panel 1620 may include at least one of a first substrate, a second substrate, or a pixel layer. The first substrate and the second substrate may be sequentially stacked on the support member 1610 along one axis X. The first substrate may include a first drive wiring line, and the second substrate may include a second drive wiring line. The pixel layer may be disposed between the first substrate and the second substrate. The pixel layer may be formed of a liquid crystal material. When a voltage is applied, the molecular arrangement of the liquid crystal material in the pixel layer is changeable. Thereby, the liquid crystal material in the pixel layer is able to diffract the light projected from the light source (not illustrated). The second substrate is able to implement a color on the light projected from the pixel layer. For example, any one of the first substrate and the second substrate may further include a touch panel (e.g., the touch panel 630 in FIG. 6).

Figure 17A:
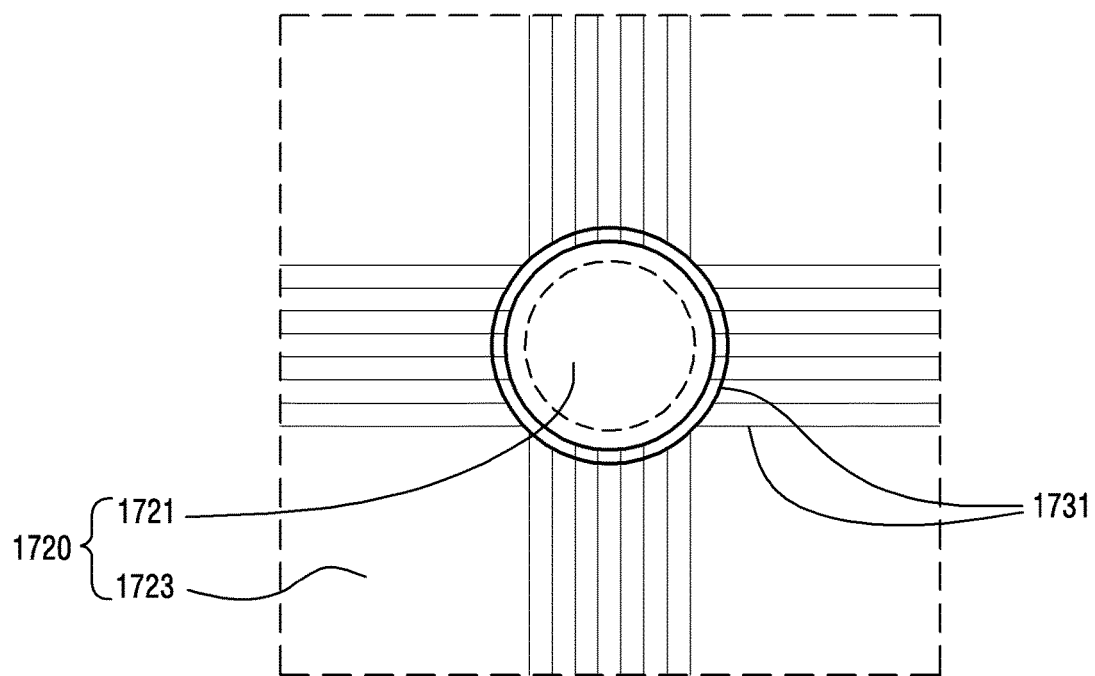
FIG. 17A and FIG. 17B are an exemplary view of drive wiring lines in a display according to an eighth embodiment.
Figure 17B:
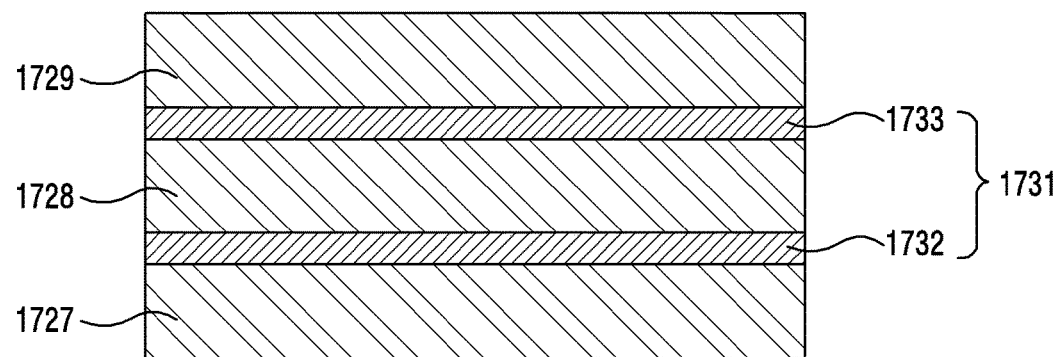

FIG. 17A and FIG. 17B are exemplary views of a drive wiring line 1731 in a display (e.g., the display 410 in FIG. 4) according to the eighth embodiment.

Referring to FIGS. 17A and 17B, the display according to the eighth embodiment may be disposed between at least one sensor (e.g., the sensor 430 in FIG. 4) and a window (e.g., the front plate 302 in FIG. 3A or the front plate 420 in FIG. 4). The display may be the same as or similar to the display 600, 900, 1100, 1300, 1400, 1500 or 1600 of any one of FIGS. 6, 9, 11, 13, 14, 15, and 16, and a redundant description thereof is omitted below.

According to the display according to the eighth embodiment, the display panel 1720 may include a sensor area 1721 (e.g., the sensor area 411 in FIG. 4) and a pixel area 1723 (e.g., the pixel area 413 in FIG. 4). The sensor area 1721 and the pixel area 1723 may be distinguished from each other on a plane perpendicular to the axis X. The sensor area 1723 may correspond to a sensor. The sensor area 1721 may allow light received from outside the electronic device (e.g., the electronic device 400 in FIG. 4) to pass therethrough to the sensor.

The display panel 1720 may include at least one of a first substrate 1725, a second substrate 1726, or a pixel layer (not illustrated). The first substrate 1725 and the second substrate 1726 may be stacked along the axis X, and the pixel layer may be disposed between the first substrate 1725 and the second substrate 1726. The pixel layer may include one or more pixels (not illustrated) configured to display color, and the first substrate 1725 and the second substrate 1726 may include a drive wiring line 1731 configured to drive the pixel. The drive wiring lines 1731 are connected to the pixels, and may extend in the form of a straight line while maintaining a predetermined space therebetween in the pixel area 1723. The pixels and drive wiring lines 1731 may be disposed in the pixel area 1723. The drive wiring lines 1731 may extend while surrounding the sensor area 1721 in the pixel area 1723, as illustrated in FIG. 17A. The drive wiring lines 1731 may extend by bypassing the sensor area 1721 in the pixel area 1723 so as not to extend in the sensor area 1721.

Each of the first substrate 1725 and the second substrate 1726 may include a plurality of layers 1727, 1728, and 1729, as illustrated in FIG. 17B. In each of the first substrate 1725 and the second substrate 1726, the layers 1727, 1728, and 1729 may be stacked along the axis X. In each of the first substrate 1725 and the second substrate 1726, the drive wiring lines 1731 may extend between the layers 1727, 1728, and 1729. In each of the first substrate 1725 and the second substrate 1726, the drive wiring lines 1731 may be overlapped each other along the axis X. Thereby, the width of the peripheral area formed as the drive wiring lines 1731 surround the sensor area 1721 in the pixel area 1723 may be reduced. Thus, in a plane perpendicular to the axis X, the width of the opaque member (e.g., the opaque member 515 in FIG. 5B) may be reduced.

Figure 18:
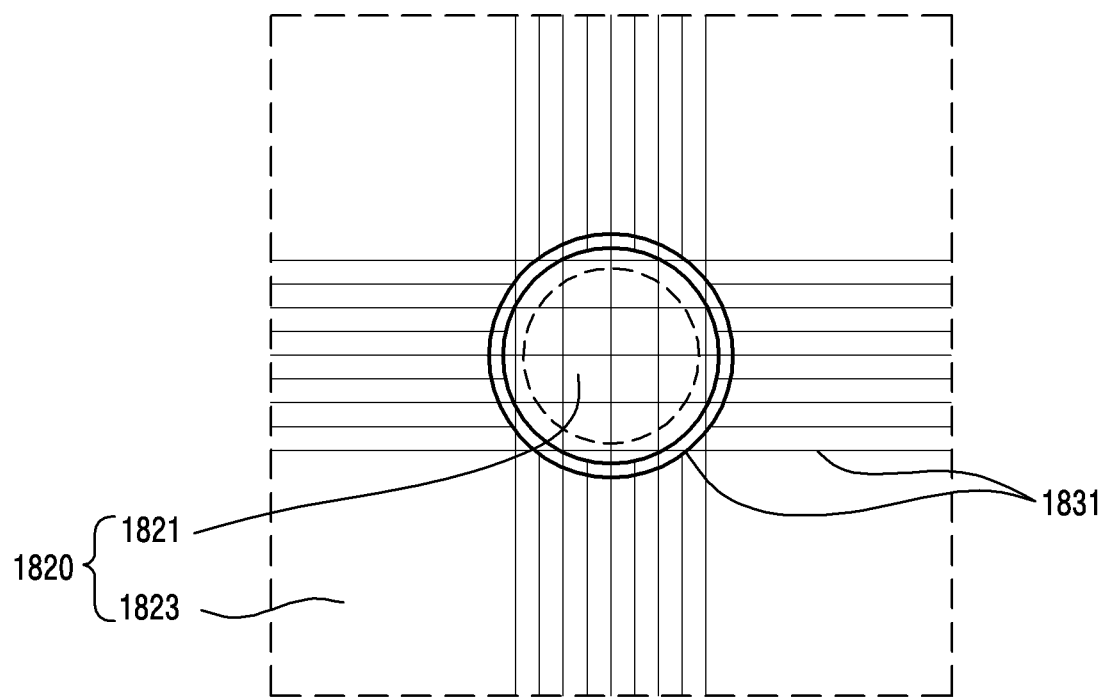
FIG. 18 is an exemplary view of drive wiring lines in a display according to a ninth embodiment.

FIG. 18 is an exemplary view of a drive wiring line 1831 in a display (e.g., the display 410 in FIG. 4) according to the ninth embodiment. In the foregoing embodiment, the drive wiring lines 1831 extend through the sensor area 1821 with a sufficient width that allows sufficient light though to the sensor.

Referring to FIG. 18, the display according to the ninth embodiment may be disposed between at least one sensor (e.g., the sensor 430 in FIG. 4) and a window (e.g., the front plate 302 in FIG. 3A or the front plate 420 in FIG. 4). The display may be the same as or similar to the display 600, 900, 1100, 1300, 1400, 1500 or 1600 of any one of FIGS. 6, 9, 11, 13, 14, 15, and 16, and a redundant description thereof is omitted below.

According to the display according to the ninth embodiment, the display panel 1820 may include a sensor area 1821 (e.g., the sensor area 411 in FIG. 4) and a pixel area 1823 (e.g., the pixel area 413 in FIG. 4). The sensor area 1821 and the pixel area 1823 may be distinguished from each other on a plane perpendicular to the axis X. The sensor area 1823 may correspond to a sensor. The sensor area 1821 may allow light received from outside the electronic device (e.g., the electronic device 400 in FIG. 4) to pass therethrough to the sensor. The pixel area 1823 may include one or more pixels (not illustrated) configured to display colors and drive wiring lines 1831 configured to drive the pixels.

The drive wiring lines 1831 are connected to the pixels, and may extend in the form of a straight line while maintaining a predetermined space therebetween in the pixel area 1823. The first portions of the drive wiring lines 1831 surround the sensor area 1821 in the pixel area 1823, and the second portions of the drive wiring lines 1831 may extend in the sensor area 1821. Thereby, the width of the peripheral area formed as the drive wiring lines 1831 surround the sensor area 1821 in the pixel area 1823 may be reduced. Thus, in a plane perpendicular to the axis X, the width of the opaque member (e.g., the opaque member 515 in FIG. 5B) may be reduced.

Figure 19:
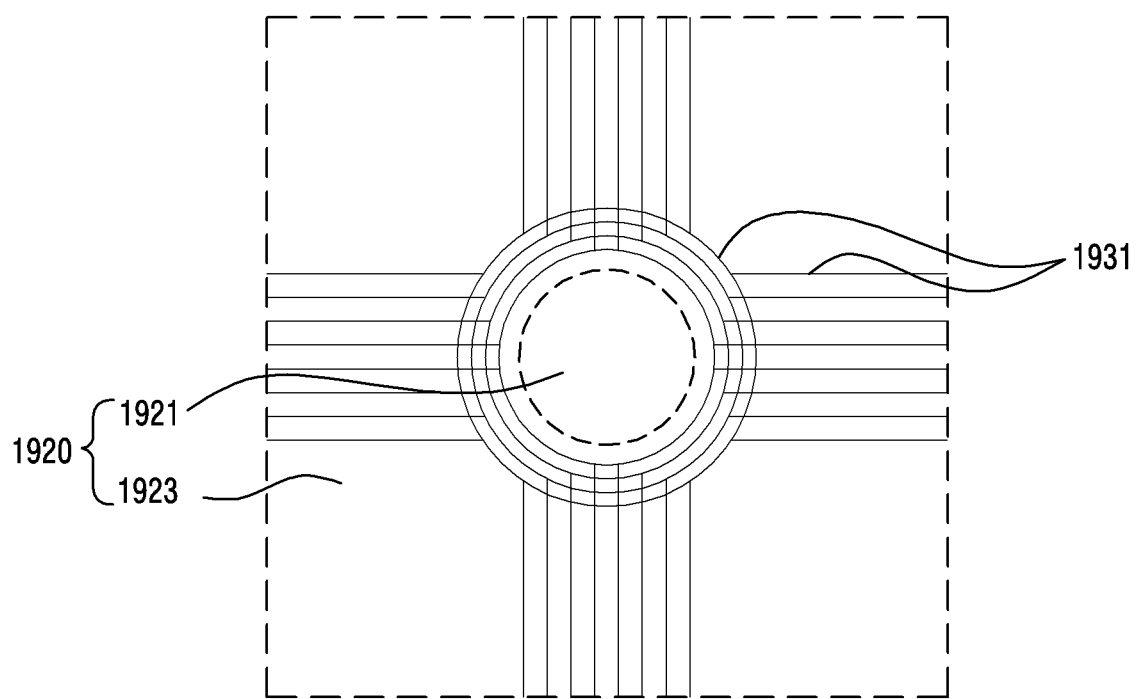
FIG. 19 is an exemplary view of drive wiring lines in a display according to a tenth embodiment.

FIG. 19 is an exemplary view of a drive wiring line 1931 in a display (e.g., the display 410 in FIG. 4) according to the tenth embodiment.

Referring to FIG. 19, the display according to the tenth embodiment may be disposed between at least one sensor (e.g., the sensor 430 in FIG. 4) and a window (e.g., the front plate 302 in FIG. 3A or the front plate 420 in FIG. 4). The display may be the same as or similar to the display 600, 900, 1100, 1300, 1400, 1500 or 1600 of any one of FIGS. 6, 9, 11, 13, 14, 15, and 16, and a redundant description thereof is omitted below.

According to the display according to the tenth embodiment, the display panel 1920 may include a sensor area 1921 (e.g., the sensor area 411 in FIG. 4) and a pixel area 1923 (e.g., the pixel area 413 in FIG. 4). The sensor area 1921 and the pixel area 1923 may be distinguished from each other on a plane perpendicular to the axis X. The sensor area 1921 may correspond to a sensor. The sensor area 1921 may allow light received from outside the electronic device (e.g., the electronic device 400 in FIG. 4) to pass therethrough to the sensor. The pixel area 1923 may include one or more pixels (not illustrated) configured to display colors and drive wiring lines 1931 configured to drive the pixels.

The first portions of the drive wiring lines 1931 extend in the form of a straight line while maintaining a space therebetween in the pixel area 1923, and the second portions of the drive wiring lines 1931 may extend while surrounding the sensor area 1921 in the pixel area 1923. In the drive wiring lines 1931, the thickness of the second portions may be smaller than the thickness of the first portions. Thereby, the width of the peripheral area formed as the drive wiring lines 1931 surround the sensor area 1921 in the pixel area 1923 may be reduced. Thus, in a plane perpendicular to the axis X, the width of the opaque member (e.g., the opaque member 515 in FIG. 5B) may be reduced.

Figure 20:
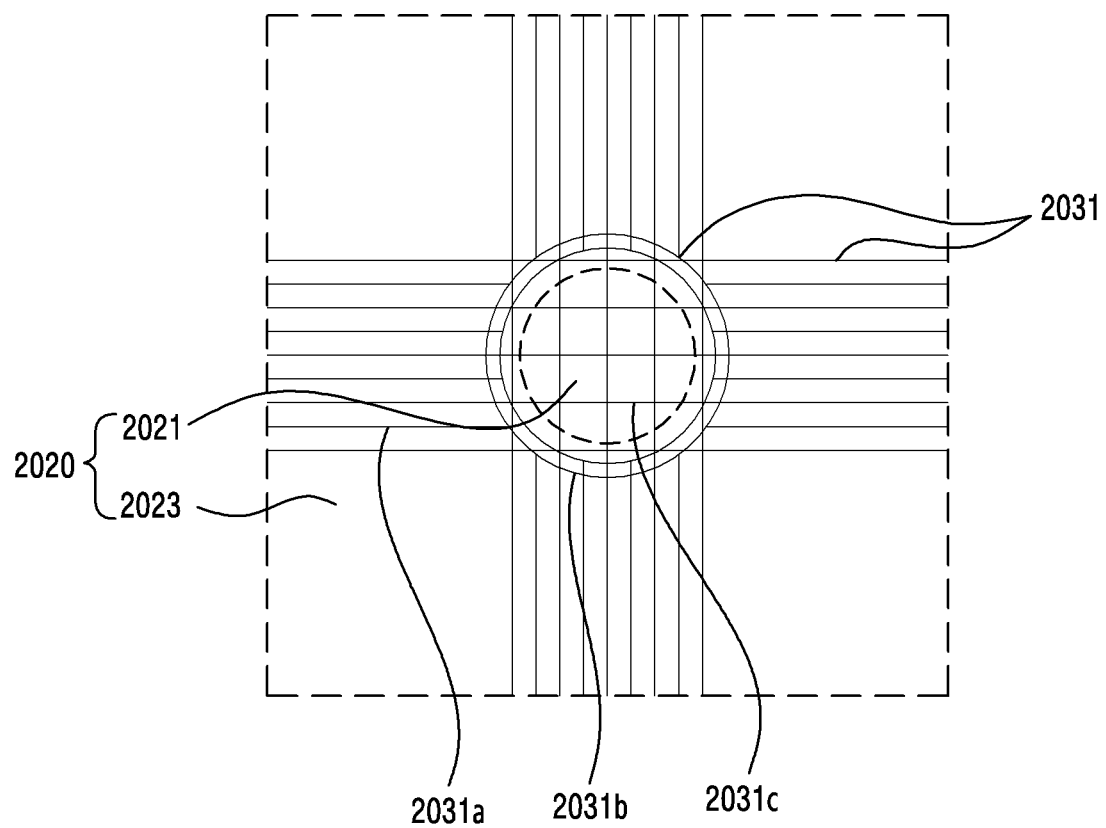
FIG. 20 is an exemplary view of drive wiring lines in a display according to an eleventh embodiment.

FIG. 20 is an exemplary view of a drive wiring line 2031 in a display (e.g., the display 410 in FIG. 4) according to the eleventh embodiment.

Referring to FIG. 20, the display according to the eleventh embodiment may be disposed between at least one sensor (e.g., the sensor 430 in FIG. 4) and a window (e.g., the front plate 302 in FIG. 3A or the front plate 420 in FIG. 4). The display may be the same as or similar to the display 600, 900, 1100, 1300, 1400, 1500 or 1600 of any one of FIGS. 6, 9, 11, 13, 14, 15, and 16, and a redundant description thereof is omitted below.

According to the display according to the eleventh embodiment, the display panel 2020 may include a sensor area 2021 (e.g., the sensor area 411 in FIG. 4) and a pixel area 2023 (e.g., the pixel area 413 in FIG. 4). The sensor area 2021 and the pixel area 2023 may be distinguished from each other on a plane perpendicular to the axis X. The sensor area 2023 may correspond to a sensor. The sensor area 2021 may allow light received from outside the electronic device (e.g., the electronic device 400 in FIG. 4) to pass therethrough to the sensor. The pixel area 2023 may include one or more pixels (not illustrated) configured to display colors and drive wiring lines 2031 configured to drive the pixels.

The drive wiring lines 2031 are connected to the pixels, the first portions 2031a of the drive wiring lines 2031 and may extend in the form of a straight line while maintaining a predetermined space therebetween in the pixel area 2023. The second portions 2031b of the drive wiring lines 2031 surround the sensor area 2021 in the pixel area 2023, and the third portions 2031c of the drive wiring lines 2031 may extend in the sensor area 2021. In the drive wiring lines 2031, the thickness of the second portions 2031b may be smaller than the thickness of the third portions 2031c. Thereby, the width of the peripheral area formed as the drive wiring lines 2031 surround the sensor area 2021 in the pixel area 2023 may be reduced. Thus, in a plane perpendicular to the axis X, the width of the opaque member (e.g., the opaque member 515 in FIG. 5B) may be reduced.

Figure 21:
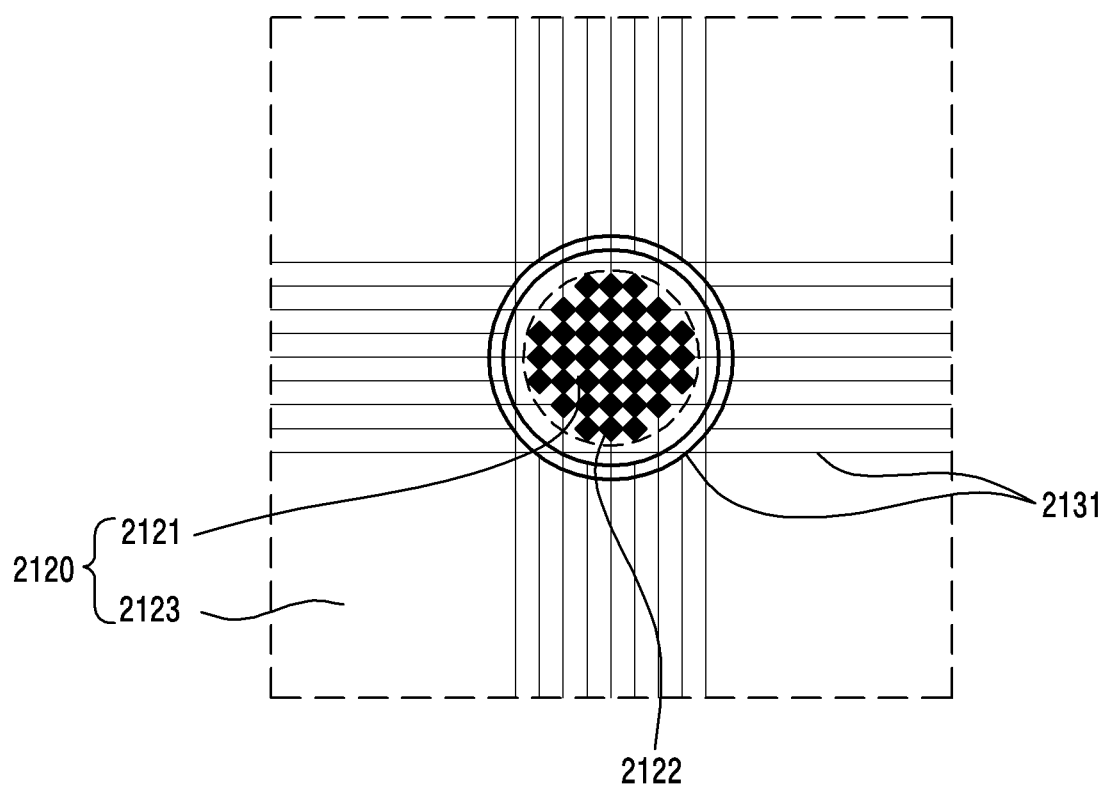
FIG. 21 is an exemplary view of drive wiring lines in a display according to a twelfth embodiment.

FIG. 21 is an exemplary view of a drive wiring line 2131 in a display (e.g., the display 410 in FIG. 4) according to the twelfth embodiment.

Referring to FIG. 21, the display according to the twelfth embodiment may be disposed between at least one sensor (e.g., the sensor 430 in FIG. 4) and a window (e.g., the front plate 302 in FIG. 3A or the front plate 420 in FIG. 4). The display may be the same as or similar to the display 600, 900, 1100, 1300, 1400, 1500 or 1600 of any one of FIGS. 6, 9, 11, 13, 14, 15, and 16, and a redundant description thereof is omitted below. In the foregoing embodiment, markers 2122 form a checkerboard pattern over the sensor area allowing sufficient light to pass through to the sensor.

According to the display according to the twelfth embodiment, the display panel 2120 may include a sensor area 2121 (e.g., the sensor area 411 in FIG. 4) and a pixel area 2123 (e.g., the pixel area 413 in FIG. 4). The sensor area 2121 and the pixel area 2123 may be distinguished from each other on a plane perpendicular to the axis X. The sensor area 2121 may correspond to a sensor. The display panel 2120 may include a plurality of pixels (not illustrated) configured to display colors and drive wiring lines 2131 configured to drive the pixels. The pixels may be arranged in the sensor area 2121 and the pixel area 2123. The pixels may be arranged in the sensor area 2121 at a first density and in the pixel area 2123 at a second density greater than the first density. The drive wiring lines 2131 may be connected to the pixels, and may extend in the sensor area 2121 and the pixel area 2123.

The sensor area 2121 may include a plurality of markers 2122. The markers 2122 may be formed of an opaque material. The markers 2122 may be arranged to correspond to the pixels. For example, some of the markers 2122 may be arranged to be spaced apart from each other while exposing a space between them. As an example, the markers 2122 may be arranged in a checkerboard pattern. As another example, the markers 2122 may be formed in a grid pattern. Thereby, the sensor area 2121 may block the pixels of the sensor area 2121 through the markers 2122, and may expose sensors through the spaces between the markers 2122.

Figure 22A:
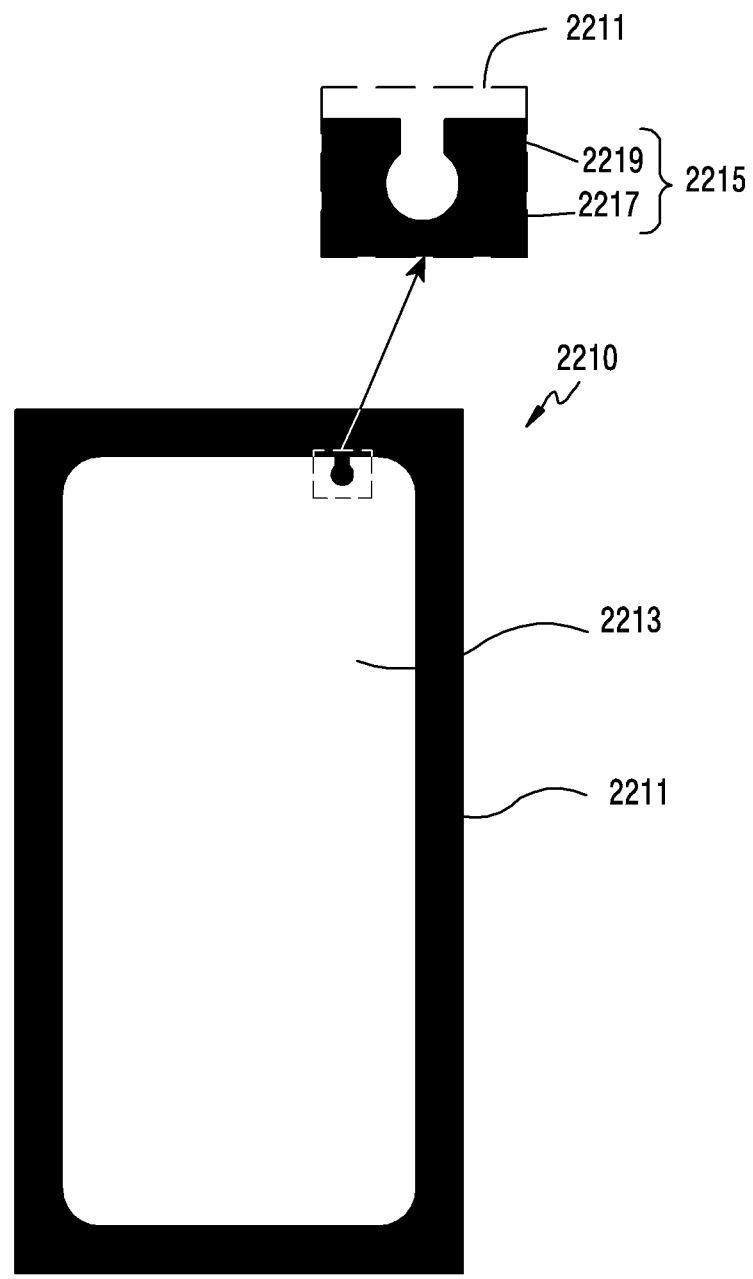
FIG. 22A is a plan view of masks for the display according to the first embodiment.
Figure 22B:
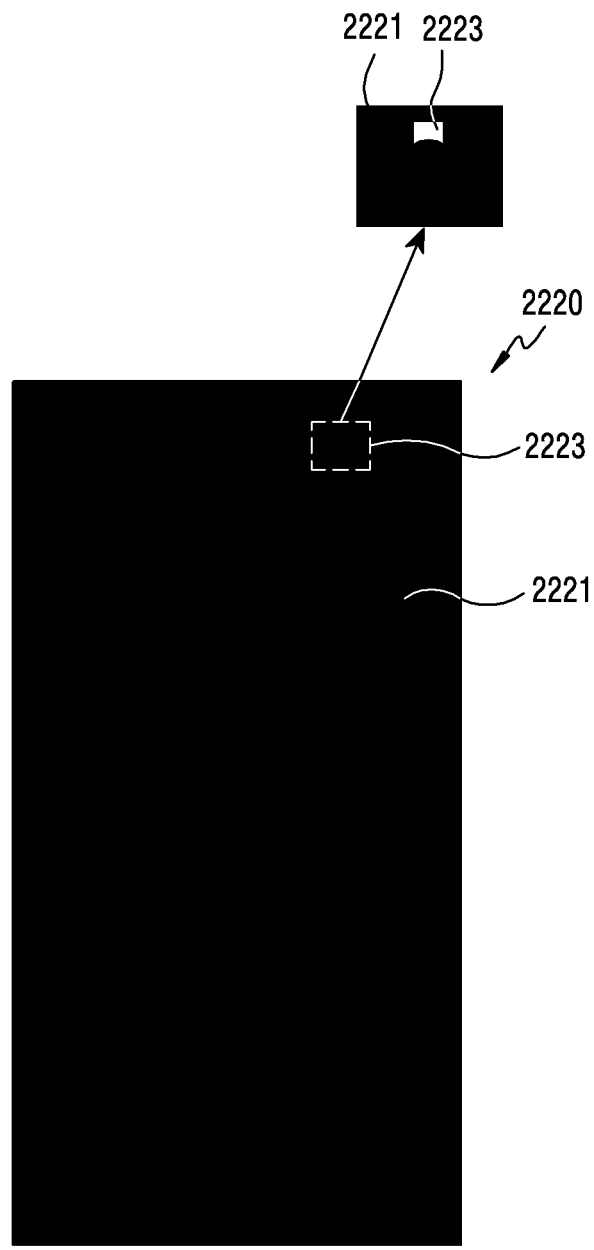
FIG. 22B is a plan view of masks for the display according to the first embodiment.
Figure 23A:
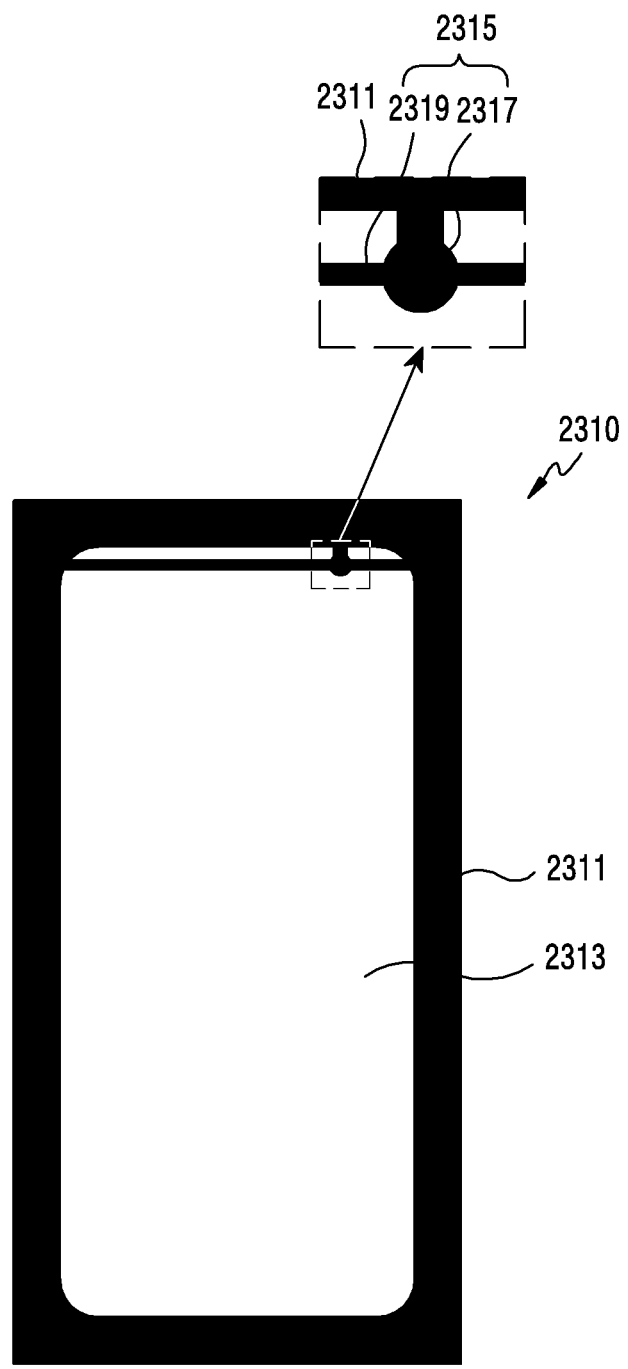
FIG. 23A is a plan view of masks for the display according to the first embodiment.
Figure 23B:
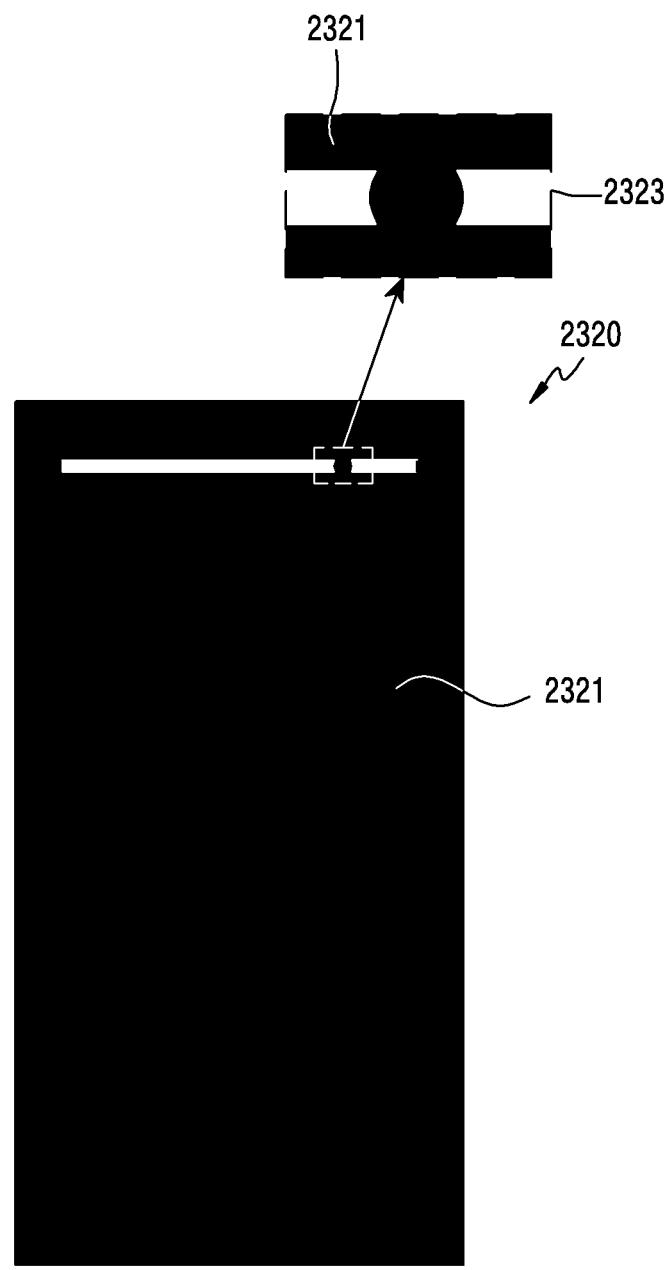
FIG. 23B is a plan view of masks for the display according to the first embodiment.

According to certain embodiments, a display (e.g., the display 410 in FIG. 4) may be manufactured to expose the sensors (e.g., the sensors 430 in FIG. 4). That is, the display may be manufactured such that the sensors are disposed on the rear face of the screen display area of the display. To this end, masks for the manufacture of the display may be provided. FIG. 22A is a plan view of masks 2210, for a display (e.g., the display 410 in FIG. 4) according to the first embodiment. FIG. 22B is a plan view of masks 2220, for a display (e.g., the display 410 in FIG. 4) according to the first embodiment. FIG. 23A is a plan view of masks 2310 for a display (e.g., the display 410 in FIG. 4) according to the first embodiment. FIG. 23B is a plan view of masks 2320 for a display (e.g., the display 410 in FIG. 4) according to the first embodiment.

Referring to FIGS. 22A, 22B, 23A, and 23B, the masks 2210, 2220, 2310, and 2320 according to the first embodiment may be provided for manufacturing a display. The masks 2210, 2220, 2310, or 2320 may include at least one of a first mask 2210 or 2310 and a second mask 2220 or 2320.

The first mask 2210 or 2310 may be formed at a height corresponding to at least a part of the thickness of the display. The first mask 2210 or 2310 may be formed at a height to correspond to and accommodate the sensors, that is, the height of a desired accommodation portion. The first mask 2210 or 2310 may include a frame 2211 or 2311 and a protrusion 2215 or 2315. The frame 2211 or 2311 may be formed to surround a first opening 2213 or 2313 having a predetermined shape and size. The shape and size of the first opening 2213 or 2313 may be determined depending on the shape and size of the display to be manufactured. The protrusion 2215 or 2315 may protrude from the frame 2211 or 2311 to the first opening 2213 or 2313.

The protrusion 2215 or 2315 may include a floating portion 2217 or 2317 and a bridge portion 2219 or 2319. The floating portion 2217 or 2317 may be disposed at a position for a sensor in the first opening 2213 or 2313. The floating portion 2217 may be formed in various shapes. For example, the floating portion 2217 may be formed in at least one of a circular shape, an elliptical shape, and a polygonal shape. The floating portion 2217 or 2317 may be disposed at various positions within the first opening 2213 or 2313. For example, the floating portion 2217 or 2317 may be disposed in the central area of the first opening 2213 or 2313 or may be disposed in an edge area of the first opening 2213 or 2313, i.e., an area adjacent to at least a part of the frame 2211 or 2311. The bridge portion 2219 or 2319 can fix the floating portion 2217 or 2317 to the frame 2211 or 2311. For this purpose, the bridge portion 2219 or 2319 may connect the frame 2211 and 2311 and the floating portion 2217 or 2317 to each other.

As an example, the bridge portion 2219 may protrude from one point in the frame 2211 to be connected to the floating portion 2217, as illustrated in FIG. 22A. For example, the bridge portion 2319 may extend in the form of a straight line, and may also extend while being bent or curved.

As another example, bridge portions 2319 may extend from a plurality of points in the frame 2311, as illustrated in FIG. 23A, and may be connected to the floating portion 2317. The bridge portions 2319 may extend from mutually opposite points in the frame 2311 with the floating portion 2317 interposed therebetween. Alternatively, the bridge portions 2319 may extend from points arranged on one side with respect to one axis passing through the floating portion 2317 in the frame 2311. Alternatively, the bridge portions 2319 may extend from points spaced apart from each other in the frame 2311 to extend in a plurality of directions intersecting each other, with the floating portion 2317 as a center.

The second mask 2220 or 2320 may be formed to correspond to the first mask 2210 or 2310. The second mask 2220 or 2320 may include a blocking portion 2221 or 2321 and a second opening 2223 or 2323. The blocking portion 2221 or 2321 may be formed to correspond to at least a part of the first opening 2213 or 2313 in the first mask 2210 or 2310 and the frames 2211 or 2311. In addition, the blocking portion 2221 or 2321 may be disposed to correspond to the floating portion 2217 or 2317 of the first mask 2210 or 2310. The second opening 2223 or 2323 may be disposed to correspond to the bridge portion 2219 or 2319 of the first mask 2210 or 2310. For example, the shape of the second opening 2223 or 2323 may match the shape of the bridge portion 2219 or 2319 as illustrated in FIG. 22B or FIG. 23B.

According to the first embodiment, based on the masks 2210 and 2220 or 2310 and 2320, a display may be manufactured. As an example, at least one of the display panel, the touch panel, the polarization member, and the adhesive member may be disposed through the first opening 2213 or 2313 of the first mask 2210 or 2310. At least one of the display panel, the touch panel, the polarization member, and the adhesive member may be disposed in an area in the first opening 2213 or 2313, except for the floating portion 2217 or 2317 and the bridge portion 2219 or 2319. Thereby, when the first mask 2210 or 2310 is removed, an empty space may be formed to correspond to the floating portion 2217 or 2317 and the bridge portion 2219 or 2319. Thereafter, through the second opening 2223 or 2323 of the second mask 2220 or 2320, the empty space corresponding to the bridge portion 2219 or 2319 may be filled. In addition, after the second mask 2210 or 2310 is removed, the rest of the display panel, the touch panel, the polarization member, or the adhesive member may be formed. As another example, in forming at least two of the display panel, the touch panel, the polarization member, and the adhesive member, the first mask 2210 or 2310 and the second mask 2220 or 2320 may be used alternately. Thereby, the display may include an accommodation portion (e.g., the accommodation portion 1470 in FIG. 14) configured to accommodate at least a part of a sensor to correspond to the floating portion 2217 or 2317. Accordingly, the sensor may be exposed through the display in the state of being inserted into the accommodation portion.

Figure 24A:
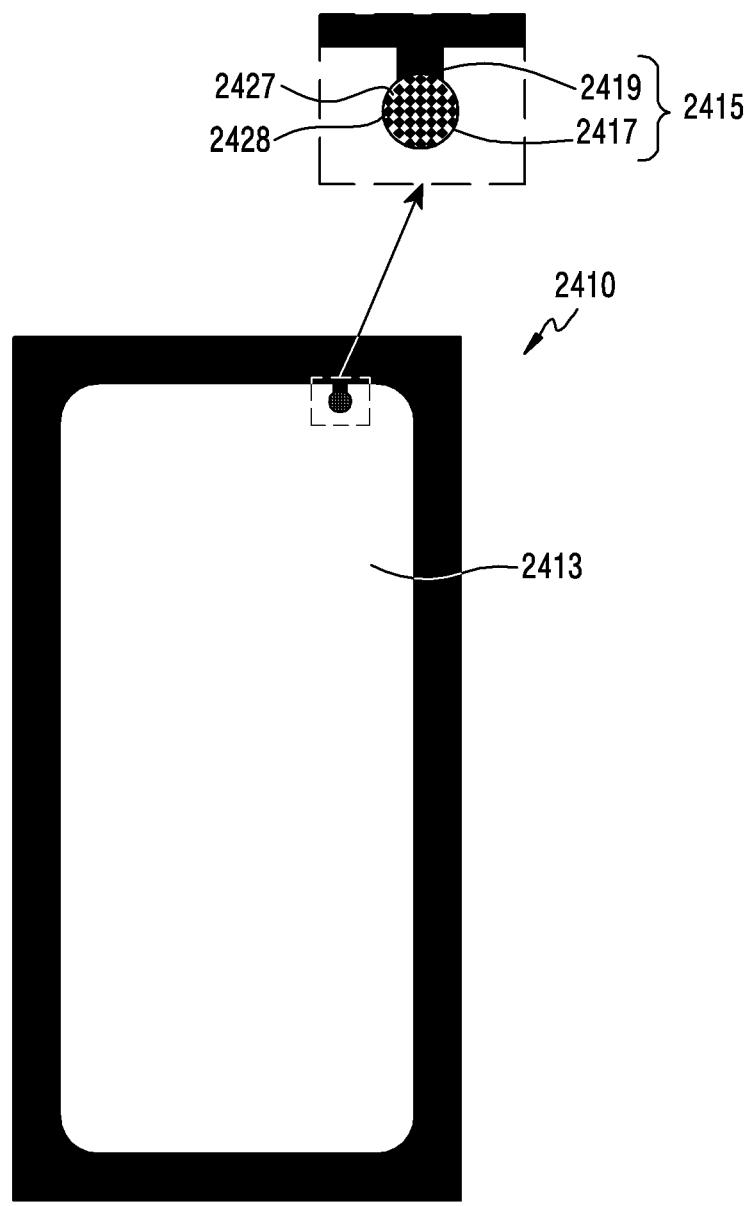
FIG. 24A is a plan view of masks for the display according to the second embodiment.
Figure 24B:
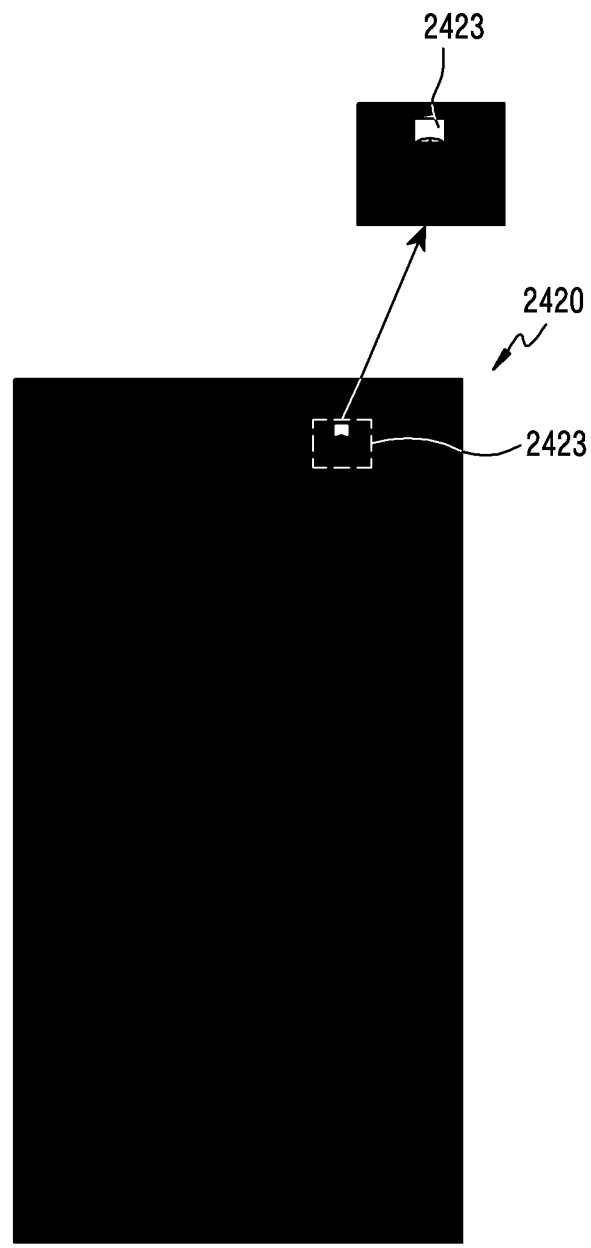
FIG. 24B is a plan view of masks for the display according to the second embodiment.
Figure 25A:
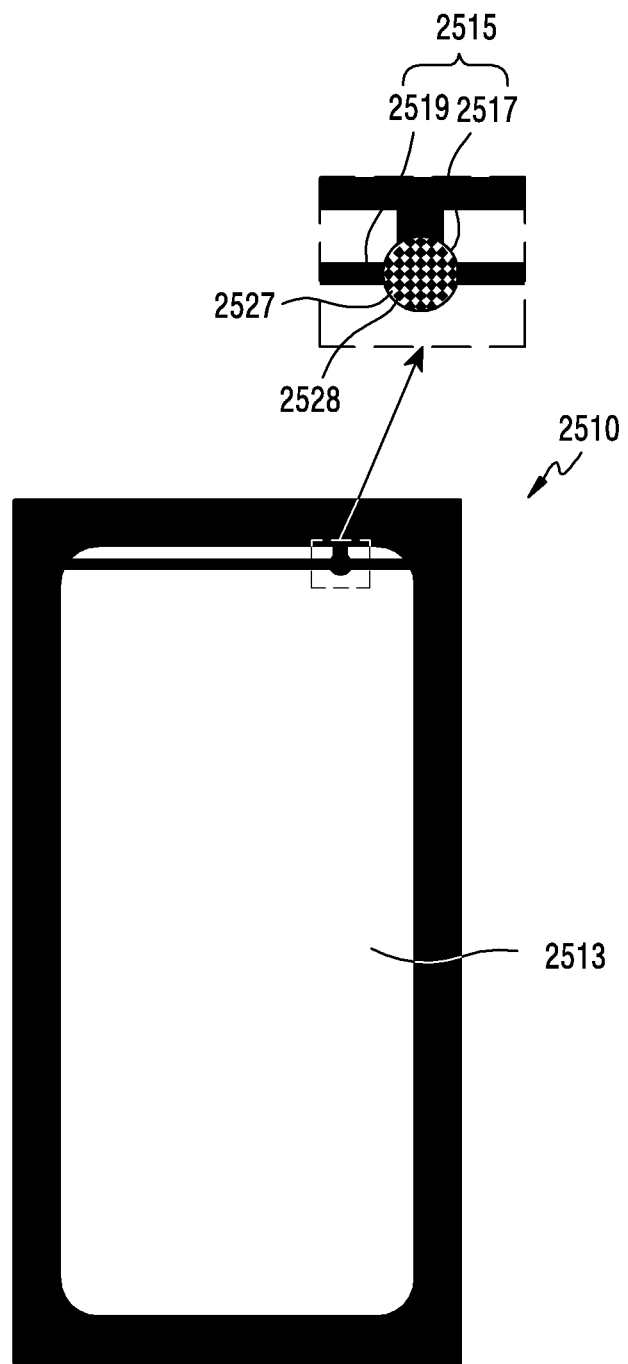
FIG. 25A is a plan view of masks for the display according to the second embodiment.
Figure 25B:
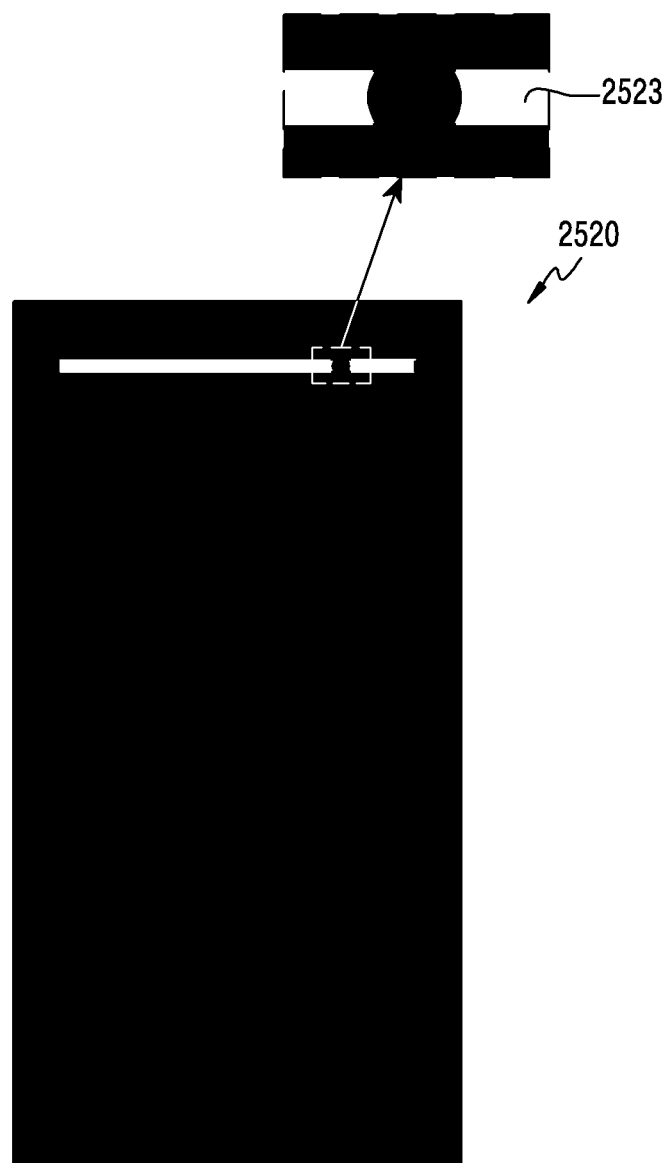
FIG. 25B is a plan view of masks for the display according to the second embodiment.

FIG. 24A is a plan view of masks 2410 for a display (e.g., the display 410 in FIG. 4) according to the second embodiment. FIG. 24B is a plan view of masks 2420 for a display (e.g., the display 410 in FIG. 4) according to the second embodiment. FIG. 25A is a plan view of masks 2510 for a display (e.g., the display 410 in FIG. 4) according to the second embodiment. FIG. 25B is a plan view of masks 2520 for a display (e.g., the display 410 in FIG. 4) according to the second embodiment.

Referring to FIGS. 24A, 24B, 25A, and 25B, the masks 2410, 2420, 2510, and 2520 according to the second embodiment may be provided for manufacturing a display. The mask 2410, 2420, 2510, or 2520 may include at least one of a first mask 2410 or 2510 and a second mask 2420 or 2520. The first mask 2410 or 2510 may be the same as or similar to the first mask 2210 or 2310 of FIG. 22A or FIG. 23A, and the second mask 2420 or 2520 may be the same as or similar to the second mask 2220 or 2320 of FIG. 22B or FIG. 23B. Thus, a redundant description thereof may be omitted.

According to the masks 2410, 2420, 2510, and 2520 according to the second embodiment, the floating portion 2417 or 2517 of the first mask 2410 or 2510 may include at least one through hole 2427 or 2527, and a pattern portion 2428 or 2528 surrounding each through hole 2427 or 2527. For example, in the floating portion 2417 or 2517, a plurality of through holes 2427 or 2527 may be arranged to be spaced apart from each other with the pattern portions 2428 or 2528 therebetween. As an example, the pattern portions 2428 or 2528 may be formed in a checkerboard pattern. As another example, the pattern portions 2428 or 2528 may be formed in a grid pattern.

According to the second embodiment, on the basis of the masks 2410, 2420, 2510, and 2520, a display may be manufactured. As an example, at least one of a display panel, a touch panel, a polarization member, and an adhesive member may be disposed through the first opening 2413 or 2513 of the first mask 2410 or 2510 and the through holes 2427 or 2527 in the floating portion 2410 or 2510. At least one of the display panel, the touch panel, the polarization member, and the adhesive member may be disposed in an area in the first opening 2413 or 2513, except for the pattern portions 2428 or 2528 of the floating portion 2417 or 2517 and the bridge portion 2419 or 2519. Thereby, when the first mask 2410 or 2510 is removed, an empty space may be formed to correspond to the pattern portions 2428 or 2528 of the floating portion 2417 or 2517 and the bridge portion 2419 or 2519. Thereafter, through the second opening 2423 or 2523 of the second mask 2420 or 2520, the empty space corresponding to the bridge portion 2419 or 2519 may be filled. In addition, after the second mask 2410 or 2510 is removed, the rest of the display panel, the touch panel, the polarization member, or the adhesive member may be formed. As another example, in forming at least two of the display panel, the touch panel, the polarization member, and the adhesive member, the first mask 2410 or 2510 and the second mask 2420 or 2520 may be used alternately. Accordingly, a sensor may be disposed on the rear face of the display and may be exposed through the display. The sensor may be exposed through an opening formed through the pattern portions 2428 or 2528 at the position of the floating portion 2417 or 2517.

Figure 26A:
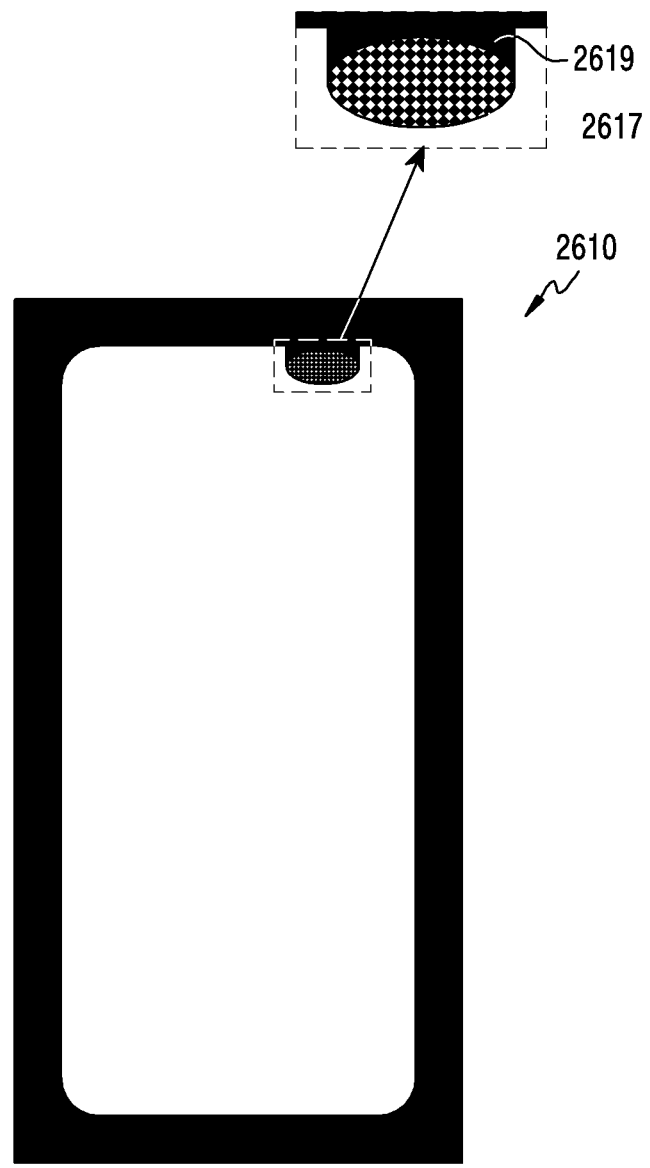
FIG. 26A is a plan view of masks for the display according to the third embodiment.
Figure 26B:
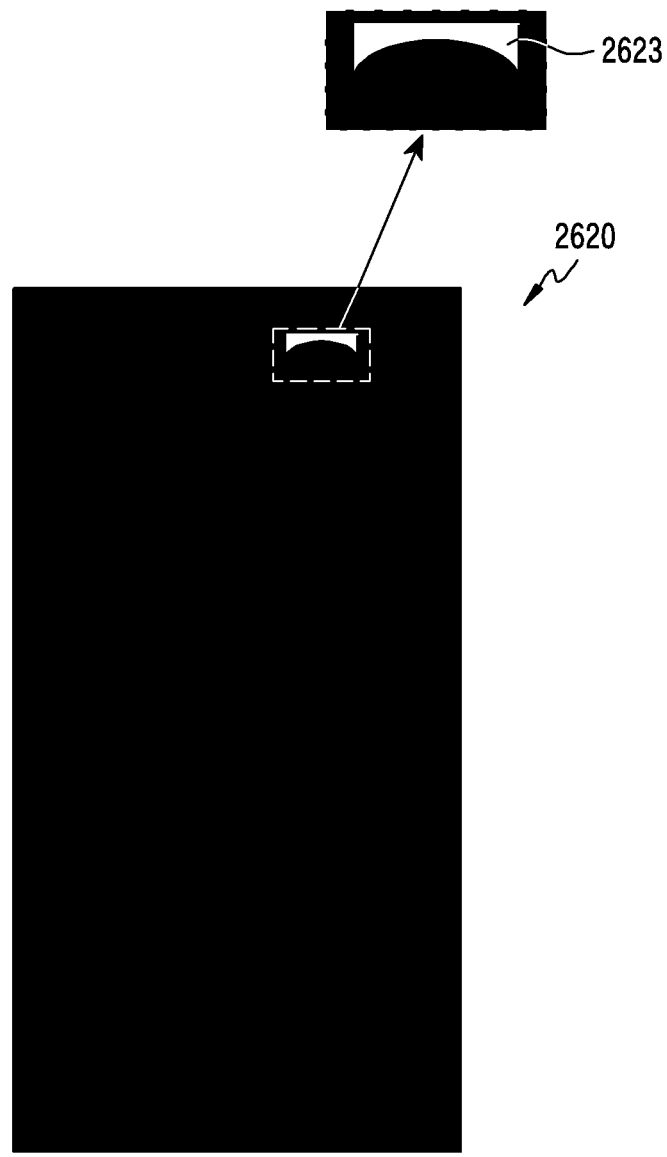
FIG. 26B is a plan view of masks for the display according to the third embodiment.
Figure 27A:
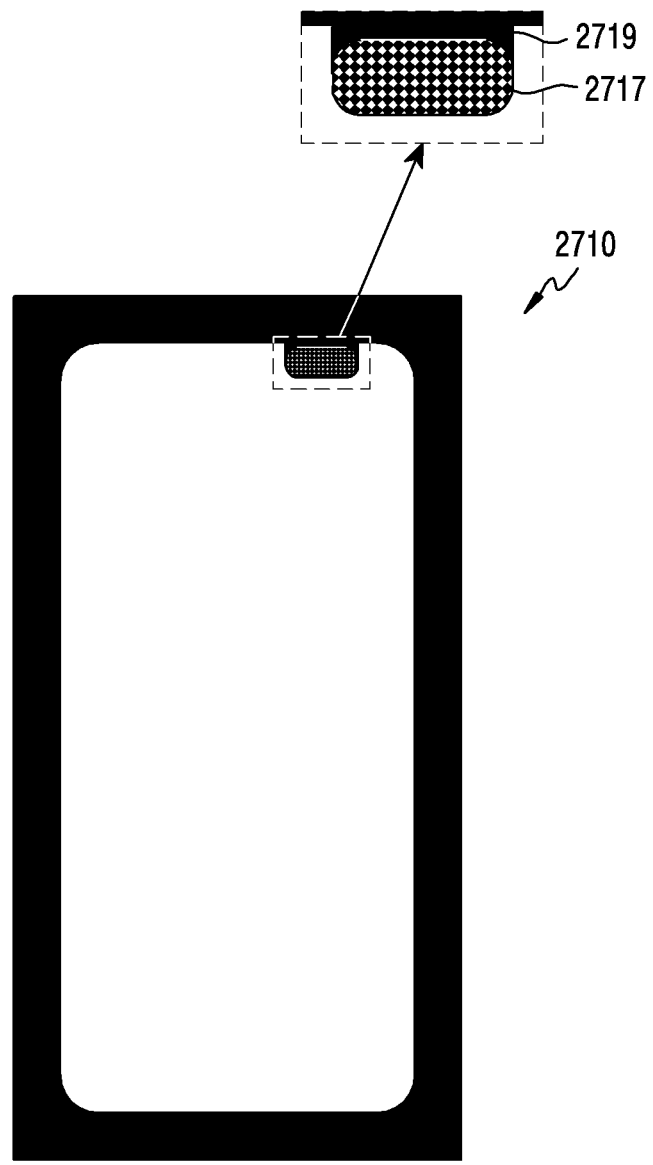
FIG. 27A is a plan view of masks for the display according to the third embodiment.
Figure 27B:
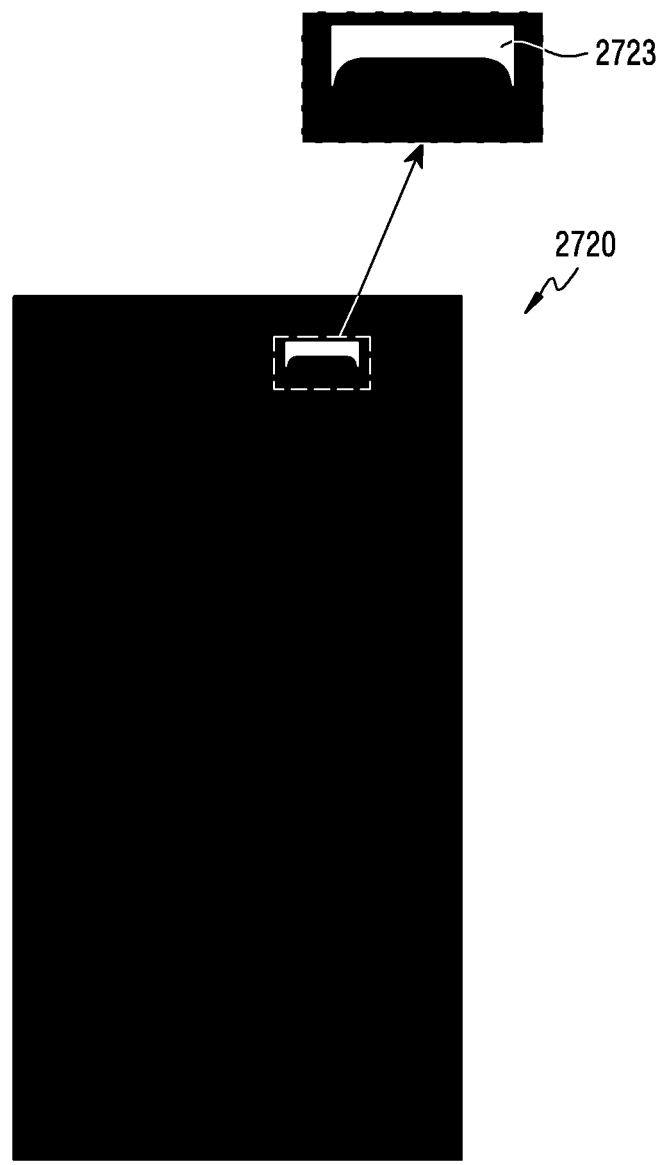
FIG. 27B is a plan view of masks for the display according to the third embodiment.

FIG. 26A is a plan view of masks 2610 for a display (e.g., the display 410 in FIG. 4) according to the third embodiment. FIG. 26B is a plan view of masks 2620 for a display (e.g., the display 410 in FIG. 4) according to the third embodiment. FIG. 27A is a plan view of masks 2710 for a display (e.g., the display 410 in FIG. 4) according to the third embodiment. FIG. 27B is a plan view of masks 2720 for a display (e.g., the display 410 in FIG. 4) according to the third embodiment.

Referring to FIGS. 26A, 26B, 27A, and 27B, the masks 2610, 2620, 2710, and 2720 according to the third embodiment may be provided for manufacturing a display. The mask 2610, 2620, 2710, or 2720 may include at least one of a first mask 2610 or 2710 and a second mask 2620 or 2720. The first mask 2610 or 2710 may be the same as or similar to the first mask 2210, 2310, 2410, or 2510 of FIG. 22A, FIG. 23A, FIG. 24A, or FIG. 25A, and the second mask 2620 or 2720 may be the same as or similar to the second mask 2220, 2320, 2420, or 2520 of FIG. 22B, 23B, 24B or FIG. 25B. Thus, a redundant description thereof may be omitted.

According to the masks 2610, 2620, 2710, and 2720 according to the third embodiment, the floating portions 2617 and 2717 may be formed in various shapes. For example, the floating portions 2617 and 2717 may be formed in at least one of a circular shape, an elliptical shape, and a polygonal shape. As an example, the floating portion 2617 may be formed in an elliptical shape as illustrated 26A. As an embodiment, the floating portion 2717 may be formed in a rectangular shape with rounded corners as illustrated in FIG. 27A. The second opening 2623 or 2723 of the second mask 2620 or 2720 may be disposed to correspond to the bridge portion 2619 or 2719 of the first mask 2610 or 2710.

Figure 28A:
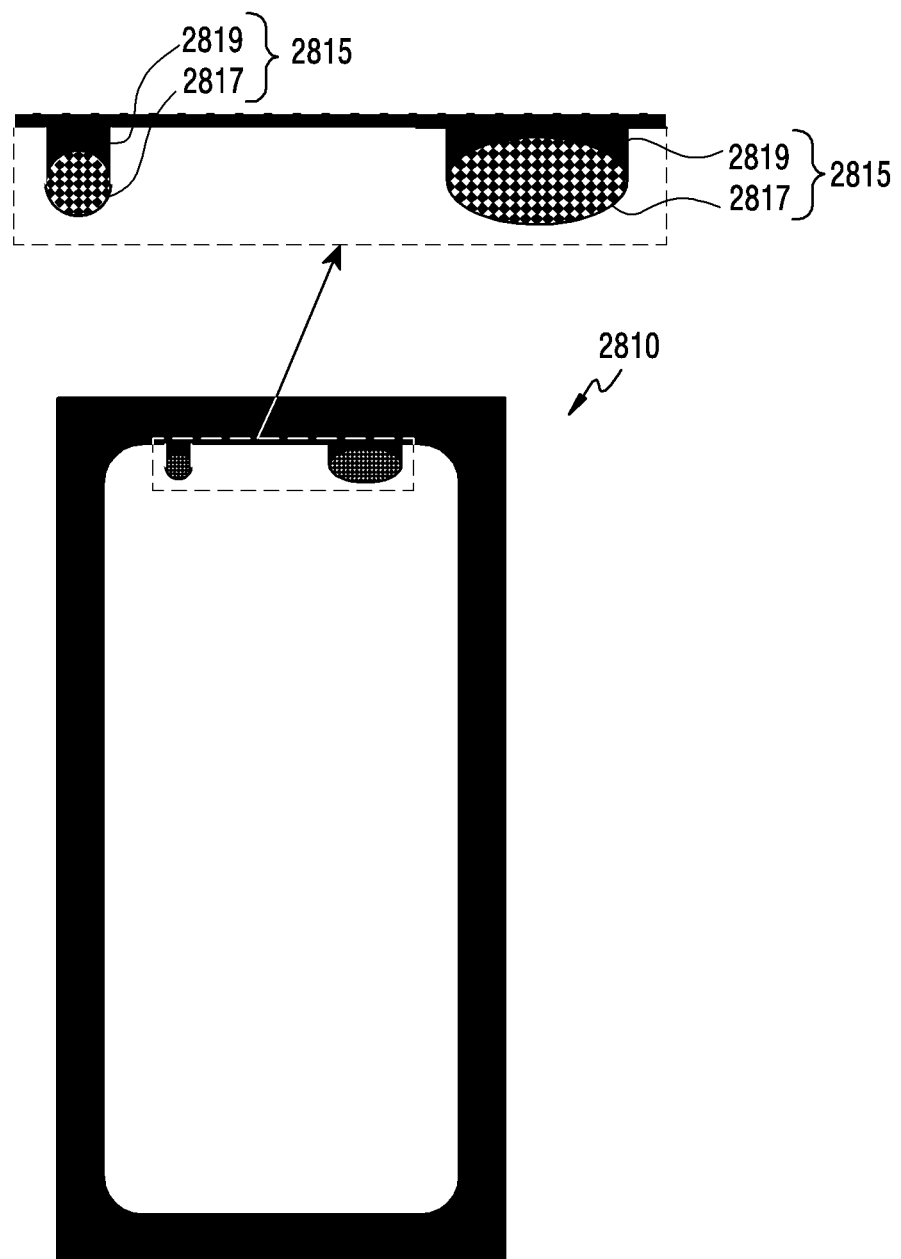
FIG. 28A is a plan view of masks for the display according to the fourth embodiment.
Figure 28B:
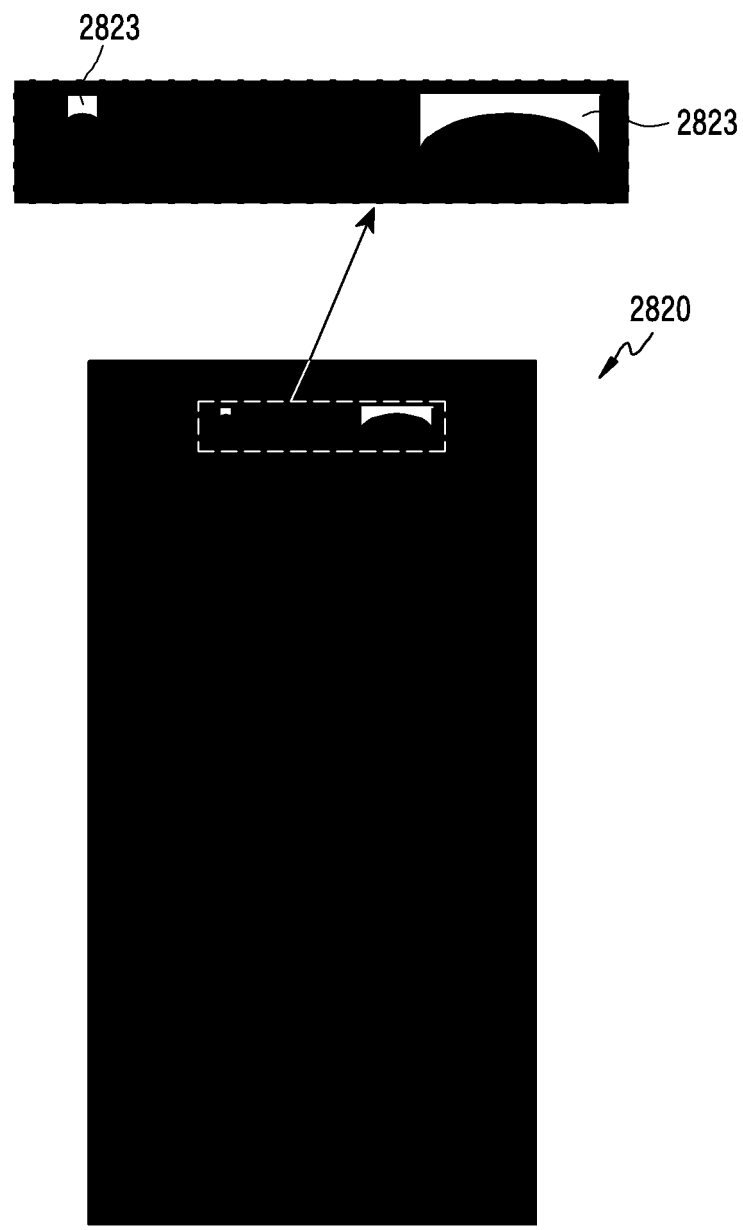
FIG. 28B is a plan view of masks for the display according to the fourth embodiment.

FIG. 28A is a plan view of masks 2810 for a display (e.g., the display 410 in FIG. 4) according to the fourth embodiment. FIG. 28B is a plan view of masks 2820 for a display (e.g., the display 410 in FIG. 4) according to the fourth embodiment.

Referring to FIGS. 28A and 28B, the masks 2810 and 2820 according to the fourth embodiment may be provided for manufacturing a display. The mask 2810 or 2820 may include at least one of a first mask 2810 and a second mask 2820. The first mask 2810 may be the same as or similar to the first mask 2210, 2310, 2410, 2510, 2610, or 2710 of FIG. 22A, FIG. 23A, FIG. 24A, FIG. 25A, FIG. 26A, or FIG. 27A, and the second mask 2820 may be the same as or similar to the second mask 2220, 2320, 2420, 2520, 2620, or 2720 of FIG. 22B, 23B, 24B, FIG. 25B, FIG. 26B, or FIG. 27B. Thus, a redundant description thereof may be omitted.

According to the masks 2810 and 2820 according to the fourth embodiment, the first mask 2810 may include a plurality of protrusions 2815. The protrusions 2815 may be disposed to be spaced apart from each other, and may be disposed to be connected with each other. In the protrusions 2815, the floating portions 2817 may be formed in the same shape or may be formed in different shapes. In the protrusions 2815, the bridge portions 2819 may be connected to the floating portions 2817, respectively, and may be formed in the same shape or in different shapes. The second mask 2820 may include a plurality of second openings 2823, and the second openings 2823 may be formed to correspond to the bridge portions 2819 of the first mask 2810.

Figure 29A:
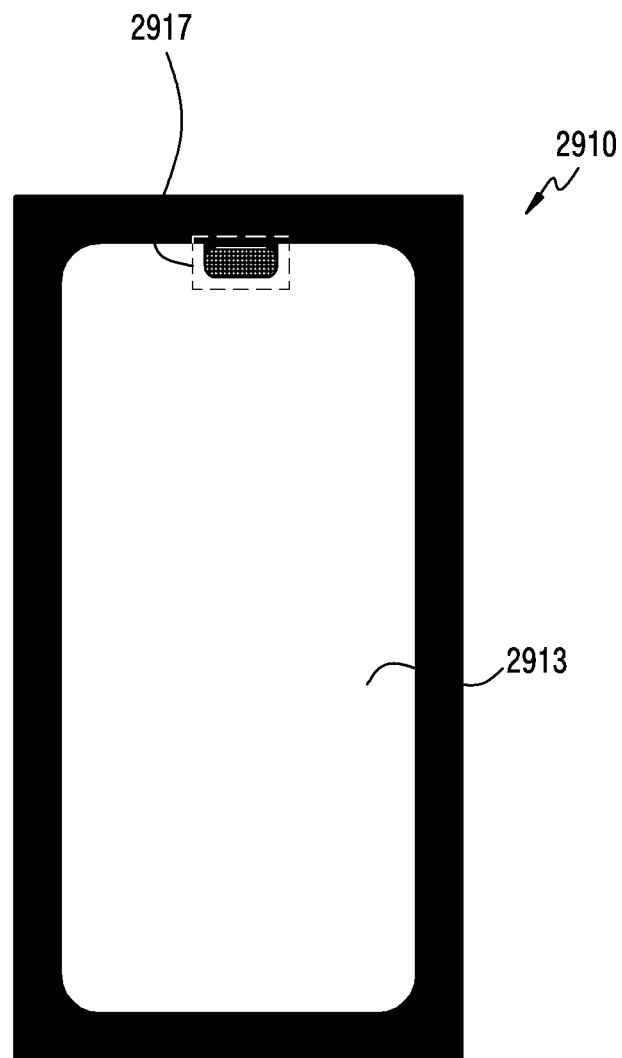
FIG. 29A is a plan view of masks for the display according to the fifth embodiment.
Figure 29B:
FIG. 29B is a plan view of masks for the display according to the fifth embodiment.

FIG. 29A is a plan view of masks 2910 for a display (e.g., the display 410 in FIG. 4) according to the fifth embodiment. FIG. 29B is a plan view of masks 2920 for a display (e.g., the display 410 in FIG. 4) according to the fifth embodiment.

Referring to FIGS. 29A and 29B, the masks 2910 and 2920 according to the fifth embodiment may be provided for manufacturing a display. The mask 2910 or 2920 may include at least one of a first mask 2910 and a second mask 2920. The first mask 2910 may be the same as or similar to the first mask 2210, 2310, 2410, 2510, 2610, 2710, or 2810 of FIG. 22A, FIG. 23A, FIG. 24A, FIG. 25A, FIG. 26A, FIG. 27A, or FIG. 28A, and the second mask 2920 may be the same as or similar to the second mask 2220, 2320, 2420, 2520, 2620, 2720, or 2820 of FIG. 22B, 23B, 24B, FIG. 25B, FIG. 26B, FIG. 27B, or FIG. 28B. Thus, a redundant description thereof may be omitted.

According to the masks 2910 and 2920 according to the fifth embodiment, the floating portion 2917 may be disposed at various positions within the first opening 2913. As an example, the floating portion 2917 may be disposed in the middle area between any two of the corners of the first opening 2913. As another example, the floating portion 2917 may be disposed in the central area of the first opening 2913. As another example, the floating portion 2917 may be disposed at any one of the corners of the first opening 2913.

Figure 30:
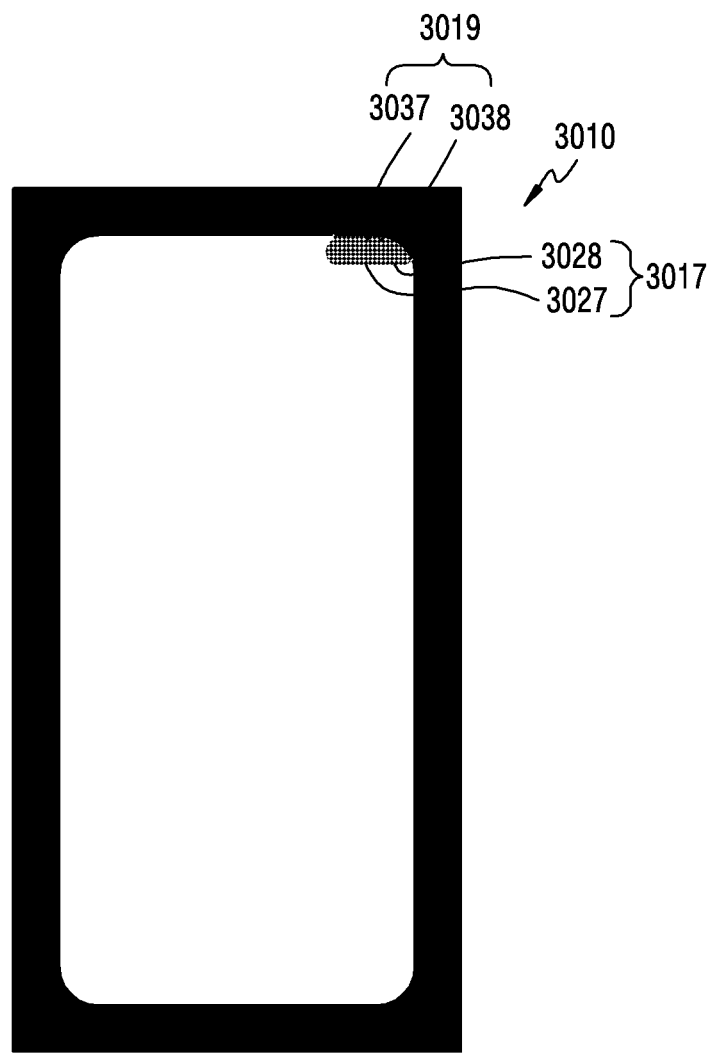
FIG. 30 and FIG. 31 are plan views of masks for the display according to the sixth embodiment.
Figure 31:
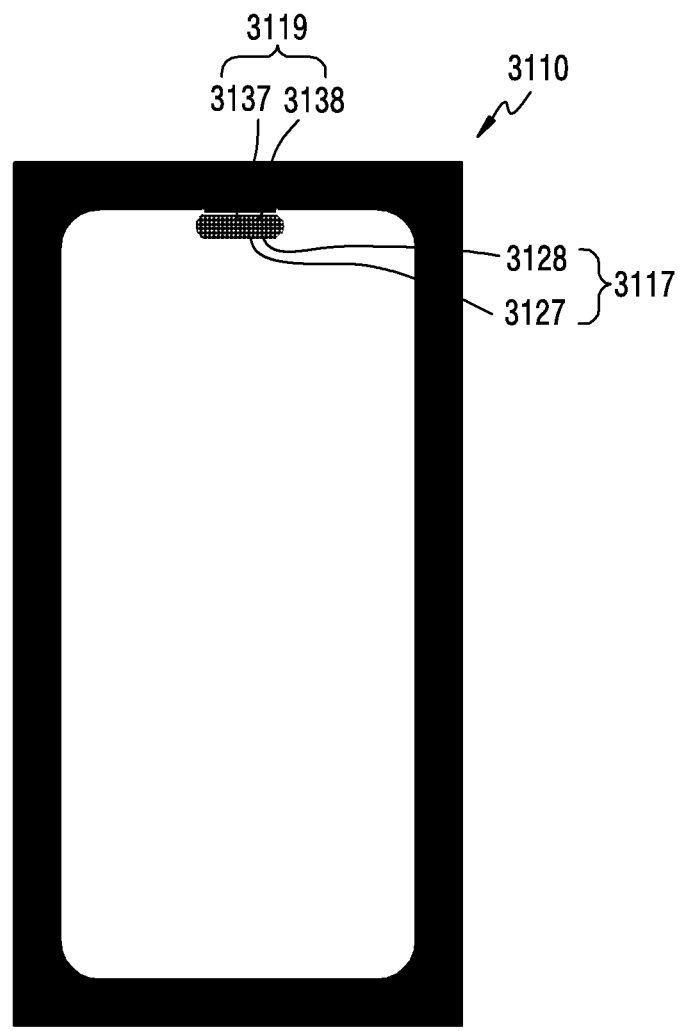

FIGS. 30 and 31 are plan views of masks 3010 and 3110 for a display (e.g., the display 410 in FIG. 4) according to the sixth embodiment.

Referring to FIGS. 30 and 31, the masks 3010 and 3110 according to the sixth embodiment may be provided for manufacturing a display. The mask 3010 or 3110 may be the same as or similar to the first mask 2210, 2310, 2410, 2510, 2610, 2710, 2810, or 2910 of FIG. 22A, FIG. 23A, FIG. 24A, FIG. 25A, FIG. 26A, FIG. 27A, FIG. 28A, or FIG. 29A, and a redundant description thereof may be omitted.

According to the masks 3010 and 3110 according to the sixth embodiment, the bridge portion 3019 or 3119 may include at least one through hole 3037 or 3137 and a pattern portion 3038 or 3138 surrounding the through hole 3037 or 3137, like the floating portion 3017 or 3117. For example, in the bridge portion 3019 or 3119, a plurality of through holes 3037 or 3137 may be arranged to be spaced apart from each other with the pattern portions 3038 or 3138 therebetween. As an example, the pattern portions 3038 or 3138 may be formed in a checkerboard pattern. As another example, the pattern portions 3038 or 3138 may be formed in a grid pattern.

According to the sixth embodiment, on the basis of the masks 3010 and 3110, a display may be manufactured. For example, at least one of a display panel, a touch panel, a polarization member, and an adhesive member may be disposed through the first opening 3013 or 3113 in the mask 3010 or 3110, the through holes 3027 or 3127 in the floating portion 3017 or 3117, and the through holes 3037 or 3137 in the bridge portion 3019 or 3119. At least one of the display panel, the touch panel, the polarization member, and the adhesive member may be disposed in an area in the first opening 3013 or 3113, except for the pattern portions 3028 or 3128 of the floating portion 3017 or 3117 and pattern portions 3038 or 3138 of the bridge portion 3019 or 3119. Thereby, when the mask 3010 or 3110 is removed, an empty space may be formed to correspond to the pattern portions 3028 or 3128 of the floating portion 3017 or 3117 and the pattern portions 3038 or 3138 of the bridge portion 3019 or 3119. Accordingly, a sensor may be disposed on the rear face of the display and may be exposed through the display. The sensor may be exposed through an opening formed through the pattern portions 3028 or 3128 of the floating portion 3017 or 3117 at the position of the floating portion 3017 or 3117.

Figure 32A:
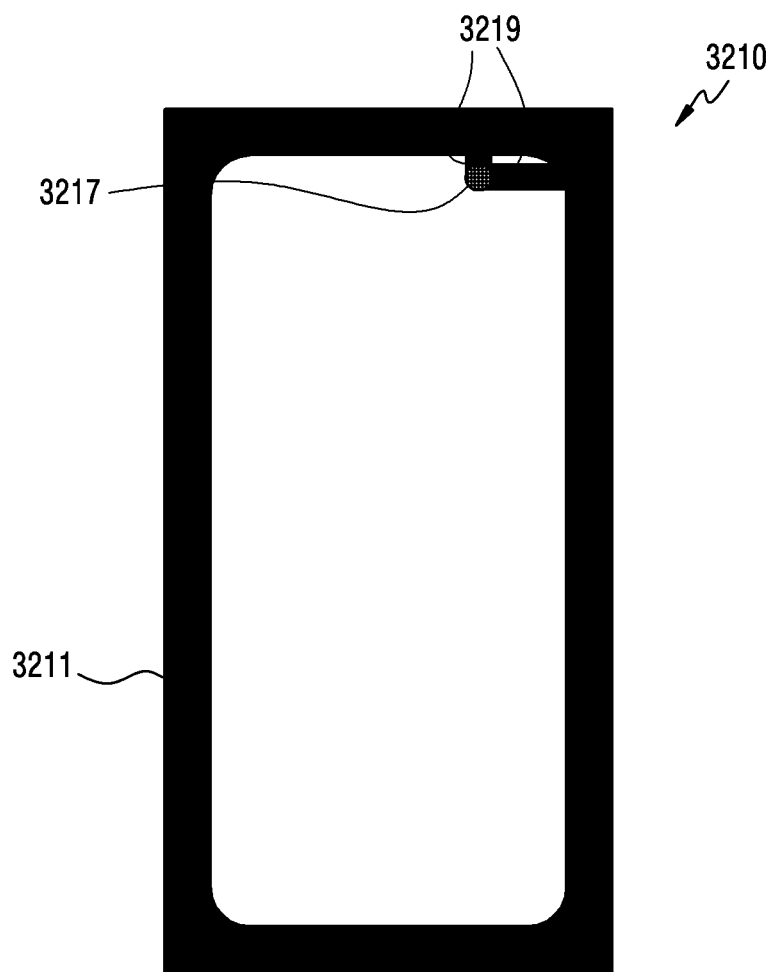
FIG. 32A is a plan view of masks for the display according to the seventh embodiment.
Figure 32B:
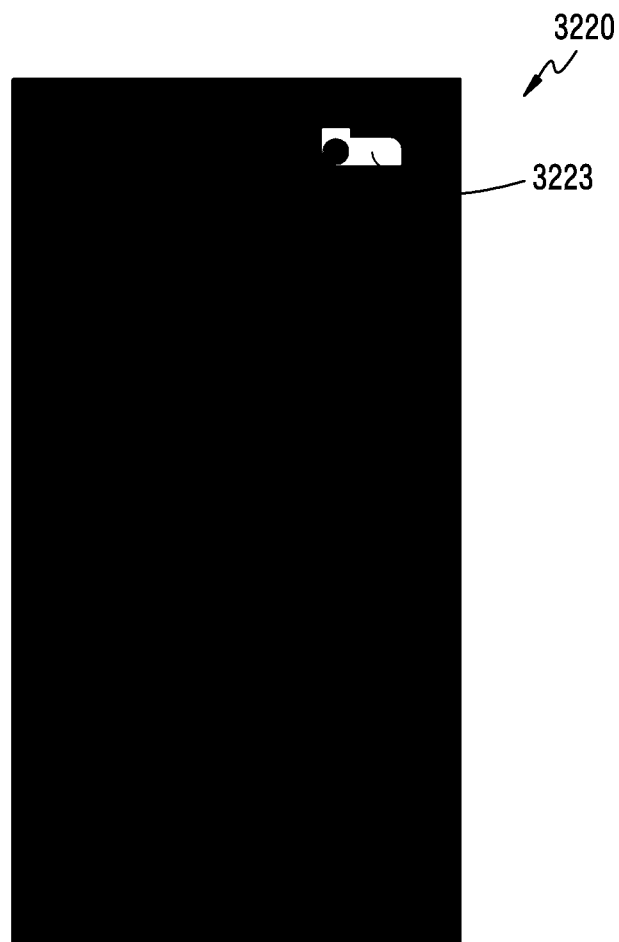
FIG. 32B is a plan view of masks for the display according to the seventh embodiment.
Figure 33A:
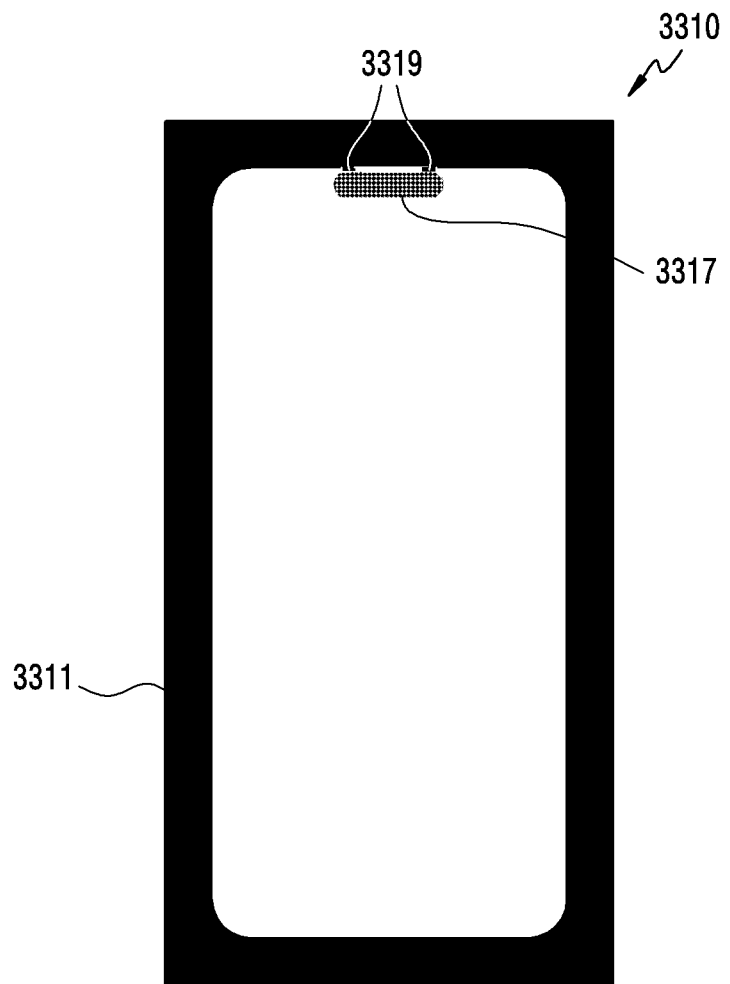
FIG. 33A is a plan view of masks for the display according to the seventh embodiment.
Figure 33B:
FIG. 33B is a plan view of masks for the display according to the seventh embodiment.

FIG. 32A is a plan view of masks 3210 for a display (e.g., the display 410 in FIG. 4) according to the seventh embodiment. FIG. 32B is a plan view of masks 3220 for a display (e.g., the display 410 in FIG. 4) according to the seventh embodiment. FIG. 33A is a plan view of masks 3310 for a display (e.g., the display 410 in FIG. 4) according to the seventh embodiment. FIG. 33B is a plan view of masks 3320 for a display (e.g., the display 410 in FIG. 4) according to the seventh embodiment.

Referring to FIGS. 32A, 32B, 33A, and 33B, the masks 3210, 3220, 3310, and 3320 according to the seventh embodiment may be provided for manufacturing a display. The mask 3210, 3220, 3310, or 3320 may include at least one of a first mask 3210 or 3310 and a second mask 3220 or 3320. The first mask 3210 or 3310 may be the same as or similar to the first mask 2210, 2310, 2410, 2510, 2610, 2710, 2810, or 2910 of FIG. 22A, FIG. 23A, FIG. 24A, FIG. 25A, FIG. 26A, FIG. 27A, FIG. 28A, or FIG. 29A, and the second mask 3220 or 3320 may be the same as or similar to the second mask 2220, 2320, 2420, 2520, 2620, 2720, 2820, or 2920 of FIG. 22B, 23B, 24B, FIG. 25B, FIG. 26B, FIG. 27B, FIG. 28B, or FIG. 29B. Thus, a redundant description thereof may be omitted.

According to the mask 3210, 3220, 3310, and 3320 according to the seventh embodiment, the bridge portions 3219 and 3319 may extend from a plurality of points in the frames 3211 and 3311, and may be connected to the floating portions 3217 and 3317. As an example, as illustrated in FIG. 32A, the bridge portions 3219 may extend from points spaced apart from each other in the frame 3211 to extend in a plurality of directions intersecting each other, with the floating portion 3217 as a center. As another example, as illustrated in FIG. 33A, the bridge portions 3319 may extend from points arranged on one side with respect to an axis passing through the floating portion 3317 in the frame 3311. The second openings 3223 or 3323 in the second mask 3220 or 3320 may be disposed to correspond to the bridge portions 3219 or 3319 of the first mask 3210 or 3310.

Figure 34A:
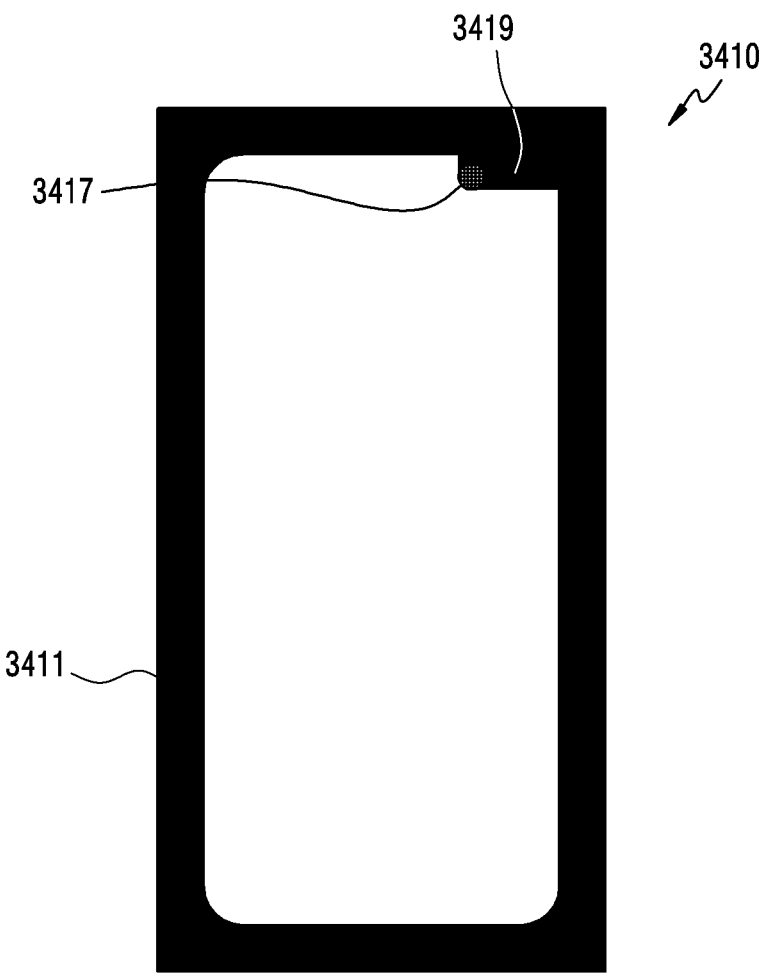
FIG. 34A is a plan view of masks for the display according to the eighth embodiment.
Figure 34B:
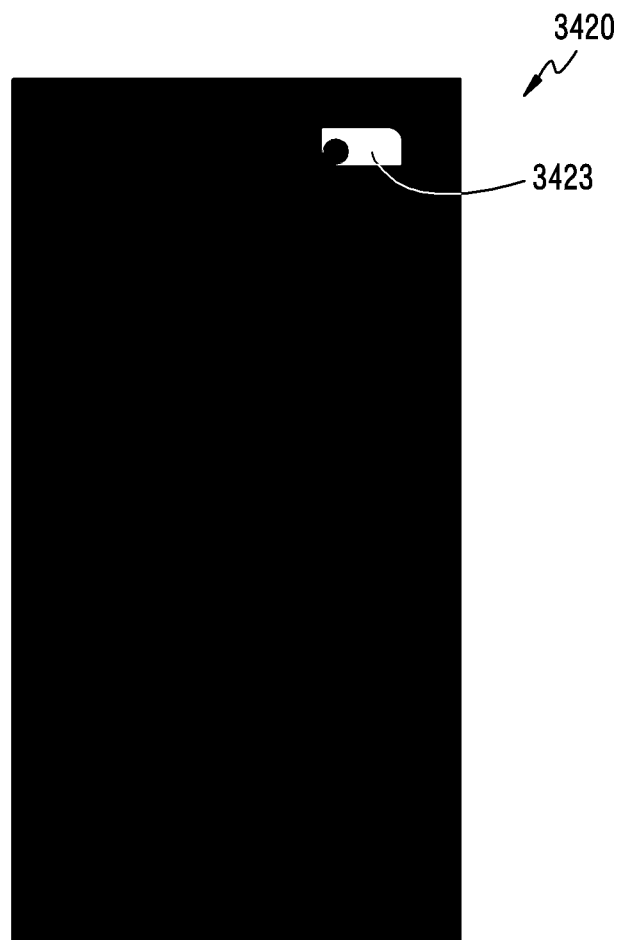
FIG. 34B is a plan view of masks for the display according to the eighth embodiment.

FIG. 34 is a plan views of masks 3410 and 3420 for a display (e.g., the display 410 in FIG. 4) according to the eighth embodiment. FIG. 34B is a plan view of masks 3410 and 3420 for a display (e.g., the display 410 in FIG. 4) according to the eighth embodiment.

Referring to FIGS. 34A and 34B, the masks 3410 according to the eighth embodiment may be provided for manufacturing a display. The mask 3420 may include at least one of a first mask 3410 and a second mask 3420. The first mask 3410 may be the same as or similar to the first mask 2210, 2310, 2410, 2510, 2610, 2710, 2810, 2910, 3210, or 3310 of FIG. 22A, FIG. 23A, FIG. 24A, FIG. 25A, FIG. 26A, FIG. 27A, FIG. 28A, FIG. 29A, FIG. 32A, or FIG. 33A or the mask 3010 or 3110 of FIG. 30 or FIG. 31, and the second mask 3420 or 3520 may be the same as or similar to the second mask 2220, 2320, 2420, 2520, 2620, 2720, 2820, 2920, 3220, or 3320 of FIG. 22B, 23B, 24B, FIG. 25B, FIG. 26B, FIG. 27B, FIG. 28B, FIG. 29B, FIG. 32B, or FIG. 33B. Thus, a redundant description thereof may be omitted.

According to the masks 3410 and 3420 of the eighth embodiment, a bridge portion 3419 may extend from any one of the corners of the frame 3411 to the floating portion 3417. The bridge portions 3419 may extend in a plurality of directions intersecting each other with the floating portion 3417 as a center. The second opening 3423 in the second mask 3420 may be disposed to correspond to the bridge portions 3219 of the first mask 3410.

Figure 35A:
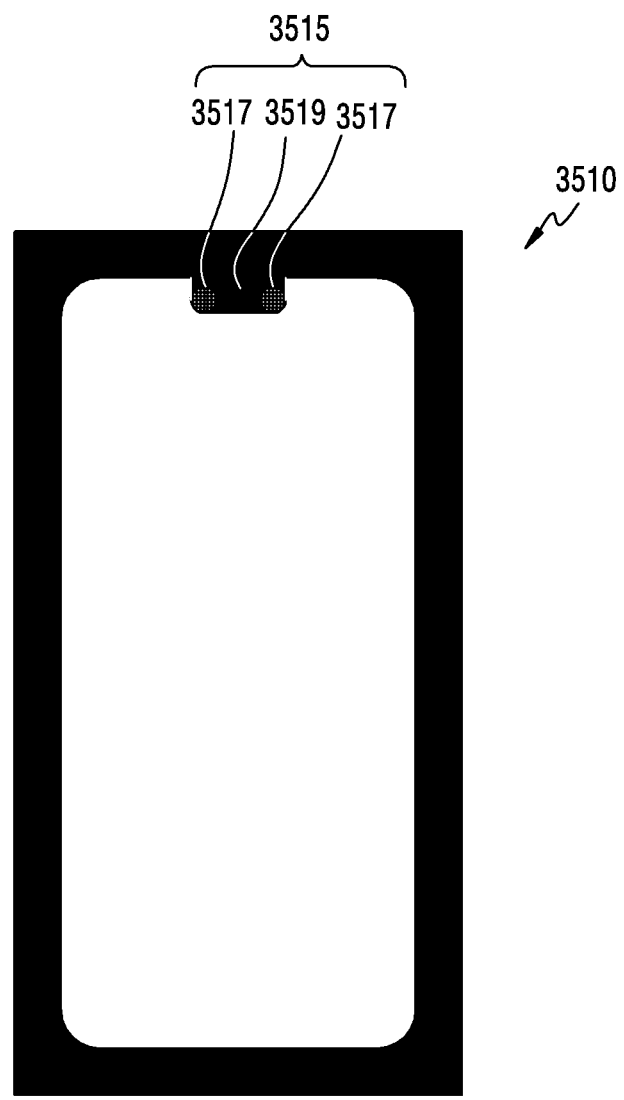
FIG. 35A is a plan view of masks for the display according to the ninth embodiment.
Figure 35B:
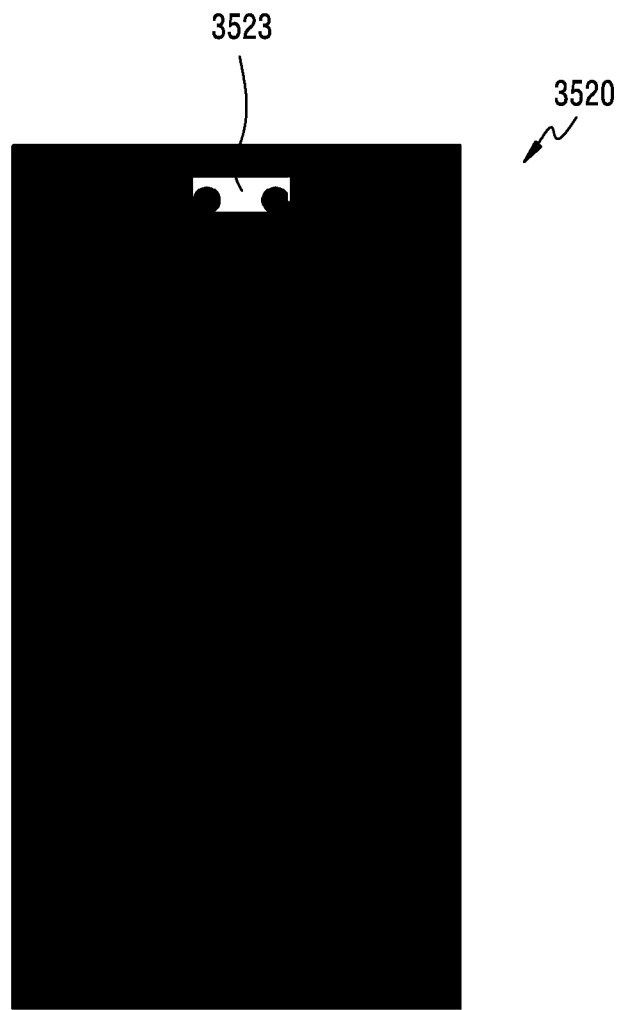
FIG. 35B is a plan view of masks for the display according to the ninth embodiment.

FIG. 35A is a plan view of masks 3510 and 3520 for a display (e.g., the display 410 in FIG. 4) according to the ninth embodiment. FIG. 35B is a plan view of masks 3510 and 3520 for a display (e.g., the display 410 in FIG. 4) according to the ninth embodiment.

Referring to FIGS. 35A and 35B, the masks 3510 according to the ninth embodiment may be provided for manufacturing a display. The mask 3520 may include at least one of a first mask 3510 and a second mask 3520. The first mask 3510 may be the same as or similar to the first mask 2210, 2310, 2410, 2510, 2610, 2710, 2810, 2910, 3210, 3310, or 3410 of FIG. 22A, FIG. 23A, FIG. 24A, FIG. 25A, FIG. 26A, FIG. 27A, FIG. 28A, FIG. 29A, FIG. 32A, or FIG. 33A or the mask 3010 or 3110 of FIG. 30 or FIG. 31, and the second mask 3520 may be the same as or similar to the second mask 2220, 2320, 2420, 2520, 2620, 2720, 2820, 2920, 3220, 3320, or 3420 of FIG. 22B, 23B, 24B, FIG. 25B, FIG. 26B, FIG. 27B, FIG. 28B, FIG. 29B, FIG. 32B, FIG. 33B, or FIG. 34B. Thus, a redundant description thereof may be omitted.

According to the masks 3510 and 3520 according to the ninth embodiment, the protrusion 3515 may include a plurality of floating portions 3517 and at least one bridge portion 3519. The protrusions 3517 may be disposed to be spaced apart from each other, or may be disposed to be connected with each other. For example, the floating portions 3517 may be formed in the same shape or may be formed in different shapes. The bridge portion 3519 may be integrally connected with at least two floating portions 3517. The second opening 3523 in the second mask 3520 may be disposed to correspond to the bridge portion 3219 of the first mask 3510.

Figure 36A:
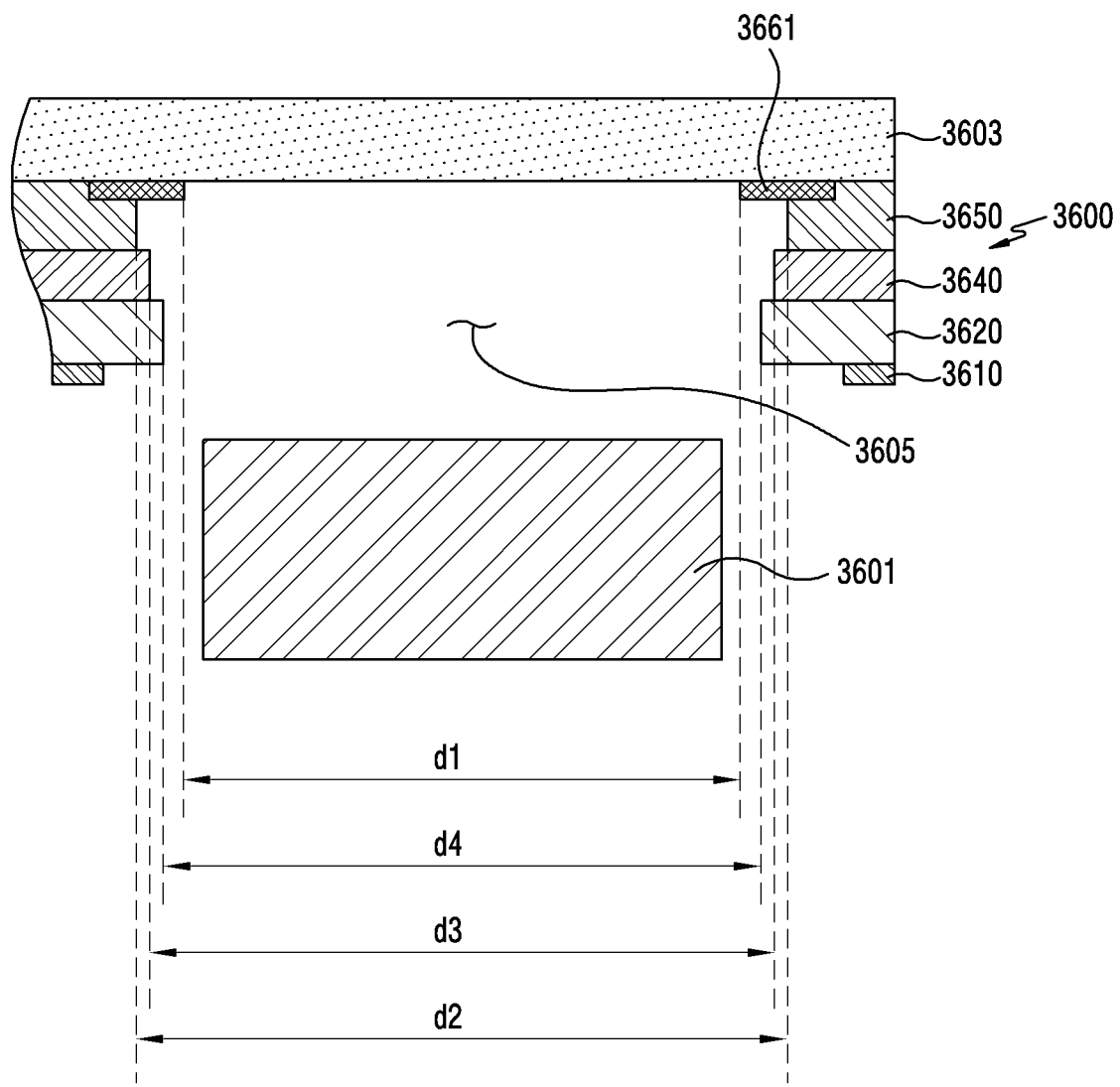
FIG. 36A is a cross-sectional view of a display according to a thirteenth embodiment.
Figure 36B:
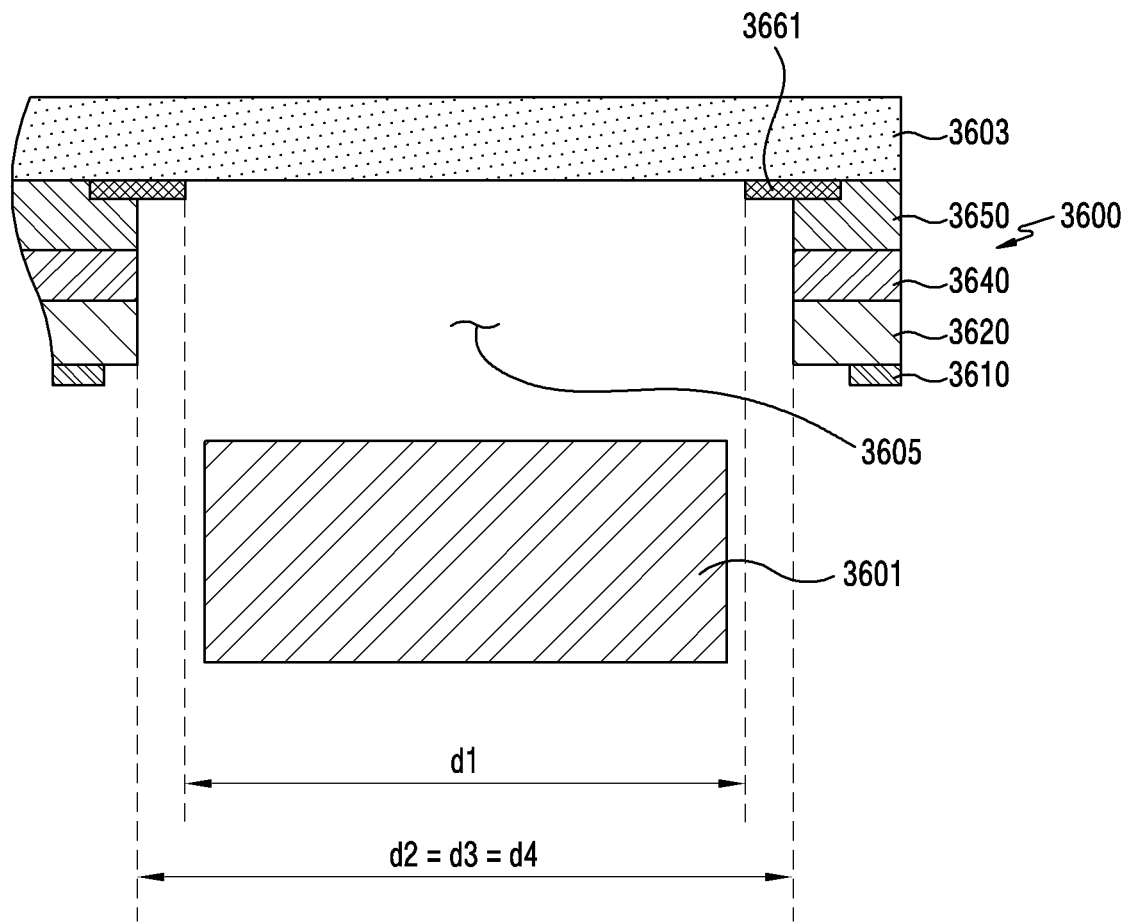
FIG. 36B is a cross-sectional view of a display according to a thirteenth embodiment.
Figure 36C:
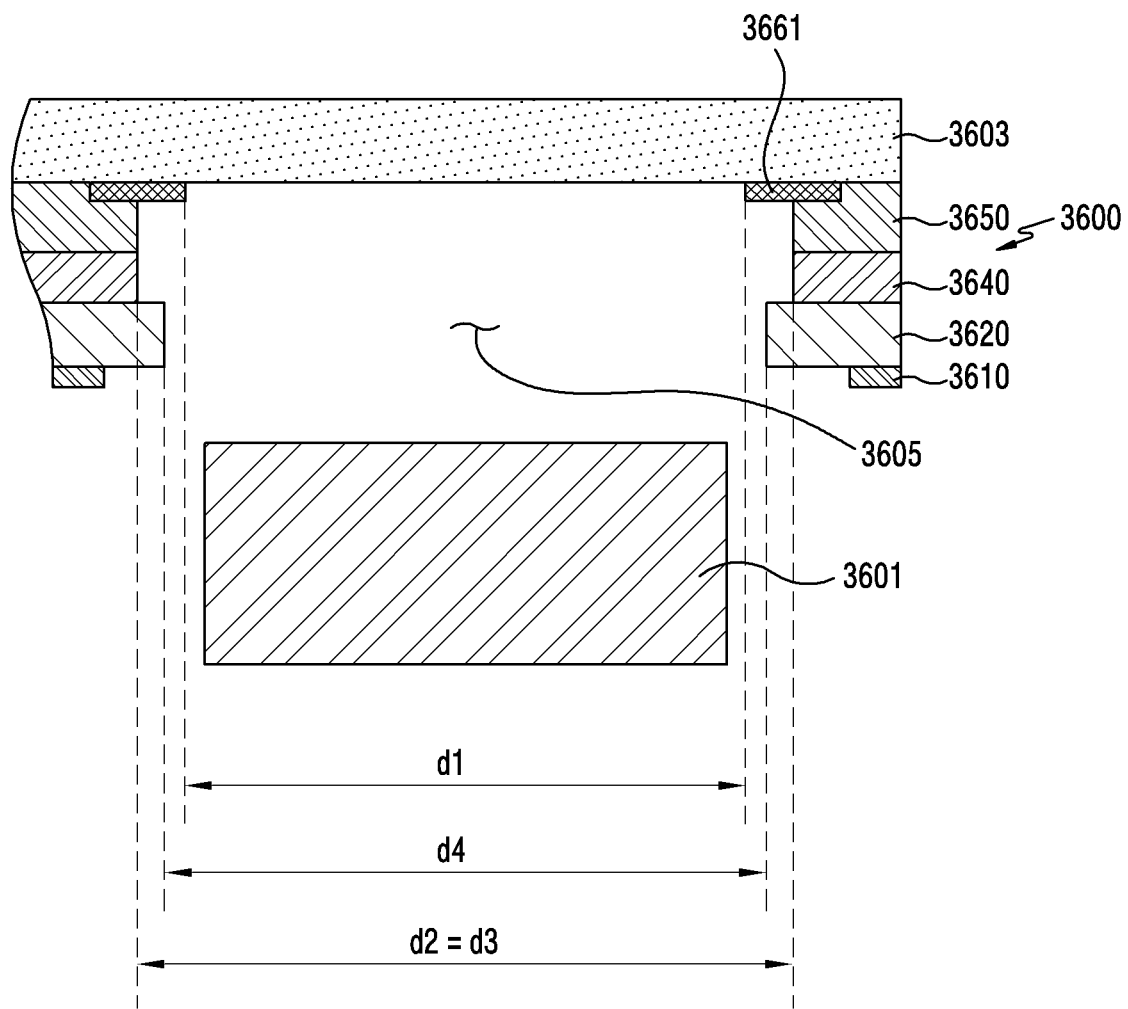
FIG. 36C is a cross-sectional view of a display according to a thirteenth embodiment.

FIG. 36A is a cross-sectional view of a display according to a thirteenth embodiment. FIG. 36B is a cross-sectional view of a display according to a thirteenth embodiment. FIG. 36C is a cross-sectional view of a display according to a thirteenth embodiment.

Referring to FIG. 36A, the display 3600 according to the thirteenth embodiment may be disposed below the window 3603, and may include an opening 3605 at a position corresponding to at least one sensor 3601. The display 3600 may include a support member 3610, a display panel 3620, a polarization member 3640, an adhesive member 3650, and an opaque member 3661. The support member 3601, the display panel 3620, the polarization member 3640, the adhesive member, and the opaque member 3661 may be sequentially stacked on the sensor 3601. The support member 3610, the display panel 3620, the polarization member 3640, the adhesive member 3650, and the opaque member 3661 may each include openings 3605 having different diameters. The at least one sensor 3601 may be located in at least a part of the opening 3605.

According to certain embodiments, the support member 3610 may be a bracket disposed within the electronic device. The support member 3610 may support at least one of the display panel 3620, the polarization member 3640, the adhesive member 3650, and the opaque member 3661.

According to certain embodiments, the display panel 3620 may emit light toward the window 3603 to display contents. The polarization member 3640 may transmit the light received from the window 3603 in a directional manner. The polarization member 3640 may transmit the light emitted from the display panel 3620 in a directional manner.

According to certain embodiments, the adhesive member 3650 may cause the polarization member 3640 to be directly bonded to the window 3603. The adhesive member 3650 may be formed of at least one of an OCA and a PSA.

According to certain embodiments, the display panel 3620, the polarization member 3640, and the adhesive member 3650 may include openings corresponding to the sensor portion. According to certain embodiments, the opaque member 3661 may be disposed along the periphery of the opening in the adhesive member 3650 to reduce the transmittance of that area. The opaque member 3661 may prevent the side faces of the display panel 3620, the polarization member 3640, and an adhesive member 3650 from being visible from the outside due to bubbles or openings, which may be formed between the window 3603 and the adhesive member 3650 having the openings formed therein. According to certain embodiments, the opaque member 3661 may be disposed between the window 3603 and the adhesive member 3650 using an ink, an opaque resin, or the like.

According to certain embodiments, the openings in the display panel 3620, the polarization member 3640, the adhesive member 3650, and the opaque member 3661 may have different sizes. The shapes of the openings may be the same as each other, and may be formed in a circular or polygonal annular shape.

According to certain embodiments, the openings 3605 in the display panel 3620, the polarization member 3640, the adhesive member 3650, and the opaque member 3661 may be formed to be larger than the size of the sensor 3601. When the size of the sensor 3601 is smaller than the diameter of the openings 3605, the sensor 3601 may be disposed to occupy at least a part of the openings 3605. According to an embodiment, the size of the openings 3605 may be smaller than the size of the sensor 3601, and the sensor 3601 may be disposed below the display panel 3620. When the size of the sensor 3601 is larger than the diameter of the openings 3605, the sensor 3601 may be located below the display panel 3620. The center of the openings 3605 may be substantially the same as the center of the sensor 3601. In the drawings described below, the size of the sensor may be smaller than the openings, and the sensor may occupy a part of the openings. The size of the sensor may be larger than the openings, and the sensor may be disposed below the openings.

According to certain embodiments, assuming that the openings in the display panel 3620, the polarization member 3640, the adhesive member 3650, and the opaque member 3650 have a circular shape, the diameter of the opening formed in the opaque member 3661 may be d1, the diameter of the opening formed in the adhesive member 3640 may be d2, the diameter of the opening formed in the polarization member 3620 may be d3, and the diameter of the opening formed in the display panel may be d4. The centers of the openings in the display panel 3620, the polarization member 3640, the adhesive member 3650, and the opaque member 3661 and the center of the sensor portion may be disposed on one axis. The diameter d1 of the opening formed in the opaque member 3661 may be the smallest among the openings in the display panel 3620, the polarization member 3640, the adhesive member 3650, and the opaque member 3661. The sizes of the openings in the remaining components may be made smaller in order of the diameter d2 of the opening formed in the display panel 3620, the diameter d3 of the opening formed in the polarization member 3640, and the diameter d4 of the opening formed in the adhesive member 3650.

According to certain embodiments, the opaque member 3661 may be disposed between the adhesive member 3650 and the window 3603 to prevent the visibility of bubbles formed in the adhesive member 3650. The diameter d1 of the opening formed in the opaque member 3661 may be set to be the smallest. The opaque member 3661 may overlap the side faces of the display panel 3620, the polarization member 3640, and the adhesive member 3650, and the opaque member 3661 may overlap the display panel 3620, and the opaque member 3661 may prevent the side face of at least one of the display panel 3620, the polarization member 3640, and the adhesive member 3650 from being visible from the outside. The opaque member 3661 may have a width that covers the lateral boundaries of the display panel 3620, the polarization member 3640, and the adhesive member 3650. The area in which the pixels formed in the display panel 3620 exist (e.g., an active area) may be disposed not to overlap the opaque member 3661.

Referring to FIG. 36B, the display 3600 may be disposed below the window 3603, and may include an opening 3605 at a position corresponding to at least one sensor 3601. The display 3600 may include a support member 3610, a display panel 3620, a polarization member 3640, an adhesive member 3650, and an opaque member 3661. The at least one sensor 3601 may be located in at least a part of the opening 3605.

According to certain embodiments, assuming that the openings in the display panel 3620, the polarization member 3640, the adhesive member 3650, and the opaque member 3650 have a circular shape, the diameter of the opening formed in the opaque member 3661 may be d1, the diameter of the opening formed in the adhesive member 3640 may be d2, the diameter of the opening formed in the polarization member 3620 may be d3, and the diameter of the opening formed in the display panel may be d4. The centers of the openings in the display panel 3620, the polarization member 3640, the adhesive member 3650, and the opaque member 3661, and the center of the sensor portion 3601 may be disposed on substantially the same axis. The diameter d1 of the opening formed in the opaque member 3661 may be the smallest among the openings in the display panel 3620, the polarization member 3640, the adhesive member 3650, and the opaque member 3661. The diameter d2 of the opening formed in the display panel 3620, the diameter d3 of the opening formed in the polarization member 3640, and the diameter d4 of the opening formed in the adhesive member 3650 may the same as each other.

Referring to FIG. 36C, the display 3600 may be disposed below the window 3603, and may include an opening 3605 at a position corresponding to at least one sensor 3601. The display 3600 may include a support member 3610, a display panel 3620, a polarization member 3640, an adhesive member 3650, and an opaque member 3661. The at least one sensor 3601 may be located in at least a part of the openings 3605.

According to certain embodiments, assuming that the openings in the display panel 3620, the polarization member 3640, the adhesive member 3650, and the opaque member 3650 have a circular shape, the diameter of the opening formed in the opaque member 3661 may be d1, the diameter of the opening formed in the adhesive member 3640 may be d2, the diameter of the opening formed in the polarization member 3620 may be d3, and the diameter of the opening formed in the display panel may be d4. The centers of the openings in the display panel 3620, the polarization member 3640, the adhesive member 3650, and the opaque member 3661, and the center of the sensor portion may be disposed on one axis. The diameter d1 of the opening formed in the opaque member 3661 may be the smallest among the openings in the display panel 3620, the polarization member 3640, the adhesive member 3650, and the opaque member 3661. The diameter d2 of the openings formed in the display panel 362 and the diameter d3 of the opening formed in the polarization member 3640 may be the same, and may be larger than the diameter d4 of the opening formed in the adhesive member 3650.

Figure 37A:
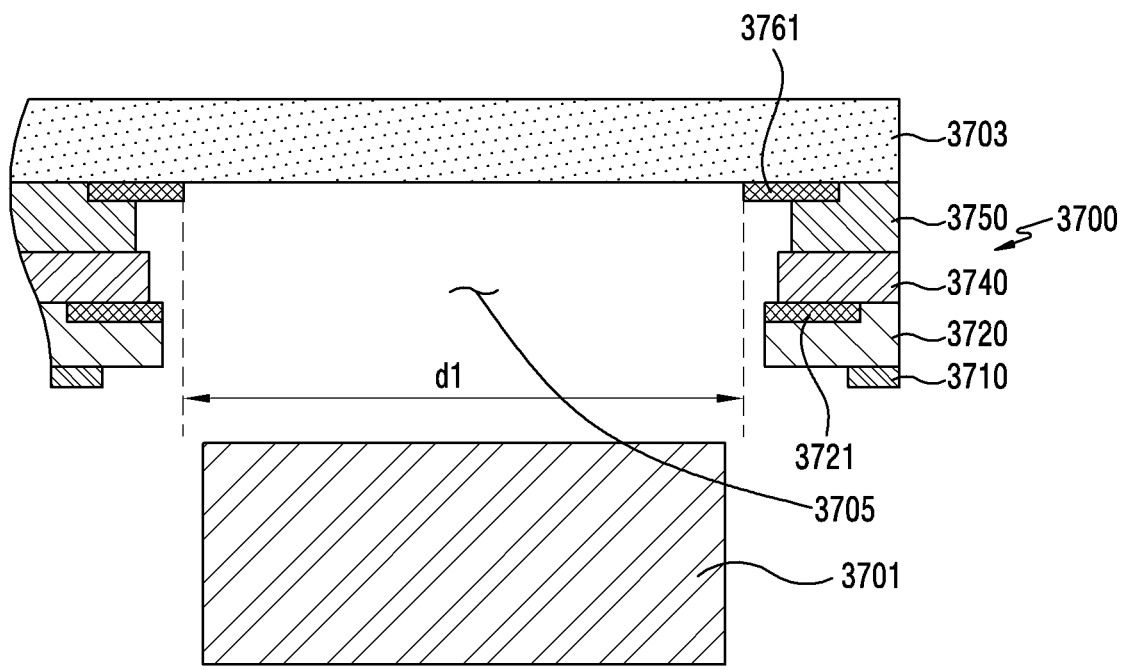
FIG. 37A is a cross-sectional view of a display according to a fourteenth embodiment.
Figure 37B:
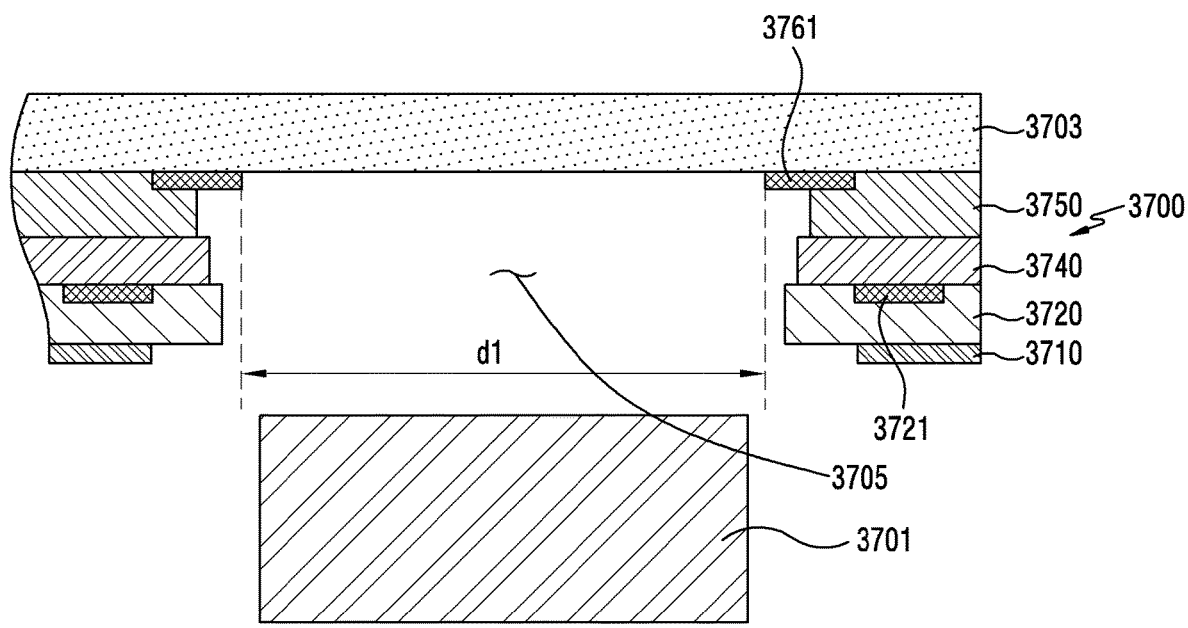
FIG. 37B is a cross-sectional view of a display according to a fourteenth embodiment.

FIG. 37A is a cross-sectional view of a display according to a fourteenth embodiment. FIG. 37B is cross-sectional view of a display according to a fourteenth embodiment.

Referring to FIG. 37A, the display 3700 according to the fourteenth embodiment may be disposed below the window 3703, and may include an opening 3705 at a position corresponding to at least one sensor 3701. The display 3700 may include a support member 3710, a display panel 3720, a polarization member 3740, an adhesive member 3750, a first opaque member 3761, and a second opaque member 3721. The support member 3710, the display panel 3720, the second opaque member 3721, the polarization member 3740, the adhesive member 3750, and the first opaque member 3761 may be sequentially stacked on the sensor 3701. The support member 3710, the display panel 3720, the polarization member 3740, the adhesive member 3750, and the first opaque member 3761 may each include openings 3705 having different diameters. The at least one sensor 3701 may be located in at least a part of the openings 3705. The at least one sensor 3701 may be disposed below the second opaque member 3721. The support member 3710, the display panel 3720, the polarization member 3740, the adhesive member 3750, and the first opaque member 3761 in the display 3700 may be the same as or similar to the support member 3610, the display panel 3620, the polarization member 3640, the adhesive member 3650, and the opaque member 3661 in the display 3600 of FIG. 36, respectively, and a redundant description thereof is omitted.

According to certain embodiments, the first opaque member 3761 may be disposed between the window 3703 and the adhesive member 3750, and the first opaque member 3761 may prevent the visibility of bubbles formed in the adhesive member. The first opaque member 3761 may be disposed to overlap at least a part of the second opaque member 3721. The second opaque member 3721 may prevent the visibility between the active area of the display panel 3720 and the first opaque member 3761. The second opaque member 3721 may prevent the area of a Black Matrix (BM) from increasing around the opening due to the clearance between the opaque member and the active area of the display panel 3720.

According to certain embodiments, the first opaque member 3761 may be disposed in the window 3703, and the second opaque member 3721 may be disposed on the display panel 3720 or may be disposed inside the display panel 3720. The second opaque member 3721 disposed inside the display panel 3720 may be the same as or similar to the opaque member 1160 illustrated in FIGS. 12A, 12B, and 12C.

FIG. 37B may be different from FIG. 37A in terms of the disposed positions of the display panel 3710 and the second opaque member 3721. The first opaque member 3761 and the second opaque member 3721 may be the same as or similar to the opaque members 3761 and 3721 of FIG. 37A. According to certain embodiments, the boundary of the outer periphery positioned outside the opening 3705 in the first opaque member 3761 may coincide with the boundary of the inner periphery directed to the opening 3705 in the second opaque member 3721.

According to certain embodiments, the at least one sensor 3701 may be disposed below the second opaque member 3721.

Figure 38:
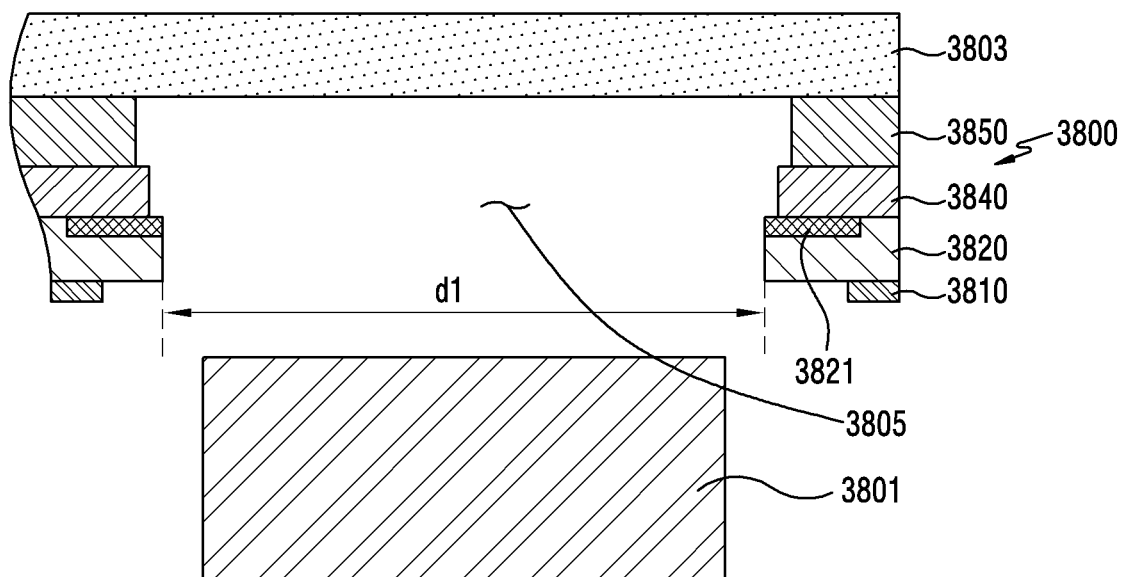
FIG. 38 is a cross-sectional view of a display according to a fifteenth embodiment.

FIG. 38 is a cross-sectional view of a display according to a fifteenth embodiment.

Referring to FIG. 38, the display 3800 according to the fifteenth embodiment may be disposed below the window 3803, and may include an opening 3805 at a position corresponding to at least one sensor 3801. The display 3800 may include a support member 3810, a display panel 3820, a polarization member 3840, an adhesive member 3850, and an opaque member 3861. The support member 3801, the display panel 3820, the opaque member 3821, the polarization member 3840, and the adhesive member 3850 may be sequentially stacked on the sensor 3801. The support member 3810, the display panel 3820, the polarization member 3840, and the adhesive member 3650 may each include openings 3805 having different diameters. The at least one sensor 3801 may be located in at least a part of the openings 3805. The support member 3810, the display panel 3820, the polarization member 3840, and the adhesive member 3840 in the display 3800 may be the same as or similar to the support member 3610, the display panel 3620, the polarization member 3640, and the adhesive member 3650 in the display 3600 of FIG. 36, respectively, and a redundant description thereof is omitted.

According to certain embodiments, an opaque member 3821 may be disposed on the display panel 3820 along the periphery of the opening in the display panel 3820. The opaque member 3821 may be disposed between the opening formed in the display panel 3820 and the active area of the display panel. The opaque member 3821 may prevent bubbles formed by the adhesive member 3850 from being visible due to reflected light.

According to certain embodiments, the at least one sensor 3801 may be disposed below the opaque member 3821.

Figure 39:
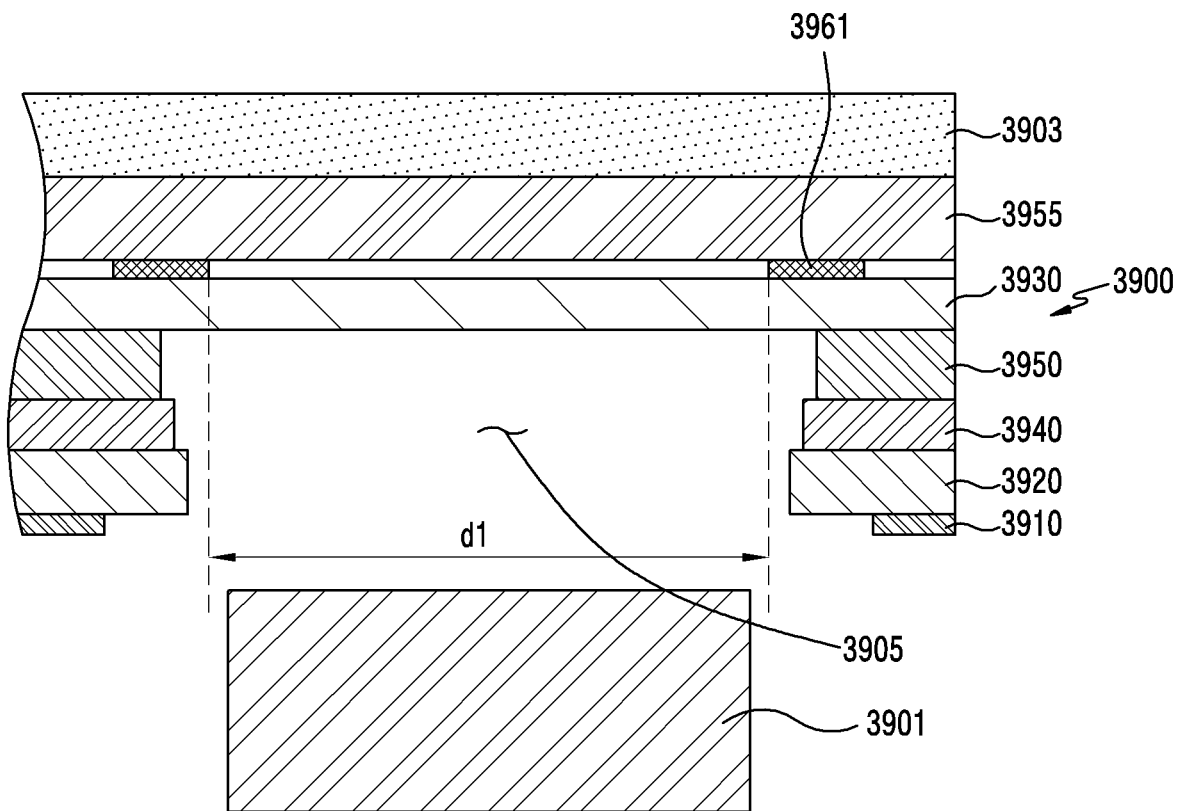
FIG. 39 is a cross-sectional view of a display according to a sixteenth embodiment.
Figure 40:
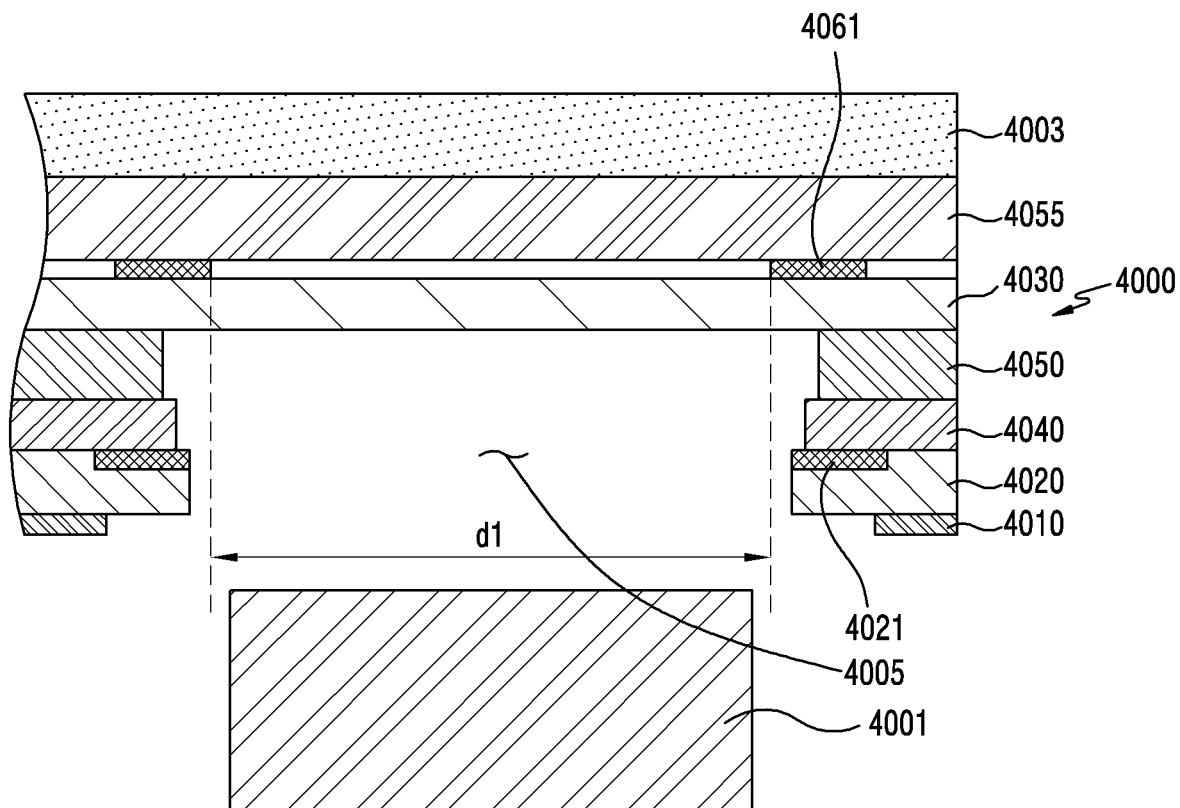
FIG. 40 is a cross-sectional view of a display according to a seventeenth embodiment.

FIG. 39 is a cross-sectional view of a display according to a sixteenth embodiment, and FIG. 40 is a cross-sectional view of a display according to a seventh embodiment.

Referring to FIG. 39, the display 3900 according to the sixteenth embodiment may be disposed below the window 3903, and may include an opening 3905 at a position corresponding to at least one sensor 3601. The display 3900 may include a support member 3910, a display panel 3920, a polarization member 3940, a first adhesive member 3950, a second adhesive member 3955, a touch panel 3930, and a opaque member 3961. The support member 3910, the display panel 3920, the polarization member 3940, the first adhesive member 3950, and the touch panel 3930 may be sequentially stacked on the sensor 3901. The support member 3910, the display panel 3920, the polarization member 3940, and the adhesive member 3950 may each include openings 3605 having different diameters. The at least one sensor 3901 may be located in at least a part of the openings 3905. According to certain embodiments, the touch panel 3930 may include an opening corresponding to the sensor 3901, and the size of the opening may be substantially the same as the inner periphery of the opaque member 3961. The support member 3910, the display panel 3920, the polarization member 3940, and the first adhesive member 3950 in the display 3900 may be the same as or similar to the support member 3610, the display panel 3620, the polarization member 3640, and the adhesive member 3650 in the display 3600 of FIG. 36, respectively, and a redundant description thereof is omitted.

According to certain embodiments, the touch panel 3930 may be of an add-on type. The touch panel 3930 may be disposed on the display panel 3920 and the polarization member 3940. The touch panel 3930 may be attached to the window 3903 by the second adhesive member 3955. The touch panel 3930 may include a pattern on a transparent substrate. An opaque member 3961 may be disposed on the touch panel 3930. The opaque member 3961 may have a width that covers the boundaries of the openings in the display panel 3920, the polarization member 3940, and the adhesive member 3950. The opaque member 3961 may be formed in the area including the opening boundary of the display in the transparent panel, or may be formed on the touch panel 3930. The opaque member 3961 may be formed between the opening and the active area of the display panel 3920.

According to certain embodiments, the opaque member 3961 may prevent the boundaries of the openings formed by the components of the display 3900 from being visible from the outside.

Referring to FIG. 40, the display 4000 according to the seventeenth embodiment may be disposed below the window 4003, and may include an opening 4005 at a position corresponding to at least one sensor 4001. The display 4000 may include a support member 4010, a display panel 4020, a polarization member 4040, a first adhesive member 4050, a second adhesive member 4055, a touch panel 4030, a first opaque member 4061, and a second opaque member 4021. The support member 4010, the display panel 4020, the polarization member 4040, the first adhesive member 4050, and the touch panel 4030 may be sequentially stacked on the sensor 4001. The support member 4010, the display panel 4020, the polarization member 4040, the adhesive member 4050, the first opaque member 4061, and the second opaque member 4021 may include openings 4005, respectively. The at least one sensor 4001 may be located in at least a part of the openings 4005. According to certain embodiments, the touch panel 4030 may include an opening corresponding to the sensor 4001, and the size of the opening may be substantially the same as the inner periphery of the first opaque member 4061. The display 3900 of FIG. 39 includes one opaque member 3961, but the display 4000 of FIG. 40 may include the first opaque member 4061 and the second opaque member 4021.

According to certain embodiments, the first opaque member 4061 may be disposed between the window 4003 and the adhesive member 4055, and the first opaque member 4061 may prevent the visibility of bubbles formed in the adhesive member 4050. The second opaque member 4021 may prevent the visibility between the active area of the display panel 4020 and the first opaque member 4061. The second opaque member 4021 may prevent the area of a Black Matrix (BM) from increasing around the opening due to the clearance between the opaque member and the active area of the display panel 4020.

According to certain embodiments, the first opaque member 4061 may be disposed on the touch panel 4030, or may be disposed inside the touch panel 4030. The first opaque member 4061 disposed inside the touch panel 4030 may be the same as or similar to the opaque member 960 illustrated in FIGS. 10A, 10B, and 10C. The second opaque member 4021 may be disposed on the display panel 4020, or may be disposed inside the display panel 4020. The second opaque member 4021 disposed inside the display panel 4020 may be the same as or similar to the opaque member 1160 illustrated in FIGS. 12A, 12B, and 12C.

According to certain embodiments, the first opaque member 4061 may be disposed to overlap at least a part of the second opaque member 4021, or the outer peripheral boundary of the first opaque member 4061 may be substantially the same as the inner peripheral boundary of the second opaque member 4021.

According to certain embodiments, the at least one sensor 4001 may be disposed below the second opaque member 4021.

According to certain embodiments, the electronic device is able to compensate for the pixel-by-pixel optical characteristics of the display. To this end, the electronic device may store pixel-by-pixel compensation values for compensating for pixel-by-pixel optical characteristics. The manufacturer of the display may detect pixel-by-pixel compensation values through display imaging during the manufacture of the display. As an example, the manufacturer of the display may detect the pixel-by-pixel compensation values to correspond to each display, and may record the values in the electronic device, which is equipped with the display. As another example, the manufacturer of the display may detect pixel-by-pixel compensation values corresponding to at least one arbitrarily selected among displays to be manufactured, and may collectively record the values in the electronic devices, which are equipped with the displays, respectively. Thereby, it is possible to compensate for the pixel-by-pixel optical characteristics of the display, using the pixel-by-pixel compensation values.

An electronic device according to certain embodiments may include: at least one sensor; a display panel including a sensor area corresponding to the first sensor and a pixel area including at least one pixel and a drive wiring line configured to drive the pixel, the drive wiring line extending while surrounding the sensor area in the pixel area; a window disposed over the display panel; and an opaque member disposed between the sensor and the window and along an edge of the sensor area.

According to certain embodiments, the electronic device may further include: a touch panel configured to cover at least one of the sensor area and the pixel area of the display panel. The touch panel may include at least one of a area overlaying the sensor area corresponding to the sensor area and a area overlaying the pixel area corresponding to the pixel area.

According to one embodiment, the opaque member may be disposed to surround the area overlaying the sensor area in the area overlaying the pixel area of the touch panel.

According to another embodiment, the first opaque member may be disposed to surround the sensor area in the pixel area of the display panel.

According to another embodiment, the electronic device may further include: an optically clear adhesive layer disposed between the display panel and the window. Each of the optically clear adhesive layer and the display panel may include an opening corresponding to the sensor area, and of the one or more opaque members, a first opaque member may surround an area corresponding to the sensor area between the window and the optically clear adhesive layer.

According to another embodiment, the electronic device may further include: a transparent panel stacked between the display panel and the touch panel or between the touch panel and the window. The opaque member may be disposed on the transparent panel.

According to certain embodiments, the display panel may include an opening corresponding to the sensor area.

According to certain embodiments, the electronic device may further include a second opaque member disposed along a periphery of the opening in the pixel area of the display. The second opaque member may at least partially overlap the first opaque member.

According to certain embodiments, the display panel may further include a first substrate and a second substrate, on each of which a drive wiring line is disposed.

According to one embodiment, pixels may be disposed between the first substrate and the second substrate, and may include an organic luminous material.

According to another embodiment, pixels may be disposed between the first substrate and the second substrate, and may include a liquid crystal material.

According to certain embodiments, the display panel may accommodate at least a part of the sensor since the sensor area is disposed such that at least a part of the sensor is inserted into the sensor area.

According to one embodiment, the touch panel may accommodate at least a part of the sensor since the area overlaying the sensor area is disposed such that at least a part of the sensor is inserted into the area overlaying the sensor area.

According to certain embodiments, at least one of the first substrate and the second substrate may include a plurality of layers stacked to face the window.

According to one embodiment, the drive wiring line may extend between the layers to face and overlap the window.

According to another embodiment, the drive wiring line may include a first portion extending in the pixel area and a second portion surrounding the sensor area in the pixel area.

According to another embodiment, the thickness of the first portion may exceed the thickness of the second portion.

According to another embodiment, the drive wiring line may include a second portion surrounding the sensor area in the pixel area and a third portion extending in the sensor area.

According to another embodiment, the thickness of the third portion may be smaller than the thickness of the second portion.

According to another embodiment, the pixels may be arranged in the sensor area at a first density and in the pixel area at a second density greater than the first density.

According to another embodiment, the display panel may further include markers arranged to be spaced apart from each other to expose spaces therebetween in the sensor area, and configured to block the pixels in the sensor area.

According to certain embodiments, the electronic device may be manufactured using a first mask including a frame disposed to surround a first opening exposed to form a display panel, a floating portion disposed in the first opening to correspond to a sensor, and a bridge portion connecting the floating portion to the frame, and a second mask including a second opening corresponding to the bridge portion.

According to one embodiment, the floating portion may include a plurality of through holes.

A display according to certain embodiments may include a window, a display panel disposed under the window, and an optically clear adhesive layer disposed between the display panel and the window. The display panel may include a pixel layer including a plurality of pixels, and further including a specified area in which the pixels are not disposed and which is surrounded by the pixels and a transparent area disposed in at least a part of the specified area and configured to transmit light to a sensor, and a substrate having a drive wiring line disposed thereon and connected to at least one of the pixels, at least a part thereof being disposed along a peripheral area of the transparent area inside the specified area. The display may further include a first opaque member disposed between the window and the display panel.

According to certain embodiments, the display panel may include a first opening penetrating the pixel layer disposed in the transparent layer and the substrate.

According to certain embodiments, the display may further include a second opaque member at least a part of which is disposed between the optically clear adhesive layer and at least a part of the drive wiring line. The optically clear adhesive layer may include a second opening larger than the first opening, the first opaque member may surround a boundary between the first opening and the second opening and may be disposed between the window and the optically clear adhesive layer, and the second opaque member may prevent at least a part of the drive wiring line from being visible.

According to certain embodiments, the first opaque member and the second opaque member may at least partially overlap each other.

According to certain embodiments, at least a part of the first opaque member may be disposed between the optical adhesive layer and at least a part of the drive wiring line.

An electronic device according to certain embodiments may include: at least one sensor; a display panel including a sensor area corresponding to the sensor and a pixel area including at least one pixel and a drive wiring line configured to drive the pixel, the drive wiring line extending while surrounding the sensor area in the pixel area; a touch panel configured to cover the sensor area and the pixel area of the display panel, and including an area overlaying the sensor area corresponding to the sensor area and an area overlaying the pixel area corresponding to the pixel area; a window configured to cover the area overlaying the sensor area and the area overlaying the pixel area of the touch panel; and an opaque member disposed between the sensor and the window and disposed to surround the sensor area.

According to certain embodiments, the electronic device may further include: an adhesive member interposed between the touch panel and window, and a polarization member interposed between the touch panel and the adhesive member or the display panel and the touch panel.

According to certain embodiments, the sensor penetrates at least one of the sensor area of the display panel, the area overlaying the sensor area of the touch panel, the adhesive member, and the polarization member.

According to one embodiment, the opaque member is disposed to surround the sensor area in the pixel area of the display panel or disposed to surround the area overlaying the sensor area in the area overlaying the pixel area of the touch panel.

According to another embodiment, one of the display panel and the touch panel includes a transparent panel, and the opaque member may be disposed on the transparent panel.

According to another embodiment, the opaque member may be disposed between the window and the adhesive member or between the window and the polarization member.

According to another embodiment, the electronic device may further include a transparent panel stacked between the window and the adhesive member or between the window and the polarization member, and the opaque member may be disposed on the transparent panel.

A display according to certain embodiments may include a window and a display panel disposed under the window.

According to certain embodiments, the display panel may include: a pixel layer including a plurality of pixels, and further including a specified area in which the pixels are not disposed and which is surrounded by the pixels and a transparent area disposed in at least a part of the specified area and configured to transmit light to a sensor; a substrate having a drive wiring line disposed thereon and connected to at least one of the pixels, at least a part thereof being disposed along a peripheral portion of the transparent area inside the specified area; and an opaque member at least a part of which is disposed between the window and at least a part of the drive wiring line.

According to certain embodiments, the transparent area is formed through the pixel layer and the substrate.

According to certain embodiments, the opaque member may have attributes specified such that at least a part of the drive wiring line is not visible.

According to certain embodiments, the attribute may include at least one of transmittance, reflectance, and hue.

According to certain embodiments, the substrate may include a plurality of layers, and a part of the drive wiring line may extend between the layers to face and overlap the window.

An electronic device according to certain embodiments may include at least one sensor and a display.

According to certain embodiments, the display may include a sensor area under which a sensor is aligned, and a pixel area including a plurality of pixels and a drive wiring line formed therein.

According to certain embodiments, the pixel area may include a peripheral area that surrounds the sensor area and does not include pixels disposed therein, at least a part of the drive wiring line extending in the peripheral area.

According to certain embodiments, the sensor may not be located out of the outer edge of the peripheral area.

According to certain embodiments, the display may further include an opaque member disposed in the peripheral area and configured to cover at least a part of the drive wiring line.

According to certain embodiments, the display may accommodate at least a part of the sensor since the sensor area is disposed such that at least a part of the sensor is inserted into the sensor area.

According to certain embodiments, the display may include a window, and a display panel disposed under the window and having pixels and a drive wiring line formed therein.

According to certain embodiments, the opaque member may be disposed between the window and the display panel or inside the display panel.

According to one embodiment, the display may include a window, a display panel disposed under the window and having pixels and a drive wiring line formed therein, and a touch panel disposed between the window and the display panel or inside the display panel.

According to one embodiment, the opaque member may be disposed between the window and the touch panel or inside the touch panel.

What is claimed is:

1. An electronic device comprising:
   a sensor;
   a display panel including a sensor area overlaying the sensor and a pixel area, which surrounds the sensor area, including pixels and drive wiring lines configured to drive the pixels;
   a window disposed over the display panel;
   a polarization member disposed between the window and the display panel; and
   a first opaque member disposed on the polarization member or disposed between the polarization member and the display panel, the first opaque member disposed along an edge of the sensor area,
   wherein at least a part of the drive wiring lines, being disposed along a peripheral area of the sensor area, is covered by the first opaque members,
   wherein the sensor area of the display panel is transparent such that light to be sensed reaches the sensor through the sensor area surrounded by the pixel area, and
   wherein the pixel area surrounds an area corresponding to the first opaque member and the sensor area.

2. The electronic device of claim 1, further comprising:
   a touch panel, disposed between the polarization member and the display panel or disposed between the polarization member and the window, including an area overlaying the pixel area.

3. The electronic device of claim 2, wherein the first opaque member is disposed to surround an area overlaying the sensor area of the touch panel in the area overlaying the pixel area of the touch panel.

4. The electronic device of claim 3, wherein the display panel includes an opening corresponding to the sensor area.

5. The electronic device of claim 4, further comprising:
   a second opaque member disposed between the window and the touch panel, the second opaque member including another opening corresponding to the opening of the display panel, and
   wherein the touch panel is disposed between the window and the polarization member, and
   wherein the first opaque member is disposed along a periphery of the opening in the pixel area, and at least partially overlaps the second opaque member.

6. The electronic device of claim 4, wherein at least a part of the sensor is accommodated in the opening of the display.

7. The electronic device of claim 2, wherein the first opaque member is disposed beneath the touch panel.

8. The electronic device of claim 1, further comprising:
   an optically clear adhesive layer disposed between the polarization member and the window,
   wherein the optically clear adhesive layer includes a first opening corresponding to the sensor area, and the display panel includes a second opening corresponding to the sensor area, and
   a second opaque member disposed between the polarization member and the window, the second opaque member including a third opening corresponding to the second opening, and
   wherein the first opaque member is disposed between the polarization member and the display panel.

9. The electronic device of claim 1, wherein the sensor area of the display panel does not include pixels, and
   wherein at least part of the sensor is exposed by the sensor area in the display panel.

10. The electronic device of claim 1, further comprising:
    a transparent panel stacked between the display panel and the window,
    wherein the first opaque member is disposed on the transparent panel.

11. The electronic device of claim 1, wherein the first opaque member is disposed on an encapsulation layer of the display panel.

12. The electronic device of claim 1, wherein the first opaque member is disposed beneath an encapsulation layer of the display panel.

13. A display comprising:
    a window;
    a display panel disposed under the window;
    a polarization member disposed between the window and the display panel; and
    an optically clear adhesive layer disposed between the display panel and the window,
    wherein the display panel includes:

a pixel layer including a plurality of pixels, and further including a transparent area which is surrounded by the plurality of pixels, the transparent area configured to transmit light to a sensor; and a substrate having a drive wiring line disposed thereon and connected to at least one of the pixels, wherein at least a part of the drive wiring line is disposed along a peripheral area of the transparent area, and wherein the display includes a first opaque member disposed below the polarization member and along the peripheral area of the transparent area to cover the at least part of the drive wiring line.

14. The display of claim 13, wherein the display panel includes a first opening penetrating the pixel layer disposed in the transparent area and the substrate.

15. The display of claim 14, further comprising:

a second opaque member at least a part of which is disposed between the optically clear adhesive layer and at least the part of the drive wiring line, wherein the optically clear adhesive layer includes a second opening larger than the first opening, wherein the first opaque member surrounds a boundary between the first opening and the second opening and is disposed between the window and the optically clear adhesive layer, and wherein the second opaque member prevents the at least the part of the drive wiring line from being visible.

16. The display of claim 15, wherein the first opaque member and the second opaque member at least partially overlap each other.

17. The display of claim 14, wherein at least a part of the first opaque member is disposed between the optically clear adhesive layer and at least the part of the drive wiring line.

18. An electronic device comprising:

at least one optical sensor;

a display including at least one pixel layer, at least one touch sensitive layer, and at least one polarization layer; and a window disposed above the display, wherein the display includes a pixel area in which pixels of the at least one pixel layer are disposed, a sensor area aligned above the at least one optical sensor, and a peripheral area in which drive wiring lines for the pixels detouring the sensor area are disposed, and the pixel area surrounds the peripheral area surrounding the sensor area, wherein an opaque member is included inside the display, disposed along the peripheral area and covers the drive wiring lines, and wherein the sensor area and the peripheral area include no pixels for emitting light in the pixel layer.

19. The electronic device of claim 18, wherein the sensor is located within an outer edge of the peripheral area.

20. The electronic device of claim 18, wherein the display accommodates at least a part of the sensor.

* * * * *